United States Patent
Buchanan et al.

(10) Patent No.: US 6,589,760 B1
(45) Date of Patent: Jul. 8, 2003

(54) METHODS OF SEPARATING A CORN FIBER LIPID FRACTION FROM CORN FIBER

(75) Inventors: Charles M. Buchanan, Kingsport, TN (US); Norma L. Buchanan, Kingsport, TN (US); John S. Debenham, Kingsport, TN (US); Michael C. Shelton, Kingsport, TN (US); Matthew D. Wood, Gray, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/501,917

(22) Filed: Feb. 10, 2000

Related U.S. Application Data
(60) Provisional application No. 60/119,399, filed on Feb. 10, 1999.

(51) Int. Cl.[7] ................................................ C12Q 1/37
(52) U.S. Cl. ..................... 435/23; 424/750; 552/545
(58) Field of Search ........................... 435/23; 424/750; 552/545

(56) References Cited

U.S. PATENT DOCUMENTS

| | | | |
|---|---|---|---|
| 1,683,347 A | 9/1928 | Gray et al. | |
| 1,698,049 A | 1/1929 | Clarke et al. | |
| 1,880,560 A | 10/1932 | Webber et al. | |
| 1,880,808 A | 10/1932 | Clarke et al. | |
| 1,984,147 A | 12/1934 | Malm et al. | 260/102 |
| 2,129,052 A | 9/1938 | Fordyce et al. | 260/102 |
| 2,709,699 A | 5/1955 | Wolf et al. | 260/209 |
| 2,772,981 A | 12/1956 | Smart et al. | 106/203 |
| 2,801,955 A | 8/1957 | Rutenberg et al. | 195/9 |
| 2,868,778 A | 1/1959 | Watson et al. | 260/209 |
| 3,617,201 A | 11/1971 | Bernl et al. | 8/120 |
| 3,716,526 A | 2/1973 | Schweiger | 260/212 |
| 3,780,017 A | 12/1973 | Spalt et al. | 260/209 |
| 3,784,408 A | 1/1974 | Jaffe et al. | 127/37 |
| 3,990,904 A | 11/1976 | Friese et al. | 127/37 |
| 4,000,127 A | 12/1976 | Cornelissens et al. | 536/102 |
| 4,022,637 A | 5/1977 | Sutthoff et al. | 127/46 A |
| 4,029,878 A | 6/1977 | Kruse | 536/1 |
| 4,038,481 A | 7/1977 | Antrim et al. | 536/56 |
| 4,075,406 A | 2/1978 | Melaja et al. | 536/1 |
| 4,137,395 A | 1/1979 | Buckl et al. | 536/1 |
| 4,168,988 A | 9/1979 | Riehm et al. | 127/37 |
| 4,226,638 A | 10/1980 | Pfeiffer | 127/37 |
| 4,277,411 A | 7/1981 | Yahl | 260/412.4 |
| 4,355,158 A | 10/1982 | Wolf et al. | 536/1 |
| 4,402,832 A | 9/1983 | Gerhold | 216/659 |
| 4,471,114 A | 9/1984 | Sherman et al. | 536/127 |
| 4,511,559 A | 4/1985 | Szendrei et al. | 514/54 |
| 4,602,086 A | 7/1986 | Hiroshi et al. | 536/125 |
| 4,664,718 A | 5/1987 | Chang | 127/46.2 |
| 4,677,198 A | 6/1987 | Linnett et al. | 530/500 |
| 4,681,935 A | 7/1987 | Forss et al. | 536/56 |
| 4,718,405 A | 1/1988 | Firth et al. | 127/46.1 |

(List continued on next page.)

FOREIGN PATENT DOCUMENTS

| | | |
|---|---|---|
| DE | 2527234 | 1/1976 |
| EP | 408 502 A2 | 1/1991 |
| EP | 461 325 A1 | 12/1991 |
| JP | 57021324 A | 2/1982 |
| JP | 57021323 | 4/1982 |
| JP | 05229063 | 9/1993 |
| RU | 2092529 | 10/1997 |
| WO | WO 89/07602 | 8/1989 |
| WO | WO 93/10158 | 5/1993 |
| WO | WO 98/06405 | 2/1998 |
| WO | WO 98/22513 | 5/1998 |
| WO | WO 98/40413 | 9/1998 |
| WO | WO 99/11672 | 3/1999 |

OTHER PUBLICATIONS

Habtemariam S. Extract of Corn Silk Inhibits the TNF . . . Planta Medica 64(4)314–318, 1998.*
Moreau R. Extraction and Quantitative Analysis of Oil from Commercial Corn Fiber. J Agric Food Chem 44(8)2149–2154, 1996.*
Dien et al., "Conversion of Corn Milling Fibrous Co–products into Ethanol by Recombinant *Escherichia coli* Strains K011 and SL40," *World Journal of Microbiology & Biotechnology,* 13, 619–625 (1997).
Leathers et al., "Saccrification of Corn Fiber Using Enzymes from Aureobasidium sp. Strain NRRL Y–2311–1," *Applied Biochemistry and Biotechnology,* 59, 337–347 (1996).
Saulnier et al., "Cell Wall Polysaccharide Interactions in Maize Brain," *Carbohydrate Polymers,* 26, 279–287 (1995).
Moreau et al., "Effect of Heat Pretreatment on the Yield and Composition of Oil Extracted from Corn Fiber," *J. Agric. Food Chem.,* 47, 2869–2871 (1999).

(List continued on next page.)

*Primary Examiner*—Ralph Gitomer
(74) *Attorney, Agent, or Firm*—Needle & Rosenberg PC

(57) ABSTRACT

The invention provides a method of separating from corn fiber a lipid fraction having phytosterol esters and phytosterols where the method has the steps of: (a) heating an aqueous mixture of unground corn fiber; (b) contacting the mixture of step (a) with at least one enzyme suitable for digesting starch for a time and at a temperature suitable to provide a mixture of an essentially destarched corn fiber and a liquid comprising soluble carbohydrates; (c) contacting the mixture of step (a) or (b) with a protease enzyme to provide a proteolyzed corn fiber and a liquid; (d) separating the liquid of step (c) from the corn fiber to provide a destarched, proteolyzed corn fiber; and (e) extracting the destarched, proteolyzed corn fiber with at least one organic solvent. A corn fiber lipid fraction/organic solvent solution having phytosterol esters and phytosterols is provided. The invention also provides a corn fiber lipid fraction containing phytosterols and phytosterol esters obtained via solvent extraction of a proteolyzed corn fiber. The concentration of phytosterols and phytosterol esters in the lipid fraction is at least about 1.4 times greater than the concentration of phytosterols and phytosterol esters in the lipid fraction of a nonproteolyzed corn fiber.

24 Claims, 15 Drawing Sheets

U.S. PATENT DOCUMENTS

| | | | |
|---|---|---|---|
| 4,738,772 A | 4/1988 | Giesfeldt | 209/2 |
| 4,752,579 A | 6/1988 | Arena et al. | 435/99 |
| 4,815,445 A | 3/1989 | Swedo et al. | 127/46.1 |
| 4,842,877 A | 6/1989 | Tyson | 426/271 |
| 4,859,485 A | 8/1989 | Linton et al. | 426/623 |
| 4,880,473 A | 11/1989 | Scott et al. | 127/37 |
| 4,916,242 A | 4/1990 | Avignon et al. | 549/489 |
| 4,927,649 A | 5/1990 | Antenucci | 426/273 |
| 4,959,465 A | 9/1990 | Klemann et al. | 536/115 |
| 4,965,353 A | 10/1990 | della Valle et al. | 536/55.1 |
| 4,983,730 A | 1/1991 | Domeshek et al. | 536/69 |
| 4,994,115 A | 2/1991 | Giesfeldt et al. | 127/67 |
| 5,015,296 A | 5/1991 | Dobler et al. | 127/42 |
| 5,043,287 A | 8/1991 | Johal | 436/177 |
| 5,053,482 A | 10/1991 | Tietz | 528/272 |
| 5,073,201 A | 12/1991 | Giesfeldt et al. | 127/67 |
| 5,084,104 A | 1/1992 | Heikkila et al. | 127/46.2 |
| 5,097,004 A | 3/1992 | Gallagher et al. | 528/272 |
| 5,106,634 A | 4/1992 | Thacker et al. | 426/31 |
| 5,112,964 A | 5/1992 | Aoe et al. | 536/56 |
| 5,125,977 A | 6/1992 | Grohmann et al. | 127/36 |
| 5,340,403 A | 8/1994 | Fields et al. | 127/37 |
| 5,342,641 A | 8/1994 | Masutake et al. | 426/549 |
| 5,430,142 A | 7/1995 | Glasser et al. | 536/115 |
| 5,502,045 A | 3/1996 | Miettinen et al. | 514/182 |
| 5,503,668 A | 4/1996 | Giesfeldt et al. | 106/162 |
| 5,626,762 A | 5/1997 | Priegnitz et al. | 210/659 |
| 5,645,729 A | 7/1997 | Priegnitz et al. | 210/659 |
| 5,747,434 A | 5/1998 | Lämsä | 508/485 |
| 5,843,499 A * | 12/1998 | Moreau et al. | 426/2 |
| 6,147,206 A | 11/2000 | Doner et al. | 536/128 |
| 6,352,845 B1 * | 3/2002 | Buchanan et al. | 435/105 |

OTHER PUBLICATIONS

Moreau et al., "Comparison of Yield and Composition of Oil Extracted from Corn Fiber and Corn Bran," *Cereal Chem.*, 76(3), 449–451 (1999).

Hicks, "Cholesterol–Lowering Plant Oil Products: Pharmaceutical and Nutritional Companies Stake Out Market Positions," *Genetic Engineering News*, 18, 1,14,18 (Sep. 15, 1998).

Doner et al., "An Improved Process for Isolation of Corn Fiber Gum," *Cereal Chemistry*, 75(4), 408–411 (1998).

Hicks et al., "Converting Corn Fiber into Products from A to Z: Amazing Oil and Zeagen Corn Fiber Gum," *Corn Utilization & Technology Conf. Proceedings, St. Louis, MO*, 25–30 (Jun. 1–3, 1998).

Moreau et al., "The Occurrence and Biological Activity of Ferulate–Phytosterol Esters in Corn Fiber and Corn Fiber Oil," *U.S.D.A.*, 189–191 (1998).

Moreau et al., "Use of Corn Fiber Oil as a Serum Cholestrol–Lowering Substance," http:/www.nal.usda.gov/tticbiofuels/cornoil.html (1998).

Westrate et al., "Plant sterol–enriched margarines and reduction of plasma total and LDL–cholesterol concentrations in normocholesterolaemic and mildly hypercholesterolaemic subjects," *European Journal of Clinical Nutrition*, 52, 334–343 (1998).

Hicks et al., "Corn Fiber Yields Oil and Gum Products," *U.S.D.A* (Dec. 1997).

Faulkner, "Corn Fiber Feeds for Cattle Diets," www.ilcorn.org/cattlepr.html (Jul. 1996–Jul. 1997).

Doner et al., "Structure, Properties and Novel Isolation Process for Corn Fiber Arabinoxylan," *American Chemical Society Meeting, San Francisco* (Apr. 1997).

Doner et al., "Isolation of Hemicellulose from Corn Fiber by Alkaline Hydrogen Peroxide Extraction," *Cereal Chemistry* 74(2), 176–181 (1997).

Miettinen et al., "Sitostanol–Ester Margarine," *Frontier of Foods: Food Ingredients*, 2, 71–83 (1997).

Nicolosi et al., "Health Benefits of Unsaponifiable Constituents of Fats and Oils," *Frontier of Foods: Food Ingredients*, 2, 1–21 (1997).

Clarke et al., "Chapter 16: Sugar Beet & Sugarcane as Renewable Resources," *ACS Symposium Series, Agricultural Materials as Renewable Resources* 229–247 (1996).

Hicks et al., "Corn Fiber: An Old By–Product with a Cornucopia of Future Uses," *Corn Utilization Conference VI Proceedings, St. Louis, MO* (Jun. 4–6, 1996).

Moreau et al., "Extraction and Quantitative Analysis of Oil from Commercial Corn Fiber," *J. Agric. Food Chem.*, 44, 2149–2154 (1996).

Chanliaud et al., "Alkaline Extraction and Characterisation of Heteroxylans from Maize Bran," *Journal of Cereal Science*, 21, 195–203 (1995).

Hromadkova et al., "Isolation and Characterization of Hemicelluloses of Corn Hulls," *Chem. Papers*, 49, (2), 97–101 (1995).

Mietinnen et al., "Reduction of Serum Cholesterol with Sitostanol–Ester Margarine in a Mildly Hypercholesterolemic Population," *The New England Journal of Medicine*, 333(20), 1308–1312 (1995).

Norton, "Quantitation of Steryl Ferulate and p–Coumarate Esters from Corn and Rice," *Lipids*, 30(3), 269–274 (1995).

Saulnier et al., "Cell Wall Polysaccharide Interactions in Maize Bran," *Carbohydrate Polymers*, 26, 279–287 (1995).

Saulnier et al., "Isolation and Partial Characterization of feruloylated oligosaccharides from maize bran," *Carbohydrate Research*, 272, 241–253 (1995).

Norton, "Isolation and Identification of Steryl Cinnamic Acid Derivatives from Corn Bran," *Cereal Chem.*, 71(2), 111–117 (1994).

Sugawara et al., "Composition of corn Hill Dietary Fiber," *starch/stärke*, 46, 335–337 (1994).

Rogers, "Identification and Quantitation of y–Oryzanol Components and Simultaneous Assessment of Tocols in Rice Bran Oil," JAOCS, 70(3), 301–307 (Mar. 1993).

Saulnier et al., "Studies of Polysaccharides Solubilized During Alkaline Cooking of Maize Kernels," *Journal of Cereal Science*, 17, 267–276 (1993).

Whistler, "Hemicelluloses," *Industrial Gums*, Third Edition, 295–308 Academic Press, (1993).

Sandford, "High Purity Chitosan and Alginate: Preparation, Analysis and Applications," *Front Carbohydr. Res.*, 2, 250–269 (1992).

Seitz, "Sitostanyl Ferulate as an Indicator of Mechanical Damage to Corn Kernels," *American Asssociation of Cereal Chemists, Inc.*, vol. 67(3), 305–307 (1990).

Kanari, "A Reticuloendothelial System–Activating Arabinoxylan from the Bark of *Cinnamomum cassia*," *Chem. Pharm. Bull.*, 37(12), 3191–3194 (1989).

Steitz, "Stanol and Sterol Esters of Ferulic and p–Coumaric Acids in Wheat, Corn, Rye, and Triticale," *J. Agric Food Chem.*, 37, 662–667 (1989).

Alexander, "Chapter 11: Cor Dry Milling: Processes, Products, and Applications," *Corn: Chemistry and Technology*, 351–376 (1987).

May, "Chapter 12: Wet Milling: Process and Products," *Corn: Chemistry and Technology*, 377–397 (1987).

Watson, "Chapter 3: Structure and Composition," *Corn: Chemistry and Technology*, 53–82 (1987).

Weber, "Chapter 10: Lipids of the Kernel," *Corn: Chemistry and Technology*, 311–349 (1987).

Clark, Jr., et al., "Paramolybdate Anion–Exchange Resin, An Improved Catalyst for the C–1–C–2 Rearrangement and 2–Epimerization of Aldoses," *Carbohydrate Research, 153*, 263–270 (1986).

Robyt, "Chapter IV: Enzymes in the Hydrolysis and Synthesis of Starch," *Starch*, $2^{nd}$ Ed., 87–123 (1984).

Kainuma, "Chapter V: Starch Oligosaccharies: Linear, Branched, and Cyclic," *Starch*, $2^{nd}$ Ed., 125–152 (1984).

Whistler et al., Chapter VI: Molecular Structure of Starch, *Starch*, $2^{nd}$ Ed., 153–182 (1984).

Otey et al., "Chapter XI: Chemicals from Starch," *Starch*, $2^{nd}$ Ed., 389–416 No Date Avail.

Watson, "Chapter XII: Corn and Sorghum Starches: Production," *Starch*, $2^{nd}$ Ed., 417–468 No Date Avail.

Hayes et al, "Epimerization of Aldoses by Molybdate Involving a Novel Rearrangement of the Carbon Skeleton," *J. Am. Chem. Soc., 104*(24) (1982).

Abe et al., "Epimerization of Aldoses Catalyzed by Dioxobis(2,4–pentanedionato–O,O)–molybdenum (VI). An Improved Procedure for C–2 Epimer Preparation," *Chem. Pharm. Bull., 28*(4), 1324–1326 (1980).

Bilik et al., "Reactions of Saccharides Catalyzed by Molybdate Ions. VII. Preparation of L–ribose and D– and L–lyxose," *Chem. zvesti*, 27(4), 547–550 (1973).

Lee et al., "Conditioning Studies on Australian Wheat IV. Compositional Var. in the Bran Layers of Wheat and their Rel. to Milling," *J. Sci. Fd. Agric., 24*, 1565–1569 (1973).

Aspinall et al. "The Catalytic Oxidation of Rye–Flour Arabinoxylan," *J. Am. Chem. Soc.*, 3998–4000 (1960).

Montgomery, "Structure of Corn Hull Hemicellulose. Part III. Identification of the Methylated Aldobiouronic Acid Obtained from Methyl Corn Hull Hemicellulose," *J. Am. Chem. Soc., 79*, 695–697 (1957).

Srivastava et al., "Structure of Corn Hemicellulose. Part V. Partial Hydrolysis and Identification of 4–O–B–D–Xylopyranosyl–D–xylose and 5–O–B–D–Galactopyranosyl–L–arabofuranose," *J. Am. Chem. Soc., 79*, 982–984 (1957).

Whistler, "Hydrolysis Components from Methylated Corn Fiber Gum," *J. Am. Chem. Soc., 78*, 1163–1165 (1956).

Whistler et al., "Oligosaccharides from Partial Acid Hydrolysis of Corn Fiber Hemicellulose," *J. Am. Chem. Soc., 77*, 6328–6330 (1955).

Rutenberg et al., "Chapter X: Starch Derivatives: Production and Uses," *Starch*, $2^{nd}$ Ed., 417–468 No Date Avai.

Wolf et al., "Preparation and Some Properties of Hemicelluloses from Corn Hulls," *Cereal Chemistry, 30*, 451–470 (1953).

Whistler, et al., "Chromatographic Separation of Sugars on Charcoal," *J. Am. Chem. Soc., 72*, 677–679 (1950).

Hough, "Quantitative Analysis of Mixtures of Sugars by the Method of Partition Chromatography. Part IV. The Separation of the Sugars and their Methylated Derivatives on Columns of Powdered Cellulose," *J. Am. Chem. Soc.*, 2511–2516 (1949).

Hooper, "Chemical Examination of Corn Bran," *Industrial and Engineering Chemistry, 34*(6), 728–729 (1942).

* cited by examiner

KEY: GENERAL LIPID CLASSES ARE MARKED ABOVE AS: ST:E (STEROL-FA ESTERS), TAG(TRIACYLGLYCEROLS), FA(FATTY ACIDS), ST(PHYTOSTEROLS), F:E(FERULATE ESTERS).

METHODS OF SEPARATING A CORN FIBER LIPID FRACTION FROM CORN FIBER

CROSS-REFERENCE TO RELATED APPLICATION

This application claims priority to U.S. Provisional Patent Application No. 60/119,399, filed on Feb. 10, 1999. This provisional patent application is herein incorporated by this reference is its entirety.

FIELD OF THE INVENTION

This invention relates to corn fiber. More particularly, this invention relates to the extraction of a corn fiber oil from wet or dry milled corn fiber. Specifically, the corn fiber obtained according to the methods herein comprises phytosterols and phytosterols esters. The invention also relates to novel corn fiber oil obtained from corn fiber.

BACKGROUND OF THE INVENTION

In the future, it will become increasingly important to develop consumer products from renewable resources, especially from annually renewable resources. Corn is one example of an annually renewable resource that serves as a source of valuable consumer products. Products derived from corn serve an important role in providing useful foodstuffs to the public. Corn provides important products, such as high fructose corn syrup, ethanol, grain and corn oil. While a large percentage of the total portion of corn is utilized to manufacture these substances, as well as other high value products, a significant fraction of corn is utilized for relatively low value products, such as animal feed. Technology that would allow a higher value utilization of the remaining fractions of corn would provide increased value overall from the entire useable portions of corn.

Corn fiber is one under-utilized fraction of corn. Corn fiber is obtained as a major by-product of the milling of corn. Corn fiber comprises the outer hull portion of the corn kernel. It has been estimated that approximately 7 to 10 billion pounds of corn fiber are produced annually in the United States. The fiber is produced at milling facilities and is collected as a relatively homogeneous fraction.

A major source of corn fiber is the wet milling of corn. During this process, the higher value products are removed from corn, such as the germ of the kernel. After extraction of the high value products, the remainder, which generally constitutes corn fiber, is mixed with steep liquor, also a by-product of corn milling. The mixture of fiber and liquor is then normally dried, pelletized and sold as gluten.

Another source of corn fiber is dry milling; corn fiber obtained from dry milling is often referred to as "corn bran." The bran by-product of dry milled corn fiber, composed primarily of hull, is mixed with other corn by-products and sold as hominy.

Both gluten feed and hominy feed are fairly low-value products. Nonetheless, these products have generally been the only commercial products prepared from corn fiber. Given the low margins of such products made from corn fiber, it is not uncommon for corn fiber to be disposed of outright, instead of undertaking the effort to prepare such low-value products.

Corn fiber makes up a significant (5 to 10 wt. %) portion of the total weight of the corn kernel. Corn fiber itself is made up of a number of components most of which, if extracted, can be commercially valuable. Specifically, corn fiber consists primarily of residual starch (10 to 25 wt. %), hemicellulose (40 to 50 wt. %), cellulose (15 to 25 wt. %), phenolic acids (3 to 5%), with the remainder present as proteins and oils. (See Wolf, et al. Cereal Chemistry, 30(1953), pp. 195–203; Chanliaud, et al., J. Cereal Science, 21(1995), pp. 195–203.) The variations in the reported composition are believed to be due to corn plant variety and growth conditions, as well as the specific methods utilized to isolate the corn fiber.

Hemicellulose is a component of corn fiber that has been of interest commercially. A number of references disclose the extraction of hemicellulose from corn fiber. However, most previous attempts to obtain useful products from corn fiber have focused almost entirely on methods to extract hemicellulose from corn fiber and the properties, particularly the color, of the hemicellulose obtained. These attempts to extract hemicellulose were likely initiated by the fact that hemicellulose has several valuable properties that make it attractive for a number of applications. In a non-exclusive list, some uses for hemicellulose include non-toxic adhesives, thickeners, emulsifiers, stabilizers, film formers and paper additives. (See e.g., Whistler, Industrial Gums, 3d Ed., Academic Press, 1993, pp. 295–308; U.S. Pat. No. 2,772,981; Wolf, et al. Cereal Chemistry, 30(1953), pp. 451–470.)

As indicated by these, as well as other references, hemicellulose can be quite difficult to extract from corn fiber. Because corn fiber hemicellulose is soluble in $H_2O$, it would be expected that hemicellulose would be fairly easy to extract from corn fiber utilizing water or some other non-aggressive solvent. This is not the case, however. Hydrogen bonding and physical entanglement of the hemicellulose with the corn fiber matrix are believed to be in part responsible for the difficulty in extraction. Other reasons for the difficulty in extractability may be due to cross-linking of the hemicellulose to other components of the corn fiber cell wall via covalent bonds between esterified phenolic acid residues and arabinose residues. Protein-polysaccharide linkages may also affect the ability to extract hemicellulose from corn fiber.

Most previous attempts to extract hemicellulose from corn fiber have focused on the use of strongly alkaline materials. This is not surprising, as one definition of hemicellulose is the portion of plants that is extractable by hot alkali treatment.

Various references disclose techniques to extract hemicellulose. For example, U.S. Pat. No. 2,709,699 discloses extraction of corn fiber with aqueous alkali at a pH of from 9 to 13 at from 90 to 115° C. for a time sufficient to solubilize hemicellulose so that it can be extracted. In this reference, the hemicellulose was isolated by adjusting the solution pH with an inorganic acid, followed by precipitation of the hemicellulose in ethanol, filtering to remove the hemicellulose and drying.

In another reference disclosing the extraction of hemicellulose from corn fiber, U.S. Pat. No. 4,038,481, corn fiber is treated with alkali to solubilize the hemicellulose. The hemicellulose is then precipitated with a water miscible organic solvent. The solvents utilized are acetone, methanol, ethanol, propanol, isopropanol, isobutyl alcohol, tert-butyl alcohol, or a mixture thereof. There is no disclosure of precipitation with acetic acid in this reference.

A recent reference, WO98/40413, discloses extraction of hemicellulose by heating corn fiber with alkaline hydrogen peroxide; the peroxide may be added at the same time or after an alkaline material, such as NaOH or $Ca(OH)_2$, is added. Significantly, WO98/40413 discloses the hemicellulose extractant as being heated in the presence of the alkaline hydrogen peroxide in order to obtain a suitably white hemicellulose powder from the precipitation step. However, this method is exceedingly dangerous to practice on an industrial scale because of excessive emissions of gas which may lead to significant foaming of the strongly alkaline materials and possibly to explosions.

Furthermore, although hemicellulose itself is a valuable product, the sub-components of hemicellulose are of even higher value. No reference has been located which addresses the extraction of these valuable sub-components from corn fiber. With the invention herein, it has been found that hemicellulose obtained from corn fiber may be subjected to further processing to provide carbohydrate fractions of very high value. That is, in accordance with the invention herein, it has been found possible to extract a number of valuable monosaccharide materials from corn fiber. Also in accordance with the invention herein, it has been found that hemicellulose from corn fiber may be derivatized to form corn fiber arabinoxylan esters and ethers. Methods of processing corn fiber hemicellulose in such a manner are not believed to be disclosed in the prior art.

Other than to obtain hemicellulose, there have been few attempts to exploit the remaining components of corn fiber. A notable recent exception relates to corn fiber oil. Corn fiber oil contains a significant portion of plant sterol esters. These materials have been reported to be useful as nutraceuticals, particularly as hypocholesterolemics. At this time, rice bran oil and tall oil are the major source of plant sterol esters utilized for commercial purposes.

Rice bran has been reported to contain approximately 18 wt. % extractable oil. Of this amount, 0.1 to about 0.8 wt. % comprises a ferulate ester, meaning that rice bran, at most, contains only about 0.08 wt. % ferulate ester. Moreover, the phytosterol esters in rice bran oil are primarily gamma-oryzanols, which are believed to be less effective as hypocholesterolemics.

In contrast, corn fiber oil has been shown to contain approximately 0.54 to 3.5 wt. % extractable oil and, of this, about 6.75 wt. % is a ferulate ester. Corn fiber therefore comprises about 0.12 wt. % ferulate ester, a significantly higher amount of ferulate ester than is present in the most commercially utilized source of hypocholesterolemic oils which are obtained from rice bran.

A recent patent, U.S. Pat. No. 5,843,499, discloses the extraction of corn fiber oil from finely ground corn fiber by utilizing either hexane or supercritical $CO_2$ as a solvent, with hexane being preferred. In this reference, the degree of grinding was demonstrated to be critical in determining the amount of oil obtained from the corn fiber, with a finer grinding of the corn fiber resulting in a greater amount of oil extracted. Drying of the corn fiber was also found to be highly significant to the invention, presumably because when the corn fiber is wet, the hexane extractant will not adequately penetrate the fiber so as to allow satisfactory extraction. However, because a drying step is expensive and time consuming on an industrial scale, it would be highly beneficial to be able to extract phytosterol esters from corn fiber directly without the need for an additional drying step.

As noted, cellulose forms a significant portion of corn fiber. However, cellulose has not been isolated from corn fiber in a form suitable for derivatization into higher value products, such as cellulose esters and cellulose ethers. This is not surprising because the prior art indicates that high purity cellulose was not obtained from the previously utilized methods. For example, U.S. Pat. No. 4,038,481, discussed previously, discloses that the cellulose obtained according to the methods therein contained about 35 wt. % contaminates which were believed to be present in the form of insoluble hemicellulose. This contamination would make it difficult, if not impossible, to utilize the cellulose obtained according to the methods of the '481 patent for preparation of cellulose derivatives.

In summary, no known reference addresses methods to obtain maximum utilization of the various components of corn fiber. Instead, the references have focused specifically on the optimization of hemicellulose color, and, separately, on methods to extract oil from corn fiber. While these are valuable objectives in and of themselves, in order to make the use of corn fiber an economically viable process, it is necessary to utilize as many components of corn fiber as possible. Furthermore, it is necessary to develop methods to separate each of these valuable components individually while leaving the remainder of the corn fiber so that the further components can be efficiently extracted in order to maximize value.

SUMMARY OF THE INVENTION

In one aspect, the invention provides a method of separating a corn fiber lipid fraction having phytosterol esters and phytosterols wherein the method comprises the steps of: (a) providing a mixture of corn fiber and water; (b) contacting the mixture with a protease enzyme to provide a proteolyzed corn fiber and a liquid; (c) separating the liquid from the proteolyzed corn fiber; and (d) extracting the proteolyzed corn fiber with at least one organic solvent, thereby providing a corn fiber lipid fraction/organic solvent solution having phytosterol esters and phytosterols.

In a further aspect, the invention provides a method of separating from corn fiber a lipid fraction having phytosterol esters and phytosterols wherein the method comprises the steps of: (a) heating an aqueous mixture of unground corn fiber; (b) contacting the mixture of step (a) with at least one enzyme suitable for digesting starch for a time and at a temperature suitable to provide a mixture of an essentially destarched corn fiber and a liquid comprising soluble carbohydrates; (c) contacting the mixture of step (a) or (b) with a protease enzyme to provide a proteolyzed corn fiber and a liquid; (d) separating the liquid of step (c) from the corn fiber to provide a destarched, proteolyzed corn fiber; and (e) extracting the destarched, proteolyzed corn fiber with at least one organic solvent, thereby providing a corn fiber lipid fraction/organic solvent solution having phytosterol esters and phytosterols.

In yet a further embodiment, the invention provides a method of separating a corn fiber lipid fraction having phytosterol esters and phytosterols wherein the method comprises the steps of: (a) providing a mixture of unground corn fiber and water; (b) separating the liquid from the corn fiber, thereby providing a water wet corn fiber; and extracting the water wet corn fiber with at least one polar organic solvent, thereby providing a corn fiber lipid fraction/polar organic solvent solution having phytosterol esters and phytosterols.

In a still further embodiment, the invention provides a corn fiber lipid fraction containing phytosterols and phytosterols esters obtained via solvent extraction of a proteolyzed corn fiber, wherein the concentration of phytosterols in the lipid fraction is at least about 1.4 times greater than the concentration of phytosterols in the lipid fraction of a nonproteolyzed corn fiber.

In a further aspect, the invention provides a corn fiber lipid fraction containing phytosterols and phytosterol esters obtained via solvent extraction of a proteolyzed corn fiber, wherein the concentration of phytosterol esters in the lipid fraction is at least about 1.4 times less than the concentration of phytosterol esters in the lipid fraction of a nonproteolyzed corn fiber.

Still further, the invention provides a method of obtaining soluble proteins and carbohydrates from corn fiber wherein the method comprises the steps of: (a)
  a. heating an aqueous suspension of corn fiber; (b) contacting the fiber sequentially or concurrently with an amylase enzyme and protease enzyme for a time and at a temperature sufficient to provide an essentially destarched, proteolyzed corn fiber and a liquid comprising soluble proteins and carbohydrates; and (c) separating the liquid from the destarched corn fiber wherein the soluble proteins and carbohydrates are suitable as feedstock for the production of animal feed, chemicals, and polymers.
  b.

Yet still further, the invention provides a method for obtaining animal feed wherein the method comprises the steps of: (a) heating an aqueous suspension of corn fiber; (b) contacting the fiber sequentially or concurrently with an amylase enzyme and protease enzyme for a time and at a temperature sufficient to provide an essentially destarched, proteolyzed corn fiber and a liquid comprising soluble proteins and carbohydrates; (c) separating the liquid from the destarched, proteolyzed corn fiber; (d) contacting the corn fiber at least once with an alkaline extractant to provide an insoluble cellulose material and a liquid comprising arabinoxylan; (e) separating the insoluble cellulose material from the liquid comprising arabinoxylan; (f) adding a sufficient amount of a corn steep liquor to the cellulose material; and (g) removing water from the heterogeneous mixture, thereby providing an animal feed.

Additional advantages of the invention will be set forth in part in the description that follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DETAILED DESCRIPTION OF THE INVENTION

Figure 1:
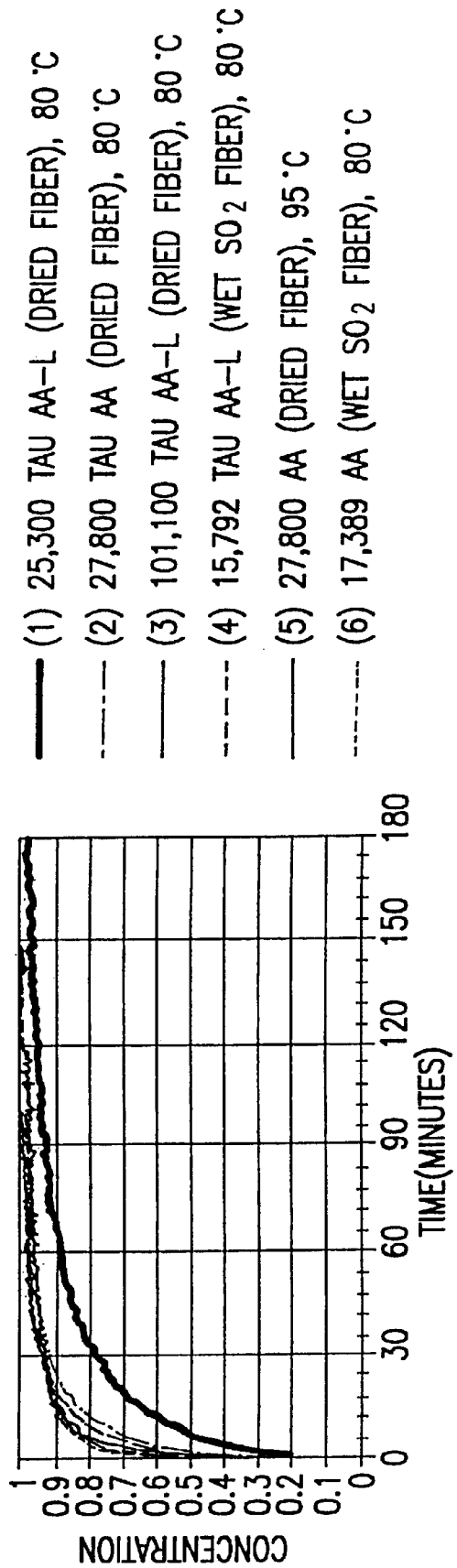
FIG. 1 shows the corn fiber destarching rate where the data has been normalized relative to the total sugars extracted.

The present invention may be understood more readily by reference to the following detailed description of preferred embodiments of the invention and the Examples included herein and to the Figures and their previous and following descriptions.

It must be noted that, as used in the specification and the appended claims, the singular forms "a," "an" and "the" include plural referents unless the context clearly dictates otherwise. Thus, for example, reference to "an aromatic compound" includes mixtures of aromatic compounds, reference to "a carrier" includes mixtures of two or more such carriers, and the like.

Ranges are often expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment.

A weight percent of a component, unless specifically stated to the contrary, is based on the total weight of the formulation or composition in which the component is included. Further, unless otherwise noted, weight percents are expressed as dry weight. For example, when a component is expressed as a weight percent based upon corn fiber, the weight is based upon dry weight of corn fiber.

Throughout this publication, where publications are referenced, the disclosures of these publications in their entireties are hereby incorporated by reference into this application in order to more fully describe the state of the art to which this invention pertains.

Unless otherwise noted, the percent carbohydrate has been normalized to 100%. Abbreviations used herein or as follows: "Glu" is glucose; "Xyl" is xylose; "Gal" galactose;

"Ara" is arabinose; "Man" is mannose, "DS" is the degree of substitution per monomer unit, "EtOH" means ethanol, "MeOH" means methanol, "HPLC" means high pressure liquid chromatography, "HOAc" or "AcOH" mean acetic acid and "nd" means not determined. The term "DS/CU" means Average Degree of Substitution/Carbohydrate Unit. The term "MS/CU" means Average Molar Substitution/Carbohydrate Unit.

"Proteolyzed" means that the corn fiber has been treated with a protease enzyme. "Nonproteolyzed" means that the corn fiber has not been treated with a protease enzyme.

Hours is abbreviated as "h;" minutes are abbreviated as "min."

The term "arabinoxylan" means that material extracted from corn fiber after treatment with an alkaline extractant. Unless otherwise indicated, arabinoxylan obtained according to the methods herein may be comprised of either hemicellulose B or hemicellulose A or a mixture thereof. In some instances, which will be evident to one of ordinary skill in the art, the term "hemicellulose" is used interchangeably with the term "arabinoxylan."

In a first major embodiment, the invention pertains to the separation of a corn fiber lipid fraction having phytosterol esters and phytosterols wherein the method comprises the steps of: a) heating an aqueous mixture of unground corn fiber; b) contacting the mixture of step (a) with at least one enzyme suitable for digesting starch for a time and at a temperature suitable to provide a mixture of an essentially destarched corn fiber and a liquid comprising soluble carbohydrates; c) contacting the mixture of step (a) or (b) with a protease enzyme to provide a proteolyzed corn fiber and a liquid; d) separating the liquid of step (c) from the corn fiber, thereby providing destarched, proteolyzed corn fiber; and e) extracting the destarched, proteolyzed corn fiber with at least one organic solvent, thereby providing a corn fiber lipid fraction/organic solvent solution having phytosterol esters and phytosterols.

In a further preferred embodiment, the invention pertains to the separation of a novel corn fiber lipid fraction having phytosterol esters and phytosterols wherein the method comprises the steps of: a) providing a mixture of corn fiber and water; b) contacting the mixture with a protease enzyme to provide a proteolyzed corn fiber and a liquid; c) separating the liquid from the proteolyzed corn fiber; and d) extracting the proteolyzed corn fiber with at least one organic solvent, thereby providing a corn fiber lipid fraction/organic solvent solution having phytosterol esters and phytosterols.

Corn fiber generally comprises the outer portion of a corn kernel. Thus, in one embodiment, the invention herein allows that portion of corn that would normally be thrown away or under-utilized as a low-value product to be further processed to provide a number of high value materials.

In a surprising discovery, with the invention herein, it is particularly preferable to utilize corn fiber containing $SO_2$. That is, it has been determined that corn fiber containing $SO_2$ may be destarched as rapidly or more rapidly than corn fiber not containing $SO_2$. This result is unexpected because it would be thought that $SO_2$ would act as a biocide and thus retard the enzymatic degradation of starch. This surprising discovery allows utilization of corn fiber without the expense and difficulty of drying the corn fiber prior to enzymatic treatment. Furthermore, in some circumstances, drying the corn fiber can change the morphology of the corn fiber thereby making it more difficult to remove the starch and other components.

Since $SO_2$ is an artifact of the wet milling process, in a particularly preferred embodiment, the corn fiber is obtained from a wet milling process. In another, still preferred embodiment, the corn fiber is obtained from a dry milling process. In another embodiment, the corn fiber may generally be utilized from the supplier "as-is" i.e., with no additional processing, wherein $SO_2$ is present in the corn fiber. In a preferred embodiment, the amount of $SO_2$ in the corn fiber is from about greater than 0 to about 5.0% by weight. In a further preferred embodiment, there is no $SO_2$ in the corn fiber. Still further, $SO_2$ may be added to either wet milled or dry milled corn fiber. In another preferred embodiment, the corn fiber may be a mixture of corn fiber obtained from both a wet milling and a dry milling process. Corn fiber from a wet milling process can be obtained from Staley, Ill. Corn fiber from a dry milling process can be obtained from the Lauhoff Grain Company (Danville, Ill.).

One of ordinary skill in the art would recognize the processing steps involved in wet milling and dry milling corn. Generally, the corn to be wet milled is first cleaned and steeped with slightly acidic water containing $SO_2$. The kernels are then coarsely milled and separated into constituents such as germ, gluten and starch. The individual components are washed and dried to produce end products such as corn starch, corn sweetener, corn oil and animal feed by-products. In a dry milling process, corn kernels are ground and separated into corn bran without a steeping step. Corn fiber would normally constitute by-products of each of these processing methods.

In a preferred embodiment, the corn fiber utilized in the processes herein is unground. As used herein, "unground" means that the fiber is used as obtained; that is, the fiber is not subjected to a separate grinding step. It should be noted, however, that when the corn fiber is obtained as a by-product of corn milling, such as from a corn wet milling process, the corn fiber may not be whole. Rather, since the fiber is subjected to processing steps in conjunction with the wet milling and dry milling processes, such "unground" corn fiber may have a wide distribution of particle sizes. In a further embodiment, the corn fiber is subjected to a separate corn fiber grinding step prior to being subjected to the processing methods herein.

In one embodiment, the corn fiber is first heated. It is generally believed that the corn fiber swells during the heating step which improves the efficiency of the enzyme. The heating step may be conducted at from about 50° C. to about 120° C. for from about 1 to about 600 minutes or, in a further preferred embodiment, the heating step is conducted at a temperature of from about 50° C. to about 100° C. for about 1 to about 60 minutes. One of ordinary skill in the art will recognize that the higher the temperature utilized, the shorter the time required to provide a suitably swollen fiber. One of ordinary skill in the art will also recognize that the optimum time for the heating step depends upon the size and type of reactor vessel utilized. A particularly preferred processing range for the heating/swelling is from about 70° C. to about 90° C. for about 15 to about 30 minutes.

In yet a further embodiment, the corn fiber is destarched with an enzyme suitable for digesting starch. When the corn fiber is to be subjected to both a destarching step and a proteolysis step, the destarching may be conducted prior to or concurrently with a protease enzyme contacting step, thereby providing an essentially destarched and proteolyzed corn fiber. In a preferred embodiment, the destarching is conducted utilizing an amylase enzyme. In a most preferred embodiment, the destarching enzyme comprises a thermophilic amylase. One example of a suitable thermophilic amylase is marketed as "Spezyme." Spezyme is a thermophilic α-amylase obtained from a genetically modified strain of *Baccillus lichenformis* and is available from Genencor, Palo Alto, Calif.

In a preferred embodiment, the destarching step is conducted at a temperature of from about 25° C. to about 120° C. for about 0.1 h to about 24 h at a pH of from about 4 to about 9. In a second, still preferred embodiment, the destarching step is conducted at a temperature of from about 60° C. to about 90° C. for from about 1 h to about 12 h at a pH of from about 7 to about 9. In some cases, depending upon the length and temperature of the enzyme treatments, the time required to bring the reaction mixture to the preferred temperature will also serve to adequately swell the corn fiber. In a further embodiment, the corn fiber may be destarched concurrently with the heating step.

In one embodiment, the rate of destarching is followed by utilizing a classical technique consisting of staining the corn fiber with an iodine solution, wherein the solution is prepared by adding iodine to $H_2O$ to provide about a 10% wt. solution. In this method, a portion of the iodine solution is added to a small vial containing a sample of corn fiber which has been subjected to a destarching treatment. The point at which the corn fiber does not stain purple generally indicates a complete or almost complete destarching of the corn fiber.

In another embodiment, the rate of destarching is followed in situ using an IR spectrophotometer (React IR 1000, ASI Applied Systems, Millersville, Md.), wherein the enzymatic degradation of starch is monitored by following the appearance of soluble oligiosaccharides and monosaccharides in solution. The starch digestion is judged to be complete when the concentration of soluble species in solution no longer increases. This latter method is particularly preferred in conjunction with the methods herein because it permits real time monitoring of the destarching process and is particularly well-suited for application in an industrial process.

One of ordinary skill in the art will recognize that the optimum temperatures, times and pH conditions for the destarching step will vary due to the source of the specific enzyme utilized. With the use of, for example, a thermophilic amylase enzyme such as Spezyme, it has been surprisingly found that it is possible to obtain a corn fiber which is at least about 90% destarched in less than or about 20 minutes. This fairly rapid destarching makes the methods disclosed and claimed herein particularly well-suited for application on an industrial scale.

With the invention herein, in one particularly preferred embodiment, it has been discovered that when it is desired to obtain not only corn fiber oil, but also other materials such as cellulose and arabinoxylan from corn fiber, it is critical to treat the corn fiber with a protease enzyme prior to treatment of the corn fiber with an alkaline extractant contacting step. The protease enzyme contacting step of the invention herein also provides novel products, as set out in more detail below.

Furthermore, it has also been unexpectedly found that removal of a protein fraction of corn fiber by utilizing a protease enzyme markedly increases the ability to filter the subsequently alkaline extractant treated corn fiber. Moreover, in some circumstances, treatment of corn fiber with a protease enzyme also significantly reduces the quantity of alkaline material required for extraction of arabinoxylan. For example, the prior art methods disclose that a caustic strength of about 2.5 M was required to efficiently extract the arabinoxylan from corn fiber not treated with a protease. As set out in more detail below, as little as 0.5 M of caustic can be utilized to efficiently extract arabinoxylan from proteolyzed corn fiber according to the methods herein. In one particularly preferred embodiment, it is critical to contact the corn fiber with a protease enzyme prior to performing any subsequent processing steps, except for destarching and/or heating/swelling of the fiber.

As one example of this particularly preferred process, the time required to filter protease treated corn fiber was about 2 minutes, whereas the time required to filter a non-protease treated corn fiber sample was about 12 hours. This dramatic decrease in filtering time introduces marked efficiencies into the processes herein and generally allows the undertaking of these processes on an industrial scale.

Further, it has been unexpectedly found that treatment of corn fiber with a protease enzyme provides for a more efficient extraction of total corn fiber oil with a different distribution of phytosterols and phytosterol esters than is observed with corn fiber which has not been treated with a protease enzyme. Without wishing to be bound by theory, it is believed that the protease also functions as an esterase, thereby cleaving certain ester linkages and allowing the more efficient extraction of the lipid fraction from the corn fiber.

Significantly, it has been found that subjecting corn fiber to a protease enzyme contacting step provides a corn fiber oil of a different, and novel, composition over that corn fiber oil disclosed in U.S. Pat. No. 5,843,499 to Moreau, et al. Particularly, it has been found that corn fiber oil extracted from proteolyzed corn fiber contains a different distribution of phytosterols and phytosterol esters than the oil obtained by Moreau et al. Accordingly, in one embodiment, the invention pertains to the product obtained by the corn fiber oil extraction processes herein. In yet another embodiment, the invention pertains to a novel corn fiber oil in which the concentration of phytosterols in the lipid fraction is at least about 1.4 times greater than the concentration of phytosterols in the lipid fraction of nonproteolyzed corn fiber. Still yet, the invention pertains to a novel corn fiber oil in which the concentration of phytosterol esters (or phytosterol ferulates) in the lipid fraction is at least about 1.4 times less than the concentration of phytosterol esters (or phytosterol ferulates) in the lipid fraction of nonproteolyzed corn fiber.

A number of types of protease enzymes are useful in the present invention. For example, Genencor (Palo Alto, Calif.) supplies several types of proteases e.g., Purafect 4000L, Purafect OX 4000L, Genencor Protease 899, Purafect OX-1 2000G, Purafect OxP 2000G, Purafect OxP 4000G; Purafect OXE and Protex 6L. These proteases have wide ranges of activities under which they exhibit maximum activity.

In a preferred embodiment, the protease enzyme contacting step is conducted at a temperature of from about 25° C. to about 120° C. for from about 0.1 h to about 24 h at a pH of from about 4 to about 9. In a further embodiment, the protease enzyme contacting step is conducted at a temperature of from about 60° C. to about 90° C. for from about 1 h to about 12 h at a pH of from about 7 to about 9. In a further embodiment, the destarching step is conducted concurrently with the protease enzyme contacting step.

One of ordinary skill in the art will recognize that selection of reaction conditions for the enzymatic treatments disclosed herein will be dependent upon the specific characteristics of the enzyme utilized and will vary not only among different suppliers, but also from lot to lot within the same supplier. Thus, it is usually necessary to reassess the optimum reaction conditions for the protease enzyme contacting step, as well as any other enzymatic treatments utilized herein, upon receipt of each new supply of enzyme.

Suppliers normally provide useful measurements of enzymatic activity from which the appropriate reaction conditions may be determined.

When corn fiber oil is extracted, the oil extraction techniques discussed herein may be utilized. However, it is particularly preferred that unground, wet corn fiber be extracted with a polar organic solvent to provide an excellent yield of corn fiber oil. Thus, it is preferred that the corn fiber is not dried (or is wet) prior to the organic solvent extraction step. The inventors have surprisingly found that corn fiber may be extracted while still wet from the prior treatments, such as any destarching and proteolysis steps. In a preferred embodiment of this process, the wet corn fiber is unground. One of ordinary skill in the art would recognize that the omission of a drying step greatly improves the industrial applicability of processes such as those herein. In yet a further, still preferred, embodiment, the proteolyzed corn fiber is dried prior to the solvent extracting step.

In a further preferred embodiment, the solvent utilized for the extraction step is a polar organic solvent. In separate embodiments, the polar organic solvent comprises methanol, ethanol, isopropyl alcohol, n-butyl alcohol, acetone, ethyl acetate, methyl isobutyl ketone, methyl ethyl ketone, or a mixture thereof. In a separate, still preferred embodiment, the solvent comprises acetone, isopropyl alcohol, ethyl acetate, or a mixture thereof. It has surprisingly been found that use of a polar organic solvent, in combination with wet, proteolyzed corn fiber, allows efficient extraction of corn fiber oil from unground corn fiber. Thus, in a particularly preferred embodiment, a polar solvent is utilized to extract wet, proteolyzed corn fiber. In a further particularly preferred embodiment, a polar solvent is utilized to extract wet, proteolyzed and unground corn fiber. In a further preferred embodiment, a polar solvent is utilized to extract wet, non-proteolyzed and unground corn fiber.

In another, still preferred, embodiment the solvent utilized to contract the corn fiber oil is a non-polar organic solvent. Useful non-polar organic solvents comprise hexane, heptane, diethyl ether, or a mixture thereof. When a polar organic solvent is used, it is particularly preferred that the corn fiber is dry. In one preferred embodiment, a non-polar solvent is utilized to extract dry, unground corn fiber. In another preferred embodiment, a non-polar solvent is utilized to extract unground corn fiber.

In another preferred embodiment, the solvent extraction step is conducted at a temperature of from about 0° C. to about 115° C. for from about 1 min to about 600 min. In a still further preferred embodiment, the solvent extraction step is conducted at a temperature of from about 20° C. to about 80° C. for from about 10 to about 60 min. Those skilled in the art will recognize that the most preferred temperature will be a temperature slightly below the boiling temperature of the solvent utilized. Further, one of ordinary skill in the art would recognize that a number of techniques can be utilized to extract the corn fiber lipid fraction, including continuous extraction in which the extraction liquid is permitted to flow over the fiber or where the fiber flows counter-current to the extraction liquid, as well as single-batch extractions where the extraction liquid is maintained in contact with the fiber for sufficient time to solubilize the soluble oils. It is particularly preferred that the corn fiber is extracted utilizing a continuous process.

Following the solvent extraction step, the solvent is generally removed from the corn fiber lipid fraction by distillation. In the case were a polar organic solvent with limited water solubility is used for extraction of wet corn fiber, any water layer that may develop can be decanted either before or after the distillation. An example of such an organic solvent with limited water miscibility is EtOAc. When high vacuums (about 0.05 to about 10 mm Hg) and temperatures (about 50° C. to about 200° C.) are coupled with the appropriate equipment, such as falling film or wiped film evaporators, the organic solvent can be removed from the lipid fraction and the lipid fraction can be enriched in phytosterols and phytosterol esters.

A preferred method for separating the phytosterols and phytosterol esters is by crystallization. If desired, unwanted components such as glyceride esters can be separated from the corn fiber lipid fraction by extraction, thereby providing a lipid fraction enriched in phytosterol esters and phytosterols from which the phytosterol esters and phytosterols can be crystallized. In one embodiment unwanted components in the corn fiber lipid fraction are any components not consisting of phytosterols and/or phytosterol esters. Yet further, unwanted components can be removed from the corn fiber lipid fraction by hydrolysis of glyceride esters followed by removal of the hydrolyzed compounds to provide a lipid fraction enriched in phytosterol esters and phytosterols. The phytosterol esters and phytosterols can be isolated from this enriched lipid fraction by crystallization. One of ordinary skill in the art will recognize the methods that may be utilized to perform such separations.

As noted, the corn fiber lipid fraction is preferably separated from the organic solvent solution. Preferably, the organic solvent is separated from the corn fiber lipid fraction via distillation. A preferred distillation method is vacuum distillation. By this preferred vacuum distillation method, the corn fiber lipid fraction may be enriched in phytosterols and phytosterol esters. The corn fiber lipid fraction may be separated from the organic solvent in a distillation process wherein the phytosterols and phytosterol esters are separated with the corn fiber lipid fraction. By "separated with" it is meant that the phytosterols and phytosterol esters are present in the corn fiber lipid fraction.

It is further preferable that the phytosterols and phytosterol esters are separated from the corn fiber lipid fraction in a mixture or as individual fractions. When the phytosterols and phytosterol esters are separated as a mixture, the phytosterols may optionally be separated from the phytosterol esters to provide two fractions: one fraction consisting essentially of a phytosterol and one fractoin consisting essentially of a phytosterol ester.

In a further preferred embodiment, prior to conducting the distillation step, a water layer is separated from the corn fiber lipid fraction/organic solvent solution. Still further, it is preferred that after conducting the distillation step, a water layer is separated from the corn fiber lipid fraction/organic solvent solution.

In a further embodiment, the invention comprises obtaining a yield of corn fiber oil of at least 1.0% as measured by dry weight of corn fiber. In a preferred embodiment, the corn fiber oil is obtained in a yield of about 1.0 wt. % to about 7.0 wt. % based on the dry weight of corn fiber. In a still further preferred embodiment, the corn fiber oil is obtained in a yield of about 3 wt. % to about 5 wt. % based on the dry weight of corn fiber. Still further, the amount of corn fiber oil extracted is from about 2 wt. % to about 3.5 wt. %. The methods herein provide enhanced yields of total extractable corn fiber oil, as well as enhanced yields of phytosterol esters and phytosterols in the corn fiber oil relative to those disclosed in the prior art.

Yet another embodiment comprises conducting at least one additional solvent extraction step, wherein the corn fiber lipid fraction/organic solvent solution from a previous solvent extraction step is reused in the additional solvent extracting step, thereby providing an increasingly concentrated corn fiber lipid fraction/organic solvent solution having phytosterols and phytosterol esters. In this preferred embodiment, organic solvent containing corn fiber oil is recycled for subsequent extractions. The oil becomes increasingly more concentrated with each pass which results in an overall higher concentration of corn fiber oil in the final corn fiber oil/solvent solution. The number of additional extraction steps may range from about 1 to about 100, more preferably from about 2 to about 10. In a particularly preferred embodiment, this solvent recycling step is utilized in conjunction with a continuous extraction process. One of ordinary skill in the art will recognize that such methods greatly improve the industrial applicability of the extraction of corn fiber oil from corn fiber.

In a further aspect, the invention provides a method of extracting a corn fiber lipid fraction having phytosterols and phytosterol esters wherein the method comprises the steps of: a) providing a mixture of unground corn fiber and water; b) separating the liquid from the corn fiber, thereby providing a water wet corn fiber; and c) extracting the water wet corn fiber with at least one polar organic solvent, thereby providing a corn fiber lipid fraction/polar organic solvent solution having phytosterol esters and phytosterols. In this preferred method, corn fiber utilized to obtain corn fiber oil is not treated with a protease enzyme prior to solvent extraction. Still further preferred, the corn fiber is unground. Still preferably, the corn fiber is water wet, wherein the water wet corn fiber contains from about 15 wt. % to about 85 wt. % water based on dry weight of the corn fiber. Yet further preferred, the corn fiber is water wet, wherein the water wet corn fiber contains from about 25 wt. % to about 65 wt. % water based on dry weight of the corn fiber. Since the corn fiber in this embodiment is wet, it is critical to utilize polar organic solvent for the extraction.

With this embodiment, it has been found that when it is not desired to extract additional materials from the corn fiber, it is not necessary to conduct a proteolysis step. With the invention herein it has been found that extraction of corn fiber oil alone from non-proteolyzed corn fiber does not provide an increase in the extraction efficiency of alkaline extraction. Thus, subsequent processing steps, such as alkaline extraction, with this non-proteolyzed corn fiber will be exceedingly slow, as discussed above. Accordingly, this non-proteolyzed corn fiber utilized for corn fiber oil extraction is generally unsuited for further use to obtain other materials from corn fiber as discussed below.

In a next major aspect, the invention provides a method of obtaining a cellulose material from corn fiber, wherein the method comprises the steps: a) heating a mixture of corn fiber and a liquid; b) contacting the mixture of step (a) with a protease enzyme, thereby providing a proteolyzed corn fiber and a liquid; c) separating the liquid from the proteolyzed corn fiber; d) contacting the proteolyzed corn fiber at least once with an alkaline extractant, thereby providing an insoluble cellulose material and a first liquid comprising arabinoxylan; e) separating the insoluble cellulose material from the first liquid comprising arabinoxylan at a temperature of at or above about 60° C.; and f) rinsing the insoluble cellulose material to remove essentially all alkali, thereby providing a cellulose material having a glucose content of at least about 50% and consisting essentially of cellulose I. In a particularly preferred embodiment, the alkaline extractant does not comprise alkaline $H_2O_2$.

In this embodiment, the corn fiber may first be treated by any of the methods disclosed above. However, it is particularly preferred, and even critical in some instances, to utilize a proteolyzed corn fiber for the reasons set forth above. Further, although it is not necessary in order to obtain suitable downstream products, it is preferred that the corn fiber first be solvent extracted to provide a corn fiber oil. One of ordinary skill in the art will recognize that by extracting the corn fiber oil from the fiber prior to alkaline extraction, the number of useful products obtained from corn fiber may be maximized and, thus, the full industrial applicability and value of the invention herein may be realized.

In one embodiment of the alkaline extraction method, from about 1 wt. % to about 50 wt. %, as measured by dry weight of corn fiber, per 100% total volume of liquid is utilized in the alkaline extractant contacting step. In a further embodiment, from about 10 to about 25 wt. %, as measured by dry weight of corn fiber per 100% total volume of liquid is utilized in the alkaline extractant contacting step. Still further, from about 5 wt. % to about 15 wt. %, as measured by dry weight of corn fiber, per 100% total volume of liquid is utilized in the alkaline extractant contacting step. It has been surprisingly found that increasing the solids level results in a lower α purity (% glucose) for the resulting cellulose material. By increasing the alkali concentration, the purity of the cellulose material can be increased. Thus, in a preferred embodiment, when the amount of corn fiber solids in the alkaline extraction step is high, a higher concentration of alkaline extractant is utilized. In a particularly preferred example, when concentration of NaOH is increased, the purity of the cellulose material is increased.

In accordance with one embodiment of the invention herein, the alkaline extractant comprises NaOH, KOH, $Ca(OH)_2$, $NH_4OH$, $CaCO_3$, $K_2CO_3$, $Na_2CO_3$, LiOH, or a mixture thereof at a concentration of from about 0.1 M to about 3.75 M. In a further preferred embodiment, the alkaline extractant comprises NaOH, KOH, or a mixture thereof at a concentration of from about 0.5 M to about 3.0 M, or from 0.5 M to about 2.0 M. Yet still further preferably, the alkaline extractant comprises NaOH at a concentration of from about 0.5 M to about 1.5 M. In a further embodiment, the alkaline extractant contacting step is conducted at from about 60° C. to about 100° C. In yet another embodiment, one extractant contacting step is conducted for from about 0.5 h to about 2 h, the alkaline extractant comprises NaOH, KOH, or a mixture thereof at a temperature of from about 70° C. to about 90° C. Still further preferably, the alkaline extractant contacting step is conducted for less than 2 h, more preferably, for from about 0.5 h to less than 2 h. Further preferably, the alkaline extractant contacting step is conducted for from about 0.5 h to about 1.5 h. Still further preferably, the alkaline extractant contacting step is conducted for a time of from about 1 second to about 4 hours. One of ordinary skill in the art will recognize that the duration of each alkaline extractant contacting step will vary in relation to at least the following factors: a) the concentration of the alkaline material; b) the temperature of the alkaline extractant contacting step; c) the number of alkaline extractant contacting steps; d) the desired purity of the cellulose material; and e) the number and type of any additional processing steps.

Still preferably, the cellulose material is contacted with the alkaline extractant one or more times. In a further, still preferred embodiment, the cellulose material is contacted with the alkaline extractant at least twice. Still further, the alkaline extractant contacting step comprises at least three alkali contacting steps wherein at each step the concentration of alkali is decreased in relation to the step immediately preceding, thereby providing a last alkaline contacting step wherein the pH of the extractant is essentially neutral. In this latter method, the corn fiber is first treated with a high concentration of alkaline extractant, followed by at least one subsequent treatment of a lower concentration alkaline extractant, whereby the final step consists essentially of water wherein the pH of the water is essentially neutral. This method is particularly preferable because it has been found that if the initial concentration of alkaline extractant in the contacting step is fairly high, e.g., greater than about 1.5 M when the alkali is NaOH, most of the arabinoxylan can be removed from the corn fiber to provide a liquid comprising arabinoxylan. In a preferred embodiment, subsequent alkaline extractions may be conducted to remove any residual arabinoxylan from the cellulose material as discussed below.

It is preferred that at least the alkaline extractant contacting step is conducted in a continuous process. However, it is particularly preferable that all the steps according to the processes herein are conducted in continuous processes in order to increase the industrial applicability of the invention herein. In a further embodiment the number of alkaline extractant contacting steps is from about 2 to about 200. In yet a further preferred embodiment, the cellulose material obtained from corn fiber is contacted with the alkaline extractant from about 1 to about 100 times, still preferably, from about 5 to about 50 times, still further preferably, the cellulose material is contacted with the alkaline extractant from about 5 to about 25 times, or further preferably, from 5 to 10 times.

One example of the preferred continuous process is a belt filter process, wherein the proteolyzed corn fiber is applied to a moving belt. In one embodiment, the alkaline extractant is applied at the beginning of the belt while simultaneously applying a vacuum to remove the alkaline extractant that makes up the liquid comprising arabinoxylan. At the first end of the moving belt, strong alkaline solutions are applied, with weaker solutions being applied as the length of time on the belt increases. Under these conditions, as the destarched corn fiber reaches a second end of the moving belt, only hot (i.e., >60° C.) water with an essentially neutral pH is applied. Thus, the destarched corn fiber is exposed to multiple contacting steps with diminishing alkaline extractant strength, thereby providing an essentially arabinoxylan-free cellulose material for further processing.

One of ordinary skill in the art will recognize that it may be useful to collect the individual alkaline extractants when multiple alkaline extractant contacting steps are conducted in order to maximize the amount of arabinoxylan obtained. However, it will also be recognized that the amount of extracted arabinoxylan in the alkaline extractant may be low in subsequent extractions. Thus, in accordance with the methods herein, subsequent alkaline extractions with low or very low arabinoxylan concentrations may not be collected with earlier alkaline extractants in order to lessen the amount of liquid entering into the volume reducing step that will, of course, need to be removed in the volume reducing step.

In one particularly preferred embodiment relating to the continuous process, a first alkaline extractant contacting step comprises NaOH, KOH, or a mixture thereof at a concentration of from about 0.1 M to about 1.5 M and a final alkaline extractant contacting step consists essentially of water of water, wherein the pH of the water is essentially neutral. Still further the concentration of alkaline extractant in the preferred continuous process is from 0.1 to about 3.75 M, still further, from about 0.1 to about 3.0 M, yet still further, from about 0.1 to about 2.0 M. Moreover, using this preferred continuous process throughout the invention herein, any subsequent treatment steps i.e., alkaline $H_2O_2$ bleaching, acid rinsing or xylanase enzyme treatment, as set out in more detail below, may be efficiently conducted.

With the invention herein, it has been surprisingly discovered that it is possible to obtain high purity cellulose from corn fiber. In particular, it has been found possible to generate cellulose suitable for derivatization utilizing the methods herein. Accordingly, in a particularly preferred embodiment, the cellulose material has a glucose content of above about 80% and consists essentially of cellulose I.

With the invention herein, it has been found that if the temperature of the alkaline extractant contacting step and any subsequent contacting steps is allowed to fall below about 60° C., a significant amount of the cellulose I will be transformed into unreactive cellulose II. One of ordinary skill in the art will recognize that derivatization of cellulose under normal conditions will usually occur only if the cellulose material is present as cellulose I. Thus, in order to obtain cellulose material suitable for derivatization, it is critical with the methods herein that the alkaline extractant contacting step takes place at a temperature of at or above at least about 60° C. Further, if it is desired to utilize the cellulose material for derivatization, it is critical to perform all subsequent steps, including that of filtering the alkaline extractant (if in the presence of the insoluble cellulose material), at a temperature at or above 60° C. in order to retain the morphology of the cellulose material as cellulose I with a glucose content of equal to or greater than about 80%. A preferred temperature range for treatment of the cellulose material to preserve derivatizability is from about 70° C. to about 85° C. One unexpected benefit of processing the cellulose material at equal to or greater than 60° C. is that the viscosity of the arabinoxylan extract (liquid comprising arabinoxylan and concentrated liquid) is significantly reduced.

In one preferred embodiment of the invention herein, the cellulose is at least 80% cellulose I and, more preferably, at least 85% cellulose I, still more preferably 90%, and, even more preferably, 95% cellulose I. As noted, it is preferable to wash the cellulose fiber with sufficient water that is at or above about 60° C. to remove most, if not all, of the alkaline extractant before allowing the cellulose fiber to cool in order to maintain the preferred cellulose I morphology. Optionally, the water can contain about 0.1 wt. % to about 30 wt. % acetic acid or other acid, which will serve to neutralize any residual alkaline material. Further, in accordance with this invention, it is preferred the cellulose material should not be allowed to cool below about 60° C. between the various steps for the reasons noted above.

When cellulose I is not required, such as when the corn fiber cellulose is intended for applications such as paper making, it is not necessary that the steps subsequent to alkaline extraction be conducted at a temperature of at or above about 60° C. in order to maintain cellulose I morphology. This is due to the fact that such cellulose need not be particularly reactive and, accordingly may be of relatively unreactive cellulose II morphology. In this case, the filtration of the alkaline extractant can be conducted in the temperature range of from about 20° C. to about 90° C., with about 25° C. to about 50° C. being the more preferred temperature range. Also, for applications such as paper, the cellulose may have a lower glucose content. A preferred range is from about 50% to about 80%, with from about 60% to about 75% being the more preferred range. However, as noted, elevated temperatures will greatly aid in reducing the solution viscosity of the arabinoxylan extract.

With the invention herein, it has been found possible to further increase the purity of cellulose obtained by subjecting the insoluble cellulose material to further treatments. In one embodiment, it is preferable to first rinse the cellulose material with sufficient water that is at a temperature of at or above about 60° C. In a further, still preferred embodiment, the cellulose material is not rinsed prior to subsequent treatments.

In particular, it has been found that when the cellulose material obtained from corn fiber is contacted at least once with an alkaline bleaching agent after the alkaline material contacting step, the glucose content of the cellulose material may be increased. In a particularly preferred embodiment, the bleaching agent comprises alkaline $H_2O_2$.

Further, it has been found to be critical that, when an alkaline $H_2O_2$ is utilized as the bleaching agent, the $H_2O_2$ must be applied in a step separate from the alkaline extractant contacting step. Specifically, any alkaline $H_2O_2$ treatment must be conducted after the alkaline extraction contacting step and after the liquid comprising arabinoxylan has been separated from the cellulose material. It has been found that subjecting the corn fiber to an alkaline $H_2O_2$ step without first conducting an alkaline extraction contacting step and separating the alkaline extractant, such as in the methods disclosed in WO 98/40413 (Doner et al.), results in lower molecular weight arabinoxylan polymers being obtained. Moreover, extraction of the corn fiber in this manner is very dangerous to practice on an industrial scale because the heating of alkaline $H_2O_2$ causes vigorous frothing and foaming and, thus, may cause severe injuries and damage if extreme caution is not practiced. The methods of the present invention do not cause such hazards and are therefore more practicable on an industrial scale. Accordingly, in a particularly preferred embodiment of the invention herein, it is critical to separate the liquid comprising arabinoxylan from the cellulose material prior to contacting the cellulose material with the alkaline $H_2O_2$ bleaching agent.

Further, as set forth in the Examples herein, if the corn fiber is not subjected to an alkaline extractant contacting step of greater than about 60° C. prior to the alkali $H_2O_2$ step, reaction grade cellulose is not obtained. Therefore, it is believed that the methods of Doner et al. do not allow one to obtain corn fiber suitable for derivatization.

In one embodiment, the alkaline extracted cellulose material is contacted with the alkaline $H_2O_2$ bleaching agent for from about 5 to about 120 minutes at a temperature of from about 25° C. to about 60° C. In a further preferred embodiment, the concentration of the alkaline $H_2O_2$ is from about 1 wt. % to about 50 wt. %, further preferably, from about 20 wt. % to about 40 wt. %, and, even more preferably, from about 25 wt. % to about 35 wt. %. The pH of the alkaline $H_2O_2$ is preferably from about 12 to about 14, and the temperature is preferably from about 25° C. to about 100° C. If extreme caution is practiced, the alkaline bleaching step may be conducted at from about 60° C. to about 100° C. or at from about 25° C. to about 100° C. or from about 60° C. to about 80° C.

In a still further preferred embodiment, the concentration of the alkaline $H_2O_2$ is from about 0.5 M to about 5.0 M and the pH is greater than about 10. When expressed as molar equivalents, the preferred amount of alkaline $H_2O_2$ is from about 0.1 to about 20 equivalents, with about 1 to about 4 equivalents being particularly preferred. In a further preferred embodiment, when lower purity cellulose material i.e., between about 50% to about 80% glucose is obtained from one or more alkaline extractant contacting steps, it is possible to further increase the purity of the cellulose material to greater than about 80% by treating this cellulose material with alkaline $H_2O_2$.

In a further preferred embodiment, the cellulose material is subjected to at least one alkaline $H_2O_2$ treatment. In yet a further preferred embodiment, the cellulose material is subjected to more than one alkaline $H_2O_2$ treatment. When the cellulose material is subjected to one or more alkaline $H_2O_2$ treatments, it is critical to first separate the liquid comprising arabinoxylan from the cellulose material before conducting the first $H_2O_2$ bleaching.

Yet still further, the alkaline extracted cellulose material from step (f) may be contacted at least one more time with an alkaline extractant and the cellulose material so treated may be treated with alkaline $H_2O_2$ at a concentration of from about 0.5 M to about 4.0 M for about 5 to about 120 minutes, thereby providing a cellulose material suitable for derivatization. Again, it is necessary to separate at least the first alkaline extractant from the cellulose fiber prior to conducting the alkaline $H_2O_2$ treatment. Still further, the cellulose material is contacted with the alkaline extractant at least two additional times, thereby providing at least one additional liquid comprising arabinoxylan. In a further preferred embodiment, at least one additional alkaline extractant is added to the first liquid comprising arabinoxylan. In a further preferred embodiment, the cellulose material is contacted with the alkaline extractant from about 2 to about 100 additional times, preferably in a continuous method.

In yet a further preferred method of increasing the purity of the cellulose material obtained from corn fiber, the cellulose material is contacted with a xylanase enzyme after the alkaline material contacting step for a time and at a temperature suitable to increase the purity of the cellulose material. In a preferred method, the xylanase enzyme contacting step is conducted at a temperature of from about 25° C. to about 100° C. for from about 0.1 h to about 24 h. Still further, the xylanase enzyme contacting step is conducted at a temperature of from about 50° C. to about 80° C. for from about 1 h to about 4 h at a pH of from about 4 to about 9. In accordance with the methods herein, in one embodiment, it has been found preferable to subject the alkaline extractant and xylanase treated material to one or more subsequent additional alkaline extractant contacting steps, along with one or more optional alkaline $H_2O_2$ bleaching steps.

The xylanase enzymes preferred for use in this invention are substantially free of cellulase activity. The xylanase enzymes that fall within this description are available from a number of sources (such as Genencor, Palo Alto, Calif.) and exhibit a wide range of activity and conditions under which they exhibit maximum activity. Again, one of ordinary skill in the art will recognize that the exact conditions utilized for this and the other enzymatic treatments herein will depend on the characteristics of the particular enzyme utilized.

In a further preferred method of increasing the purity of the cellulose material obtained from corn fiber, after treating the corn fiber at least once with an alkaline extractant, the alkaline extracted corn fiber is subjected to at least one acid rinsing step. In one embodiment, the acid is an organic acid. In a further embodiment, the acid in the acid rinse is in an amount of from about 10 wt. % to about 95 wt. % acetic acid. Still further, the acid in the acid rinsing step may be an inorganic acid. In yet another embodiment, the acid in the acid rinsing step is in an amount of from about 10 wt. % to about 20 wt. % of a sulfuric acid solution. In a further embodiment, the acid rinsing step is conducted at from about 60° C. to about 100° C. The acid rinsing treatment may optionally be followed by an alkaline bleaching step. Thus, in a further embodiment, the acid rinsing step is added between the alkaline extractant contacting step and prior to the at least one treatment with alkaline $H_2O_2$.

In a further major aspect, the invention provides a method of making cellulose derivatives from corn fiber. In one embodiment, the cellulose material has been subjected to at least one alkaline extractant contacting step. In a further embodiment, the corn fiber cellulose utilized to prepare the cellulose derivatives has been subjected to at least one alkaline material contacting step, followed by at least one alkaline $H_2O_2$ bleaching step. Still further, it is preferred that the cellulose utilized to prepare the cellulose derivatives has been subjected to at least one alkaline extractant step, followed by at least one acid contacting step followed by at least one alkaline $H_2O_2$ bleaching step. Yet still further, it is preferred that the cellulose material has been subjected to at least one alkaline extractant contacting step, followed by at least one xylanase enzyme contacting step, then followed by at least one alkaline $H_2O_2$ bleaching step. In a particularly preferred embodiment, the cellulose material utilized to prepare the cellulose derivatives has been subjected to at least two alkaline material steps, followed by at least one alkaline $H_2O_2$ bleaching step. In separate, still preferred embodiments, the cellulose material may be treated in any order with one or more alkaline $H_2O_2$ contacting steps, one or more acid contacting steps and/or one or more xylanase enzyme contacting steps, provided that the cellulose material is obtained from proteolyzed corn fiber subjected to at least one alkaline extractant contacting step, and when the subsequent treatment is with alkaline $H_2O_2$, the alkaline extractant is separated from the cellulose material prior to the performing of any additional steps.

In one embodiment, the invention provides a method of making cellulose esters from corn fiber. In a further embodiment, the invention provides a method of making cellulose ethers from corn fiber.

In one embodiment of the method of obtaining cellulose esters from corn fiber, the method comprises contacting the cellulose material obtained according to the methods described above with a C1 to C10 esterifying agent, preferably in the presence of a catalyst, thereby providing a cellulose ester. Prior to performing the esterification reaction, the cellulose material may optionally be subjected to at least one additional alkaline extractant contacting step, an alkaline $H_2O_2$ bleaching step, a xylanase enzyme contacting step, or a mixture of any of these steps in any combination, provided that at least one alkaline extractant contacting step is conducted first and the first liquid comprising arabinoxylan is removed from the cellulose material prior to the conducting of any subsequent alkaline $H_2O_2$ bleaching step. A hot water (>60° C.) rinsing step may optionally be conducted after the first alkaline extraction step and/or between any subsequent treatment steps.

In a preferred embodiment, the esterifying agent comprises a C1 to C10 acyl anhydride, acyl acid, acyl halide, or a mixture thereof. Still further, it is preferable that the esterifying agent comprises formic anhydride, acetic anhydride, propionic anhydride, butyric anhydride, or a mixture thereof. Yet still further, it is preferable that the esterifying agent comprises acetic anhydride, propionic anhydride or butyric anhydride.

In one embodiment, the cellulose esters are prepared utilizing $H_2SO_4$ as a catalyst. In a further embodiment, the cellulose esters are prepared utilizing TFAA (trifluoroacetic acid) or MSA (methane sulfonic acid), or a mixture thereof as a catalyst.

In one embodiment, it is particularly preferable that the cellulose esters be prepared from corn fiber cellulose material that has been subjected to at least one alkaline extractant contacting step, followed by bleaching with alkaline $H_2O_2$. With use of the high purity cellulose obtained, it is possible to prepare high molecular weight cellulose esters. Generally, it is believed that higher molecular weight cellulose esters may be obtained when TFAA or MSA is utilized because this material degrades the cellulose material less than does $H_2SO_4$. Further, TFAA and MSA are believed to be more effective in esterifying non-glucose monomers and solubilizing any low molecular weight polymers present in the cellulose obtained from corn fiber.

As noted, in the preferred methods of the invention, the cellulose is preferably maintained as about 80% or greater in cellulose I. Therefore, it is not necessary to conduct a classical activation of the cellulose in order to prepare the derivatives herein. One of ordinary skill in the art will recognize specific methods to prepare cellulose esters; accordingly, such methods are not described in detail herein. Methods to prepare cellulose esters that are suitable for use herein are described generally in U.S. Pat. Nos. 1,698,049, 1,683,347, 1,880,808, 1,880,560, 1,984,147, 2,129,052, and 3,617,201; the disclosures of each of these patents are incorporated herein by this reference in their entireties.

In a further embodiment of the invention herein, the cellulose esters obtained from corn fiber comprise cellulose formate, cellulose acetate, cellulose propionate, cellulose butyrate, cellulose formate acetate, cellulose formate propionate, cellulose formate butyrate, cellulose acetate propionate, cellulose acetate butyrate, or a mixture thereof. Yet still further, the cellulose esters comprise cellulose acetate, cellulose acetate propionate or cellulose acetate butyrate, or a mixture thereof. It is preferred that the cellulose esters obtained according to the methods herein have DS/AGU's of from about 0.1 to about 3.0. Still further, it is preferred that the cellulose esters obtained according to the methods herein have DS/AGU's of from about 1.7 to about 2.75. Still further, it is preferable that the cellulose esters have inherent viscosities of from about 0.001 to about 3.0.

In a further embodiment, it is preferred that prior to esterification, the cellulose material be subjected to at least one additional alkaline extractant step, followed by at least one treatment with alkaline $H_2O_2$. If an alkaline $H_2O_2$ bleaching step is utilized, the $H_2O_2$ is preferably at a concentration of from about 0.5 to about 4.0 M for about 5 to about 120 minutes. Further preferably, prior to esterification, the cellulose material is contacted with an acid rinse after the alkaline extractant contacting step. Still further, prior to esterification, the alkaline extracted cellulose material is treated with a xylanase enzyme.

In one embodiment of the method of obtaining cellulose ethers from corn fiber, the method comprises contacting the cellulose material obtained from the methods described above with an O-alkylating agent, thereby providing a cellulose ether. Prior to performing the etherification reaction, the cellulose material may optionally be subjected to at least one additional alkaline extractant contacting step, an alkaline $H_2O_2$ bleaching step, a xylanase enzyme contacting step, or a mixture of any of these steps in any combination, provided that at least one alkaline extractant contacting step is conducted first and the liquid comprising arabinoxylan is removed from the cellulose material prior to the conducting of any subsequent alkaline $H_2O_2$ bleaching step. A hot water (>60° C.) rinsing step may optionally be conducted after the first alkaline extraction step and/or between any subsequent treatment steps.

In a preferred embodiment of this method, the O-alkylating agent comprises alkylene oxide, aryl substituted alkylene oxide, halogen substituted alkylene oxide, alkyl halide, hydroxyalkyl halide, aryl alkyl halide, carboxyalkyl halide, (alkyloxycarbonyl)alkyl halide, allyl halide, vinyl halide, alkyl sulfonate, hydroxyalkyl sulfonate, aryl alkyl sulfonate, carboxyalkyl sulfonate, (alkyloxycarbonyl) alkyl sulfonate, allyl sulfonate, or a mixture thereof. Still further preferably, the O-alkylating agent comprises ethylene oxide, propylene oxide, butylene oxide, epoxybutene, amylene oxide, glycidol, styrene oxide, epichlorohydrin, methyl chloride, methyl iodide, methyl bromide, ethyl bromide, propyl bromide, butyl bromide, propyl methyl sulfonate, methyl chloroacetic acid, ethyl chloroacetic acid, sodium chloroacetate, chloroacetic acid, benzyl bromide, 1-N,N-dialkylamino-2-chloroethane, or a mixture thereof. Yet still further, the O-alkylating agent comprises ethylene oxide, propylene oxide, epoxybutene, methyl chloride, ethyl bromide, sodium chloroacetate, or a mixture thereof. In a particularly preferred embodiment, the O-alkylating agent is epoxybutene.

In further preferred embodiments, the cellulose ethers preferred according to the methods herein have a DS/AGU of from about 0.01 to about 3.0. In a still further preferred embodiment of the invention herein, the cellulose ethers have a DS/AGU of from about 0.3 to about 2.2. Yet still further, the cellulose ethers prepared according to the methods herein have MS/AGU's of from about 0.01 to about 100. More preferably, the cellulose ethers prepared according to the methods herein have MS/AGU's of from about 0.1 to about 5.

In a further embodiment, it is preferred that prior to etherification, the cellulose material be subjected to at least one additional alkaline extractant step, followed by at least one treatment with alkaline $H_2O_2$. If an alkaline $H_2O_2$ treatment is provided, the treatment is preferably conducted at a concentration of from about 0.5 to about 4.0 M at a time of from about 5 to about 120 minutes. Further preferably, prior to etherification, the cellulose material is contacted with an acid rinse after the alkaline extractant contacting step. Still further, prior to etherification, the alkaline extracted cellulose material is treated with a xylanase enzyme.

In a further major embodiment, the invention relates to a method of extracting arabinoxylan from corn fiber wherein the method comprises the steps of: (a) heating an aqueous mixture of corn fiber and a liquid; (b) contacting the mixture of step (a) with a protease enzyme, thereby providing a proteolyzed corn fiber and a liquid; (c) separating the liquid from the proteolyzed corn fiber; (d) contacting the proteolyzed corn fiber at least once with an alkaline extractant, thereby providing an insoluble cellulose material and a liquid comprising arabinoxylan; (e) separating the insoluble cellulose material from the liquid comprising arabinoxylan; and (f) reducing the volume of the liquid comprising arabinoxylan by removing excess alkaline extractant, thereby providing a concentrated liquid wherein the liquid comprises from about 10% to about 50% solids and wherein the solids comprise arabinoxylan. In a further embodiment, the alkali utilized in the alkaline extractant contacting step is not alkaline $H_2O_2$.

The proteolyzed corn fiber utilized in this aspect of the invention may be destarched and/or solvent extracted as disclosed above. In one embodiment, the alkaline extractant comprises the alkaline material utilized in the methods disclosed above. Further, the corn fiber cellulose may be subjected to one or more alkaline $H_2O_2$ bleaching, acid rinses and/or xylanase enzyme treatments also as disclosed above.

In a particularly preferred embodiment, in conjunction with the alkaline extraction step, the insoluble cellulose material is separated from the liquid comprising arabinoxylan at a temperature of at or above about 60° C. In accordance with the methods herein, it has surprisingly been found that by maintaining the temperature of the liquid comprising arabinoxylan at or above about 60° C., the viscosity of the liquid comprising arabinoxylan (and the concentrated liquid) may be lowered substantially. This lower viscosity significantly increases the processability of the liquid comprising arabinoxylan (and the concentrated liquid). Further, as discussed in more detail above, if the alkali extracted cellulose material is to be utilized for derivatization, it is also particularly preferred that the cellulose material be separated from the alkali extractant comprising arabinoxylan at a temperature of at or above about 60° C.

Further, according to the methods herein, it has surprisingly been found that extraction of the arabinoxylan from unground corn fiber can be accomplished in less than about 2 h, more preferably, less than 1 h. It is believed that such results result because temperatures of above 60° C. are utilized herein. Significantly, such elevated temperatures are not generally possible with methods that utilize alkaline $H_2O_2$ to extract arabinoxylan because of the hazards associated with heating alkaline $H_2O_2$ to over 60° C. Thus, prior art methods incorporating $H_2O_2$ to extract arabinoxylan generally utilize lower temperatures and, as such, require longer processing times to suitably extract cellulose from corn fiber. Further, with the methods herein, extraction of arabinoxylan at temperatures greater than about 60° C. at times less than 2 hours provided yields of arabinoxylan greater than about 25 wt. %, as measured by dry weight of corn fiber. Moreover, it has also been found that the arabinoxylan obtained according to the methods herein is not off-white, but is essentially white, with little or no "off color."

In a further preferred embodiment, the liquid comprising arabinoxylan is subjected to a vacuum distillation step concurrently with the volume reducing step. In accordance with the methods herein, prior to precipitation of the arabinoxylan, it has been found to be critical in some circumstances to concentrate the liquid comprising arabinoxylan to from about 10 wt. % to about 80 wt. % solids and, more preferably, from about 40 wt. % to about 60 wt. % solids. In a particularly preferred embodiment, the solids level of the concentrated liquid is from about 10 wt. % to about 50 wt. %. Still further, the solids level is greater than about 15 wt. %. In a further embodiment, the solids level is from about 15 wt. % to about 50 wt. %. In a further, still preferred embodiment, the solids level of the concentrated liquid is from about 20 wt. % to about 50 wt. %.

In one particularly preferred embodiment, the liquid comprising arabinoxylan is concentrated by heating the liquid under vacuum while providing an airflow to the surface of the solution being concentrated. By utilizing this method, foaming of the solution can be minimized. In another preferred embodiment, the pH of the liquid comprising arabinoxylan can be adjusted to from about 4.5 to about 5.0 before concentration of the liquid comprising arabinoxylan. By this method, foaming of the solution can also be minimized or eliminated.

The volume reduction of the liquid comprising arabinoxylan may be conducted in any number of ways known to one of ordinary skill in the art, such as by simple distillation or by steam purging while continuously conveying the extracted arabinoxylan solution. In a particularly preferred embodiment, the volume reducing step may be conducted via ultrafiltration. It is preferred that the alkaline extractant be removed from the liquid comprising arabinoxylan concurrently with an ultrafiltration volume reducing step. In this method, the liquid comprising arabinoxylan is conveyed through an arabinoxylan-rejecting membrane. The arabinoxylan will thus remain on one side of the membrane, while at least some liquid comprising alkaline material will be conveyed through the membrane. As a result, the liquid comprising arabinoxylan will become increasingly more concentrated as the process proceeds, thereby providing the concentrated liquid. One of ordinary skill in the art will recognize the methods that may be utilized to select the appropriate membrane and to perform the ultrafiltration methods.

In a further preferred embodiment, a precipitation agent is added to the concentrated liquid, thereby providing a precipitate consisting essentially of arabinoxylan. In a particularly preferred embodiment, the precipitation agent comprises acetic acid or propionic acid. Even more preferably, the precipitation agent is acetic acid. Still further preferably, the separating and volume reducing steps are each conducted at a temperature of at or above about 60° C., the volume reducing step takes place at a pH of above about 4.5 and the precipitation agent comprises acetic acid.

In a preferred embodiment, the precipitation agent comprises from about 0.1 to about 6.0 volumes of acetic acid based upon the weight of arabinoxylan in the concentrated liquid and wherein the acetic acid and the concentrated liquid are each at a temperature of from about 0° C. to about 60° C. or, still preferably, from about 20° C. to about 30° C. when the acetic acid is added to the concentrated liquid. Still further preferably, the precipitation agent comprises from about 1.0 to about 3.0 volumes of acetic acid based upon the weight of arabinoxylan in the concentrated liquid and wherein the acetic acid and the concentrated liquid are each at a temperature of from about 0° C. to about 60° C., or still preferably, are each at a temperature of from about 20° C. to about 30° C., when the acetic acid is added to the concentrated liquid. Yet further preferably, the temperature of the precipitation agent and the concentrated liquid are nearly the same at the time of adding the acetic acid.

It has been surprisingly found that when acetic acid is utilized as the precipitation agent, arabinoxylan of an especially white color (or comprising a low yellow index) can be obtained. Since it is especially desirable to obtain a white arabinoxylan precipitate for certain applications, in a particularly preferred example, acetic acid is utilized as the precipitation agent, thereby providing an essentially white powder. One of ordinary skill in the art will recognize the methods utilized to measure whiteness (or lack of color). It has been determined that with the methods of the present invention it is possible to prepare an arabinoxylan that is suitable for applications requiring a white powder or applications involving solutions of the arabinoxylan having little color. It has also been found that it is possible to prepare low color arabinoxylan solutions that have very little taste, a quality which is beneficial for food and pharmaceutical applications.

In separate embodiments, the acetic acid may be added to the concentrated liquid in at least two ways. First, the acetic acid can be added cold. Addition of cold acetic acid results in a rapid precipitation of the arabinoxylan. While this rapid precipitation is believed to cause the arabinoxylan to have a higher salt content, for those applications where arabinoxylan salt content is not relevant, this method may be preferred. In the second, more preferred, method of acetic acid addition, room temperature acetic acid is added to the concentrated liquid, wherein the concentrated liquid may be at a temperature of at or below about 60° C. This results in a slower precipitation of arabinoxylan which results in a markedly lower salt content in the arabinoxylan. Preferably, the temperatures of the precipitation agent and the concentrated liquid are nearly the same at the time of precipitation and the temperature of both components is from about 20° C. to about 30° C. It is particularly preferred that the temperature of both the concentrated liquid and the acetic acid are each at a temperature of from 0° C. to below about 60° C. Still further preferably, the temperature of both the concentrated liquid and the acetic acid are each at a temperature of from 20° C. to about 40° C.

Further, with the invention herein, it has been found that when acetic acid is added slowly and, consequently, the pH of the concentrated liquid is lowered more slowly, it is possible to separate out two components from the concentrated liquid. The first (and minor) component is hemicellulose A. This hemicellulose A material precipitates at approximately pH 4.5. As used herein, the term "hemicellulose A" means that portion of corn fiber arabinoxylan that, once precipitated and dried, is not soluble in water at acidic or neutral pH. Specifically, in order to redissolve the hemicellulose A, the pH must be adjusted to at least pH 12 to 13. Furthermore, hemicellulose A is characterized by having a high glucose content (greater than about 20%) and a low molecular weight (less than about 20,000). The second (and major) component that precipitates from the concentrated liquid is hemicellulose B. Hemicellulose B contains little glucose (from about 2% or less) and is fully water soluble (even after drying) in water at a full range of pH's i.e., from acid to alkaline.

In one embodiment, hemicellulose A is first precipitated and removed from the concentrated liquid during the precipitation step, thereby providing a concentrated liquid, wherein the arabinoxylan consists essentially of hemicellulose B. In yet a further embodiment, the hemicellulose B is precipitated from the concentrated liquid, thereby providing an arabinoxylan precipitate consisting essentially of hemicellulose B. In a further preferred embodiment, the average weight molecular weight of the arabinoxylan is greater than 300,000.

As discussed further below, the type of arabinoxylan utilized affects the preparation of arabinoxylan derivatives. Therefore, in one particularly preferred example, hemicellulose A is separated from the concentrated liquid during a precipitation step, thereby providing an arabinoxylan consisting essentially of hemicellulose B. In a further preferred example, the arabinoxylan precipitate comprises less than about 8% of hemicellulose A. Still further, hemicellulose A may first be precipitated and removed from the concentrated liquid thereby providing a second concentrated liquid, wherein the second concentrated liquid consists essentially of hemicellulose B. It is further preferred that the hemicellulose B be separated from the second concentrated liquid.

In yet a further preferred embodiment, the precipitation agent comprises acetic acid at a concentration of from about 0.1 wt. % to about 25 wt. %, based upon the weight of arabinoxylan in the concentrated liquid, wherein the acetic acid and the concentrated liquid are each at a temperature of from about 20° C. to about 60° C., or from about 20° C. to about 35° C., thereby providing an arabinoxylan precipitate with an inorganic salt content of less than about 5.0% as measured by dry weight of the arabinoxylan. In a still further preferred embodiment, the precipitation agent comprises acetic acid at a concentration of from about 1.0 to about 6.0 volumes or from about 1.0 to about 3.0 volumes of acetic acid, based upon the weight of arabinoxylan in the concentrated liquid, wherein the acetic acid and the concentrated liquid are each at a temperature of from about 20° C. to about 60° C., or from about 20° C. to about 35° C., thereby providing an arabinoxylan precipitate with an inorganic salt content of less than about 5.0% as measured by dry weight of the arabinoxylan. The amount of salt in the arabinoxylan may also be reduced according to the preferred ultrafiltration concentration method discussed above.

Use of acetic acid as a precipitation agent provides the added benefit of reducing foaming of the liquid comprising arabinoxylan that may occur during the volume reducing step. The organic salt that forms, such as sodium acetate, is not isolated with the precipitated arabinoxylan to any significant extent. In an alternate embodiment, when the amount of salt in the arabinoxylan is not important, foaming of the liquid comprising arabinoxylan may be minimized by the addition of an inorganic acid, such as HCl or $H_2SO_4$. Acidification of the liquid comprising arabinoxylan with these acids leads to the formation of inorganic salts, which are not generally removed from the arabinoxylan during precipitation or washing. Thus, addition of inorganic acids is normally not preferred unless salt content of the arabinoxylan is unimportant.

In a further embodiment, with respect to the concentrated liquid, hemicellulose A may be separated from hemicellulose B concurrently with the volume reducing step by utilizing ultrafiltration. One of ordinary skill in the art will recognize that a specifically selective membrane may be utilized which allows the lower molecular weight hemicellulose A to pass through the membrane, but does not allow the higher molecular weight hemicellulose B to flow through the membrane. As a result of this ultrafiltration separation method, it is possible to cleanly separate hemicellulose B with minimal concern about inorganic salt content. In a particularly preferred embodiment, the alkaline extractant is removed from the liquid comprising arabinoxylan concurrently with the ultrafiltration volume reducing step. The hemicellulose A and B obtained according to this ultrafiltration separation method are preferably identical in characteristics to the hemicellulose obtained according to the precipitation methods discussed herein. However, it is noted that when the ultrafiltration hemicellulose separation method is utilized, any inorganic salts in the separated hemicellulose may be maintained at significantly less than about 5.0 wt. %. This allows the at least three or less molecular weight fraction materials to be separated from the concentrated liquid without performing a separate precipitation step. In a further embodiment, the arabinoxylan may be separated directly from the liquid comprising arabinoxylan via ultrafiltration as a mixture of both hemicellulose A and B without first needing to perform a volume reducing step.

In the practice of this invention, it is found that the arabinoxylan obtained by the methods disclosed herein is different in structure, molecular weight, and physical properties than the hemicelluloses disclosed in the prior art, for example, in Glasser et al. (U.S. Pat. No. 5,430,142). Characterization of the hemicelluloses of Glasser et al. have been reported by Glasser (U.S. Pat. No. 5,430,142) and by Gabrielii ("Hydrogels based on hardwood hemicelluloses" Licentiate thesis, Chalmers University of Technology, Goteborg, Sweden. ISBN 91-7197-697-3).

The hemicellulose of Glasser is a xylan comprised almost exclusively of xylose with small amounts of uronic acid side chains (approximately 1 per 8 xylose residues). The molecular weight was reported to be less than 100,000, as determined according to the methods in the Glasser reference. Furthermore, the hemicellulose of Glasser was reported to be soluble only in aqueous alkali of a pH greater than approximately 10. In contrast, as is set out herein, the arabinoxylan of the present invention is substantially branched, in which the branches are comprised of xylose, arabinose, galactose, glucouronic acid, and 4-O-methyl glucouronic acid or a mixture thereof. Further, the arabinoxylan of the present invention has a weight-average molecular weight of greater than about 300,000 and is soluble in water at a pH of from about 1 to about 14.

As for the differences, analyses indicate that the corn fiber-derived arabinoxylan obtained according to the methods herein is different from the hemicellulose obtained according to the methods disclosed in the prior art, for example, the method of Glasser et al. measured according to the methods herein (U.S. Pat. No. 5,430,142). That is, analyses performed according to the invention herein indicate that the hemicellulose of Glasser et al. is comprised of at least 4 to 5 molecular weight fractions, as measured by gel permeation chromatography. Further, analyses have shown that the arabinoxylan of Glasser et al. has a molecular weight of less than about 250,000 as measured according to the methods herein. Accordingly, the arabinoxylan obtained from corn fiber according to the methods herein has a much higher molecular weight than the hemicellulose disclosed in the prior art. Further, it is believed that the extraction techniques utilized to obtain the arabinoxylan will significantly affect the molecular weight of the arabinoxylan obtained. Accordingly, it is believed that the arabinoxylan obtained by the methods herein has not before been extracted. As such, products made by the processes herein are believed to be novel.

In a further embodiment, arabinoxylan in the liquid comprising arabinoxylan and the concentrated liquid consists essentially of at least two but less than four molecular weight fractions as measured by gel permeation chromatography. Still further, the arabinoxylan in the liquid comprising arabinoxylan and the concentrated liquid consists essentially of exactly three molecular weight fractions as measured by gel permeation chromatography.

Based upon the above, it is preferred that at least about 92% of the arabinoxylan in the concentrated liquid, as well as that in the liquid comprising arabinoxylan, has a weight-average molecular weight of from about 300,000 to about 2,000,000. In a further preferred embodiment, at least about 92% of the arabinoxylan in the concentrated liquid and the liquid comprising arabinoxylan has a weight-average molecular weight of from about 400,000 to about 700,000. In a further preferred embodiment, at least about 92% of the arabinoxylan in the concentrated liquid and the liquid comprising arabinoxylan has a weight-average molecular weight of greater than about 300,000. In an alternate, still preferred embodiment, the arabinoxylan separated from the concentrated liquid and the liquid comprising arabinoxylan, whether by precipitation, by ultrafiltration or some other method, consists essentially of hemicellulose B and this hemicellulose B has a weight average molecular weight of greater than about 300,000. In a particularly preferred embodiment, the arabinoxylan separated from the concentrated liquid (or directly separated from the liquid comprising arabinoxylan) comprises less than about 8% of hemicellulose A.

In a further embodiment, it is preferred that the arabinoxylan in the concentrated liquid and the liquid comprising arabinoxylan is comprised of a xylan main polymer chain with at least two branches, wherein the branches comprise groups of xylose, arabinose, galactose, glucouronic acid, 4-O-methyl glucouronic acid, or a mixture thereof. Still further, it is preferred that the arabinoxylan obtained according to the methods herein is soluble in water at a pH of from about 1 to about 14. In yet a further preferred embodiment, the arabinoxylan comprises a branched polysaccharide having a weight-average molecular weight of greater than about 300,000. In still a further embodiment, the arabinoxylan in the liquid comprising arabinoxylan and in the concentrated liquid comprising arabinoxylan comprises a highly branched polysaccharide, essentially soluble in water from a pH of from about 1 to about 10, and having a weight-average molecular weight greater than about 300,000.

It is further preferred that the rate of arabinoxylan extraction from the corn fiber during the alkaline material contacting step is measured in situ via infrared spectroscopy.

In accordance with the methods herein, it is possible to react the arabinoxylan obtained from corn fiber in order to prepare arabinoxylan derivatives. Specifically, it is possible to prepare novel arabinoxylan esters and ethers.

With respect to the arabinoxylan esters, in a preferred embodiment, the invention comprises contacting the separated arabinoxylan in a reaction medium with a C1 to C10 esterifying agent in the presence of a catalyst, thereby providing an arabinoxylan ester. In a further embodiment, the separated arabinoxylan utilized for preparing the arabinoxylan esters herein consists essentially of hemicellulose B. In this embodiment, hemicellulose B may be separated from hemicellulose A according to the methods set out above. In yet a further embodiment, the arabinoxylan utilized to prepare the arabinoxylan ester comprises a mixture of hemicellulose A and hemicellulose B.

In accordance with the methods herein, it has been found possible to prepare the arabinoxylan esters from an arabinoxylan precipitate without first drying the separated arabinoxylan precipitate. Thus, in one particularly preferred embodiment, the arabinoxylan is separated from the concentrated liquid via precipitation with acetic acid and the separated arabinoxylan is wet with acetic acid prior to contacting with the esterifying agent. In some circumstances, it has been found that the ability to form esters from the arabinoxylan is decreased if the precipitated arabinoxylan is dried to remove acetic acid prior to derivatization. Thus, in one particularly preferred embodiment, it is critical that the arabinoxylan be kept wet with acetic acid prior to treatment with the esterifying agent. In other words, when preparing the arabinoxylan esters, the acetic acid should not be removed from the separated arabinoxylan, such as by rinsing. A surprising benefit seen with this embodiment is that the rate of formation of the arabinoxylan ester is faster and the molecular weight of the arabinoxylan ester is higher relative to when the arabinoxylan is dried prior to contacting the arabinoxylan with the esterifying agent.

In a further embodiment, the arabinoxylan may be separated from the concentrated liquid or the liquid comprising arabinoxylan via ultrafiltration according to the methods discussed herein. When separation is in accordance with this method, acetic acid may be added to the separated arabinoxylan prior to contacting the arabinoxylan with the esterifying agent in order to obtain the benefits seen with performing an esterification reaction with a precipitated arabinoxylan that is wet with acetic acid.

In yet a further embodiment relating to the arabinoxylan esters, the catalyst comprises trifluoroacetic anhydride, trifluoromethane sulfonic acid, C1–C12 alkyl sulfonic acid, C1–C12 aryl sulfonic acid, C1–C12 substituted aryl sulfonic acid, or a mixture thereof. Still further, the catalyst preferably comprises trifluoroacetic anhydride, methane sulfonic acid, p-toluene sulfonic acid, or a mixture thereof. In a particularly preferred embodiment, the catalyst comprises methane sulfonic acid.

The catalyst may preferably be present at from about 0.0001 to about 100 equivalents per hydroxyl, more preferably from about 0.01 to about 10 equivalents per hydroxyl. The preferred reaction temperatures are from about 0° C. to about 100° C., preferably from about 25° C. to about 70° C., and, most preferably, at equal to or less than about 60° C. It is preferred that the esterifying agent contacting step is conducted for from about 0.1 h to 100 h, more preferably from about 1 h to about 100 h, and even more preferably from about 1 h to about 20 h. In yet a further embodiment, the reaction time is from about 1 h to about 2 h and the reaction temperature is from about 25° C. to about 50° C. Still preferably, the reaction time is from about 1 h to about 4 h and the temperature is less than about 60° C.

In a further embodiment, the catalyst utilized to prepare the arabinoxylan esters is a Lewis acid. Still further, the reaction mixture utilized to prepare the arabinoxylan esters comprises an organic solvent, wherein the organic solvent is not an acyl acid or acyl anhydride. In yet a further preferred embodiment, the reaction mixture comprises an organic solvent and wherein the organic solvent is DMAC or DMF.

In still a further embodiment, the reaction time when the catalyst is Lewis acid is from about 0.1 h to about 100 h, more preferably the reaction time is from about 1 to about 20 h. In a separate embodiment, the reaction mixture is at a temperature of from about 0° C. to about 180° C. The amount of Lewis acid catalyst may range from about 0.0001 to about 100 equivalents per hydroxyl, more preferably from about 0.01 to about 10 equivalents per hydroxyl. In a preferred embodiment, the catalyst comprises $TiCl_4$, $Ti(O^iPr)_4$, or $SnCl_4$, the esterifying agent contacting time is from about 1 to about 20 h, and the contacting temperature is from about 50° C. to about 150° C.

Still in relation to the arabinoxylan esters, in a further embodiment, the catalyst may be an inorganic acid. Inorganic acids useful in the methods of this invention are $H_2SO_4$, HCl, $NaHSO_4$, $HClO_4$, and $H_3PO_4$. In this embodiment, the esterifying agent contacting time may be from about 0.1 h to about 100 h and the temperature may be from about 20° C. to about 90° C. The amount of catalyst may range from about 0.0001 to about 100 equivalents per hydroxyl, more preferably from about 0.01 to about 10 equivalents per hydroxyl. More preferably, the esterifying agent contacting step may be conducted for from about 1 h to about 20 h, at a temperature of from about 25° C. to about 70° C. or from about 40° C. to about 70° C.

In a particularly preferred embodiment of the arabinoxylan ester preparation methods herein, the catalyst comprises $NaHSO_4$, the reaction time is from about 1 to about 20 h and the reaction temperature is from about 25° C. to about 70° C.

With respect to the esterifying agents, such materials may comprise a C1 to C1 acyl anhydride, C1–C10 acyl acid, C1–C10 acyl halide, or a mixture thereof. Still further, the esterifying agent may comprise formic anhydride, acetic anhydride, propionic anhydride, butyric anhydride, or a mixture thereof.

As for the types of arabinoxylan esters prepared according to the methods herein, the arabinoxylan ester comprises arabinoxylan formate, arabinoxylan acetate, arabinoxylan propionate, arabinoxylan butyrate, arabinoxylan formate acetate, arabinoxylan formate propionate, arabinoxylan formate butyrate, arabinoxylan acetate propionate, arabinoxylan acetate butyrate or a mixture thereof. In a further embodiment, the arabinoxylan ester comprises arabinoxylan formate, arabinoxylan propionate, arabinoxylan butyrate, arabinoxylan formate acetate, arabinoxylan formate propionate, arabinoxylan acetate propionate, arabinoxylan acetate butyrate, or a mixture thereof. In one embodiment, the arabinoxylan ester does not comprise arabinoxylan acetate.

In a further preferred embodiment, the arabinoxylan ester consists essentially of an esterified hemicellulose B. Still further preferred, the arabinoxylan ester has a DS/CU of from about 0.1 to about 2.5. Yet further preferred, the arabinoxylan ester has a DS/CU of from about 2.0 to about 2.4. In a further embodiment, the arabinoxylan ester has a weight-average molecular weight of greater than about 50,000. In a particularly preferred embodiment, the arabinoxylan ester has a DS/CU of from about 2.0 to about 2.4 and a weight-average molecular weight of greater than about 150,000.

Novel arabinoxylan esters are also prepared according to the methods herein. Such arabinoxylan esters are prepared as the product of the reaction of the arabinoxylan obtained according to the methods herein with a C1 to C10 esterifying agent wherein the reaction is conducted in the presence of a suitable catalyst. In one embodiment, the novel arabinoxylan ester is prepared from an essentially branched and water soluble arabinoxylan consisting essentially of an arabinoxylan of a weight average molecular weight of greater than about 300,000. Still further, the novel arabinoxylan esters of this invention are prepared from an arabinoxylan comprised of a xylan main polymer chain with at least two branches, wherein the branches comprise groups of xylose, arabinose, galactose, glucouronic acid, 4-O-methyl glucouronic acid, or a mixture thereof. Yet still further, the novel arabinoxylan esters are prepared from an arabinoxylan which is essentially soluble in water at a pH of from about 1 to about 14.

Still further the invention provides arabinoxylan esters prepared by the methods herein.

Arabinoxylan ethers are also preferably made according to the invention herein. In one embodiment, the invention comprises, in a reaction medium, contacting the concentrated liquid or the liquid comprising arabinoxylan with an O-alkylating agent, thereby providing an arabinoxylan ether. The pH of the reaction medium is preferably greater than about 10. In one preferred embodiment, the O-alkylating agent is added directly to the concentrated liquid or the liquid comprising arabinoxylan. In yet a further embodiment, a precipitation agent may be added to the concentrated liquid as set out above, thereby forming an arabinoxylan precipitate. Further, as discussed above, the arabinoxylan may be separated from the concentrated liquid or the liquid comprising arabinoxylan via ultrafiltration. This separated arabinoxylan may then be contacted with an O-alkylating agent at a pH of preferably greater than about 10, thereby providing an arabinoxylan ether.

In one embodiment, the reaction medium comprises water to provide an aqueous reaction medium. In yet a further embodiment, the reaction medium comprises an organic solvent. In a preferred embodiment, the organic solvent comprises tert-butyl alcohol, iso-propyl alcohol, iso-butyl alcohol, or a mixture thereof.

In one embodiment of the aqueous process, the arabinoxylan is separated according to the methods herein and then dissolved in water. More preferably, the arabinoxylan is utilized directly from the concentrated liquid or the liquid comprising arabinoxylan without prior separation. In this case, the reaction medium should be sufficiently alkaline to allow O-alkylation. If necessary, additional alkaline material may be added to provide a pH of greater than about 10. If the arabinoxylan has been separated and washed to remove alkaline extractant, in one embodiment, it is necessary to add an alkali metal hydroxide to the O-alkylation reaction mixture in order to render the reaction medium alkaline. NaOH and KOH, or a mixture thereof are the particularly preferred alkali metal hydroxides.

It is preferred that the O-alkylation reaction is conducted at from about 50° C. to about 180° C., preferably at atmospheric pressure. In a further preferred embodiment, elevated pressure may be used. Such elevated pressures may be from about 5 psi to about 100 psi, more preferably from about 5 psi to about 40 psi. In an additional embodiment, the temperature of the O-alkylating agent contacting step is from about 50° C. to about 180° C. and the O-alkylating agent contacting step is conducted for from about 0.5 h to about 24 h.

In another, still preferred embodiment, the reaction medium is non-aqueous. Further preferably, the reaction medium is aqueous. Still further preferably, the non-aqueous or aqueous reaction media further comprise an organic solvent. It is preferred that the organic solvent comprises tert-butyl alcohol, iso-propyl alcohol, iso-butyl alcohol, or a mixture thereof. In one embodiment, an alkaline material is added to non-aqueous or aqueous reaction media comprising an organic solvent. The O-alkylating agent contacting step is conducted at from about 50° C. to about 180° C. at a pressure of from about atmospheric to about 100 psi. More preferably, the O-alkylating agent contacting step is conducted at from about 80° C. to about 120° C. at a pressure of about 5 to about 40 psi.

A further preferred embodiment relates to the type of O-alkylating agent utilized to prepare the arabinoxylan ethers herein. In one embodiment, the O-alkylating agent comprises alkylene oxide, aryl substituted alkylene oxide, halogen substituted alkylene oxide, alkyl halide, hydroxyalkyl halide, aryl alkyl halide, carboxyalkyl halide, (alkyloxycarbonyl)alkyl halide, allyl halide, vinyl halide, alkyl sulfonate, hydroxyalkyl sulfonate, aryl alkyl sulfonate, carboxyalkyl sulfonate, (alkyloxycarbonyl)alkyl sulfonate, allyl sulfonate, or a mixture thereof. In a further preferred embodiment, the O-alkylating agent comprises ethylene oxide, propylene oxide, butylene oxide, epoxybutene, amylene oxide, glycidol, styrene oxide, epichlorohydrin, methyl chloride, methyl iodide, methyl bromide, ethyl bromide, propyl bromide, butyl bromide, propyl methyl sulfonate, methyl chloroacetic acid, ethyl chloroacetic acid, sodium chloroacetate, chloroacetic acid, benzyl bromide, 1-N,N-dialkylamino-2-chloroethane, or a mixture thereof. In a further, particularly preferred embodiment, the O-alkylating agent comprises ethylene oxide, propylene oxide, epoxybutene, methyl chloride, ethyl bromide, sodium chloroacetate, or a mixture thereof. In a most preferred embodiment, the O-alkylating agent comprises epoxybutene.

In yet a further preferred embodiment, the arabinoxylan ether consists essentially of an etherfied hemicellulose B. Yet further, the arabinoxylan ether has a DS/CU of from about 0.01 to about 2.5. Still further, the arabinoxylan ether has a DS/CU of from about 0.3 to about 2.2. In an additional preferred embodiment, the arabinoxylan ether has a MS/CU of from about 0.01 to about 100. In yet a further preferred embodiment, the arabinoxylan ether has a MS/CU of from about 0.1 to about 5.

Novel arabinoxylan ethers are also prepared according to the methods herein. Such arabinoxylan ethers are prepared as the product of the reaction of the separated arabinoxylan obtained according to the methods herein with a C1 to C10 O-alkylating agent. In one embodiment, the novel arabinoxylan ether is prepared from an essentially branched and water soluble arabinoxylan consisting essentially of an arabinoxylan of a weight average molecular weight of greater than about 300,000. Still further, the novel arabinoxylan ethers of this invention are prepared from an arabinoxylan comprised of a xylan main polymer chain with at least two branches, wherein the branches comprise groups of xylose, arabinose, galactose, glucuoronic acid, 4-O-methyl glucouronic acid, or a mixture thereof. Yet still further, the novel arabinoxylan ethers are prepared from an arabinoxylan which is soluble in water at a pH of from about 1 to about 14.

Still further the invention provides arabinoxylan ethers prepared by the methods herein.

In a next major embodiment, the invention provides a method of obtaining at least one monosaccharide from corn fiber comprising the steps of: (a) heating an aqueous mixture of corn fiber and a liquid; (b) contacting the mixture of step (a) with a protease enzyme, thereby providing a proteolyzed corn fiber and a liquid; (c) separating the liquid from the proteolyzed corn fiber; (d) contacting the proteolyzed corn fiber at least once with an alkali extractant, thereby providing an insoluble cellulose material and a liquid comprising arabinoxylan; (e) separating the insoluble cellulose material from the liquid comprising arabinoxylan; (f) reducing the volume of the liquid comprising arabinoxylan by removing excess alkaline extractant, thereby providing a concentrated liquid comprising from about 10 to about 50% solids wherein the solids comprise an arabinoxylan; and (g) hydrolyzing the arabinoxylan of step (f) in the presence of a catalyst and a solvent, thereby providing a mixture comprising at least one monosaccharide.

The proteolyzed corn fiber utilized in this aspect of the invention may be destarched and/or solvent extracted as disclosed above. In one embodiment, the alkaline extractant comprises the alkaline extractant utilized in the extraction methods set out above. In a further embodiment, the arabinoxylan may be separated from the concentrated liquid or the liquid comprising arabinoxylan according to the methods set out above. However, in order to increase the industrial utility of the process, it is particularly preferred that the hydrolysis be conducted while the arabinoxylan is still in the concentrated liquid or the liquid comprising arabinoxylan.

In a preferred embodiment, the volume reducing step is conducted via ultrafiltration as described above prior to contacting the arabinoxylan with a catalyst. This process allows the separate recovery of alkaline extractant so that less acid is needed to neutralize the excess alkaline extractant. Further, since the arabinoxylan is preferably not isolated as a precipitate prior to hydrolysis, the arabinoxylan will be already dissolved in water, which is a preferred solvent for converting the arabinoxylan to at least one monosaccharide.

Moreover, in the prior treatments set out above, many of the undesirable components that would otherwise be extracted from corn fiber, eg. glucose, have been removed. Hence, hydrolysis of a concentrated form of the arabinoxylan allows more effective separation of desirable monosaccharides than could otherwise be obtained from corn fiber not treated in accordance with the methods herein. Those skilled in the art will recognize that these factors combine to provide a more economical route to obtain these valuable monosaccharides than could otherwise be achieved.

Further, in a surprising finding in the invention herein, corn fiber arabinoxylan isolated by precipitation in acetic acid can be carried directly to the hydrolysis step without needing to remove the acetic acid from the arabinoxylan. The acetic acid can have a beneficial effect on the hydrolysis and, as such, the hydrolysis mixture can be taken on to the subsequent monosaccharide separation steps without the necessity of removing the acetic acid. Even more surprisingly, as is set out below, the arabinoxylan precipitate containing acetic acid can be carried forward to the epimerization of L-arabinose to L-ribose. As those of ordinary skill in the art will recognize, these findings provide highly beneficial results in an industrial process. However, as noted, it is not necessary to first precipitate the arabinoxylan prior to conducting the hydrolysis steps.

In a preferred embodiment, the catalyst of step (g) is an inorganic acid and the solvent is water. In a further preferred embodiment, the acid is added in an amount suitable to result in a pH of less than about 2.0. Still further, in a preferred embodiment, the acid may comprise $H_2SO_4$, HCl, or a mixture thereof. Yet further preferably, the amount of inorganic acid is from about 1.0 wt. % to about 30 wt. % in excess of that required to neutralize any residual alkaline extractant in the concentrated liquid, as measured by dry weight of arabinoxylan. In a further embodiment, step (g) further comprises acetic acid.

In a preferred embodiment, the arabinoxylan obtained from step (g), whether or not first separated from the concentrated liquid, is heated to from about 70° C. to about 120° C. for from about 0.1 h to about 24 h, thereby providing a mixture of monosaccharides, wherein the mixture of monosaccharides comprises at least about 70 wt. % of L-arabinose and D-xylose.

As used here, and with regard to other separate embodiments of the monosaccharide separation methods, the 70 wt. % figure denotes the total amount of the specified monosaccharides in the total mixture of monosaccharides. The balance of the wt. % totaling 100% comprises other materials that relate to the remainder of the components present in the arabinoxylan. As an example, in one embodiment, the arabinoxylan extracted from corn fiber is comprised of a xylan main polymer chain with at least two branches, wherein the branches comprise groups of xylose, arabinose, galactose, glucouronic acid, 4-O-methyl-glucouronic acid, or a mixture thereof. Thus, the 30 wt. % not constituting L-arabinose and D-xylose, in one embodiment, is comprised of the other materials within the arabinoxylan in corn fiber such as galactose, glucouronic acid, etc.

In a further embodiment, the L-arabinose and D-xylose are separately isolated from the mixture of monosaccharides as individual fractions, thereby separately providing a L-arabinose fraction and a D-xylose fraction. As used herein, "separately providing" means that at least two separate fractions are individually provided, wherein subsequent processing steps may be conducted with a single fraction, but not the other, because the fractions are not combined.

Although a number of methods can be used for separation of the monosaccharide materials, a particularly preferred method of separation herein involves a technique known as "simulated moving bed ("SMB") chromatography." SMB chromatography is a binary separation technique which can be used to separate a feed mixture into two fractions. For example, a feed mixture comprised of a xylose and arabinose mixture will be split into two fractions, one enriched in xylose and the other enriched in arabinose. Any impurity will end up with either the xylose fraction or the arabinose fraction. The two fractions can be further purified by crystallization, ultrafiltration, further SMB chromatography or other methods known to one of ordinary skill in the art.

If the feed contains three components which are all valuable, a two-stage SMB chromatographic process is generally utilized. The first stage splits the ternary feed into a fraction enriched in one component and a fraction enriched in the other two components. The second fraction can then be split into two fractions, each enriched in one of the two components. However, it is possible to separate a ternary mixture into three fractions using a single SMB chromatographic technique. (See Navarro et al.; Journal of Chromatography A, 770 (1997) 39–50, the disclosure of which is incorporated herein in its entirety.)

The SMB chromatographic unit preferably utilized herein preferably consists of either a multi-sectioned column or multiple columns. The feed mixture introduced to the SMB chromatographic unit is split into two fractions, referred to as "raffinate" and "extract" streams. A liquid desorbant is also fed to the unit; this material acts as a regenerant. The two inlet ports and the two outlet ports are moved intermittently to a next section in a multi-section column or to a next section column in a multi-column unit in the direction of liquid flow. The movement of the ports simulates the countercurrent movement of the packing. An effective movement of the packing in the direction opposite to the liquid flow results in the separation of the feed components into the separate fractions.

Because of the expense and difficulty of exploring SMB chromatographic separations on large pilot plant equipment, laboratory experiments have been developed which predict the separation of two components using SMB chromatography. One such experiment is a pulse test which, when performed on larger columns, directly provides preliminary design data for the SMB chromatographic unit. In this experiment, a column is packed with the required resin and the sample is introduced as a pulse which is immediately followed by eluent while maintaining a constant flow rate. Samples of the eluents from the column are collected and analyzed. (Balannec, B. and Hotier, G., "From Batch Elution to Simulated Countercurrent Chromatography," in "Preparative and Production Scale Chromatography," Genetsos, G. and Baker, P. E., editors. Chromatographic Science Series Volume 61, Marcel Dekker, Inc. 1992, the disclosure of which is included herein in its entirety.)

In a preferred embodiment of the invention herein, a hydrolysis mixture which contains at least two components wherein at least one of the components comprises a monosaccharide is treated to remove salts prior to commencing the SMB chromatography. It is further preferred that the salts comprise sulfate salts which are removed from the mixture of step (g) comprising at least two components via precipitation with $CaCO_3$ or $Ca(OH)_2$. Still further preferred, the mixture containing at least one monosaccharide is passed through an ion exchange column capable of removing salts arising from an inorganic acid catalyst. Yet further preferred is the use of ion exclusion-SMB chromatography to remove the salts from the mixture comprising at least two components to recover sulfuric acid from the neutral materials. Yet even further preferred, the salts are removed from the mixture comprising at least two components by electrodialysis.

In yet another preferred embodiment, SMB is used to separate at least two components from the hydrolysis mixture of step (g) into two fractions. Water is preferably used at the eluent. It is preferred that the concentration of the feed be between from about 5 wt. % to about 85 wt. % and more preferably, from about 35 wt. % to about 65 wt. %. It is further preferred that the temperature of the eluent and feed be from about 25° C. to about 80° C. and, more preferably, from about 40° C. to about 65° C. Those skilled in the art will recognize that the upper limit of monosaccharide concentration in the feed mixtures will be monosaccharide solubility at the maximum operating temperature.

In a preferred embodiment, the mixture fed onto the SMB comprises from about 5 wt. % to about 85 wt. % of a mixture of D-xylose and L-arabinose. Still further, the at least two components fed onto the SMB comprise D-xylose and L-arabinose. Still further, after the separation step L-arabinose is present in one eluent fraction at from about 85 wt. % to about 100 wt. %. Still further preferably, minor components, eg., galactose, are allowed to go into the D-xylose fraction, thereby providing an L-arabinose fraction comprised from about 85 wt % to about 100 wt % L-arabinose. In a separate embodiment, minor components, eg., galactose, are allowed to go with the L-arabinose fraction, thereby providing a D-xylose fraction comprised from about 85 wt. % to about 100 wt. % D-xylose. Still further, it is preferred that the D-xylose fraction is comprised of from about 85 wt. % to about 100 wt. % D-xylose. Those skilled in the art will recognize that these fractions can be additionally purified by crystallization.

In yet another preferred embodiment, a resin is utilized in the SMB separation and the resin is a cation resin exchanged with a salt selected from the group consisting of calcium or magnesium, with calcium being particularly preferred. Examples of preferred resins include, but or not limited to, Dowex Monosphere 99 (Dow Chemical, Midland, Mich.), Rohm and Haas CR1320 (Philadelphia, Pa.), Purolite PCR-642 (Purolite Company, Philadelphia, Pa.), and Mitsubishi (Mitsubishi Chemical, White Plains, N.Y.).

In yet another preferred embodiment, the resin utilized for SMB chromatographic separation is a strongly basic resin in a phosphate form. An example, but not limited to, of a preferred resin is Dowex-1 (Dow Chemical, Midland, Mich.) strongly basic resin in the phosphate form.

In a separate, still preferred embodiment, the materials of hydrolysis step (g) are heated to from about 40° C. to about 70° C. for from about 0.1 h to about 24 h in the presence of an inorganic acid catalyst, thereby providing a mixture of monosaccharides and xylan, wherein the mixture of monosaccharides comprises at least about 50 wt. % L-arabinose. The xylan and the mixture of monosaccharides comprising L-arabinose may be separately isolated to provide a xylan precipitate and a mixture of monosaccharides in a preferred embodiment by adding a solvent comprising methanol, ethanol, n-propyl alcohol, isopropyl alcohol, or a mixture thereof. In yet a further embodiment, the xylan precipitate may be separated from the mixture of monosaccharides comprising at least about 50 wt. % L-arabinose via ultrafiltration. In a further preferred embodiment, the L-arabinose may be separated from the mixture of monosaccharides to separately provide a L-arabinose fraction and a mixture of monosaccharides according to the SMB method discussed above.

In a further preferred method, the invention comprises the additional steps of: dispersing the xylan precipitate in a suitable solvent, such as water, thereby providing a xylan solution; adding from about 1 wt. % to about 30 wt. % of a catalyst to the solution; and adjusting the temperature of the solution to from about 70° C. to about 120° C. for from about 0.1 h to about 24 h, thereby providing a mixture of monosaccharides, wherein the mixture of monosaccharides comprises at least 50% D-xylose. In this embodiment, the catalyst may comprise $H_2SO_4$, HCl, acetic acid, or a mixture thereof. Still further, the D-xylose may be isolated from the mixture of monosaccharides to separately provide a D-xylose fraction and a mixture of monosaccharides. One method of separation is preferably SMB chromatography as set out above.

In a separate preferred embodiment, xylan is separated from the mixture of monosaccharides via ultrafiltration utilizing a xylan-rejecting membrane, thereby providing a xylan solution and a mixture of monosaccharides wherein the mixture of monosaccharides comprises at least about 50 wt. % L-arabinose. When ultrafiltration is utilized, the xylan obtained is preferably a precipitate. In a further preferred embodiment, the L-arabinose may be separated from the mixture of monosaccharides according to the SMB methods discussed above, thereby separately providing an L-arabinose fraction and a mixture of monosaccharides.

One of ordinary skill in the art will recognize the techniques that may be utilized in the ultrafiltration methods herein. In particular, one of ordinary skill in the art would realize that the particle size/molecular weight of the monosaccharides in the mixture of monosaccharides may be separately determined and the results utilized to select the appropriate membrane to allow monosaccharides to pass through the membrane, while leaving xylan or other specified monosaccharides on a front side of the membrane and vice versa.

In a further preferred embodiment, the invention comprises the additional steps of: adding from about 1 wt. % to about 30 wt. % of a catalyst to the xylan solution; and adjusting the temperature of the xylan solution to from about 70° C. to about 120° C. for from about 0.1 h to about 24 h, thereby providing a mixture of monosaccharides, wherein the mixture of monosaccharides comprises at least about 50 wt. % D-xylose. In this embodiment, the catalyst may comprise $H_2SO_4$, HCL acetic acid, or a mixture thereof. Still further, the D-xylose is separated from the mixture of monosaccharides, thereby separately providing a D-xylose fraction and a mixture of monosaccharides. A preferred method of separation of the D-xylose is via SMB chromatography as set out above.

In yet a further preferred embodiment, the catalyst of step (g) of the method of obtaining at least one monosaccharide from corn fiber comprises at least one enzyme and the solvent comprises water. Still further preferably, the pH of step (g) is adjusted to from about 4 to about 9 prior to the addition of the enzyme. The enzyme may preferably comprise arabinofuranosidase. An example of such an enzyme can be found in U.S. Pat. No. 5,882,905, the disclosure of which is incorporated herein by this reference in its entirety. In a further, still preferred embodiment, the solvent may comprise water and the catalyst may comprise both an arabinofuranosidase enzyme and a xylanase enzyme. In a particularly preferred embodiment, the arabinofuranosidase enzyme is added to the xylan solution prior to the addition of the xylanase enzyme.

In the enzyme catalyst method, the materials of step (g) are heated to from about 25° C. to about 90° C. for from about 0.1 h to about 24 h, thereby providing a mixture of monosaccharides comprising at least about 70 wt. % of a mixture L-arabinose and D-xylose. Still further, in a preferred embodiment, the method comprises the step of isolating as separate fractions the mixture of L-arabinose and the D-xylose from the mixture of monosaccharides. Still further, the method preferably comprises separately isolating the L-arabinose and D-xylose from each other, thereby providing an individual L-arabinose fraction and an individual D-xylose fraction. The method of separation may be according to the SMB method as discussed herein.

In yet further preferred embodiments of the invention herein, the materials in step (g) are heated to from about 25° C. to about 90° C. for from about 0.1 h to about 24 h, thereby providing a mixture of monosaccharides and xylan, wherein the mixture of monosaccharides comprises at least 50 wt. % L-arabinose. Still further, a solvent comprising methanol, ethanol, n-propyl alcohol, isopropyl alcohol, or a mixture thereof may preferably be added to the mixture of monosaccharides and xylan, thereby providing a xylan precipitate and a mixture of monosaccharides, wherein the mixture of monosaccharides comprises at least 50 wt. % L-arabinose. In yet a further embodiment, the xylan precipitate is separately isolated from the mixture of monosaccharides comprising at least about 50 wt. % L-arabinose. In a further preferred embodiment, the L-arabinose may be separated from the mixture of monosaccharides according to the SMB method discussed above, thereby providing a L-arabinose fraction and a mixture of monosaccharides.

In yet a further preferred embodiment, the method comprises the additional steps of: dispersing the xylan precipitate in a suitable solvent to provide a xylan solution; adding from about 1 wt. % to about 30 wt. % of a catalyst to the xylan solution; and adjusting the temperature to from about 70° C. to about 120° C. for from about 0.1 h to about 24 h, thereby providing a mixture of monosaccharides wherein the mixture comprises at least 50% D-xylose. In this preferred embodiment, the catalyst comprises $H_2SO_4$, HCl, acetic acid or a mixture thereof. In a still further preferred embodiment, the method comprises separating the D-xylose from the mixture of monosaccharides to provide an individual D-xylose fraction and a mixture of monosaccharides. The separation may be utilizing the SMB method discussed above.

In a separate preferred embodiment, xylan is separated from the mixture of monosaccharides via ultrafiltration, according to the methods set out above, utilizing a xylan-rejecting membrane, thereby providing a xylan solution and a mixture of monosaccharides, wherein the mixture of monosaccharides comprises at least about 50 wt. % L-arabinose. In a further preferred embodiment, the L-arabinose may be separated from the mixture of monosaccharides according to the SMB methods discussed above, thereby separately providing a L-arabinose fraction and a mixture of monosaccharides.

In a further preferred embodiment, the method comprises the additional steps of: adding from about 1 wt. % to about 30 wt. % of a catalyst to the xylan solution prepared above; and adjusting the temperature of the xylan solution to from about 70° C. to about 120° C. for from about 0.1 h to about 24 h, thereby providing a mixture of monosaccharides, wherein the mixture comprises at least about 50 wt. % D-xylose. In this embodiment, the catalyst comprises $H_2SO_4$, HCl, acetic acid or a mixture thereof. Still further, the D-xylose is separated as an individual fraction from the mixture of monosaccharides. The preferred method of separation of the D-xylose is via SMB chromatography as set out above.

In a preferred embodiment, the catalyst of hydrolysis step (g) is an inorganic acid and the solvent is acetic anhydride.

In a further preferred embodiment, the acid is added to result in a pH of less than about 2.0. Still further, in a preferred embodiment, the acid may comprise $H_2SO_4$, HCl, or a mixture thereof. Yet further preferably, the amount of inorganic acid is from about 1.0 wt. % to about 30 wt. % in excess of that required to neutralize residual alkaline extractant, as measured by dry weight of arabinoxylan.

In a preferred embodiment, the mixture of step (g) may be heated to a temperature of from about 70° C. to about 120° C. for from about 0.1 h to about 24 h in the presence of the inorganic acid and acetic anhydride, thereby providing a mixture of monosaccharides acetates wherein the mixture of monosaccharide acetates comprises at least 70% of a mixture of L-arabinose acetate and D-xylose acetate. In this embodiment, xylose or arabinose acetate means any acetyl ester of xylose or arabinose which may be in either the pyranose or furanose form. The mixture of D-xylose acetate and L-arabinose acetate may preferably be isolated from the mixture of monosaccharides as individual fractions. Still further, the D-xylose acetate and L-arabinose acetate may be separately isolated from each other. The preferred means of separation is SMB chromatography.

Yet still further preferably, the mixture of L-arabinose acetate and D-xylose acetate may be contacted with a hydrolyzing agent for a time and at a temperature sufficient to provide a mixture of L-arabinose and D-xylose. The L-arabinose and D-xylose may be preferably isolated as individual fractions. In a preferred embodiment, the hydrolyzing agent is NaOMe in MeOH or aqueous $NH_4$. The contacting may preferably be conducted at a temperature of from about 25° C. to about 65° C. for from about 0.1 h to about 24 h. Still further preferably, the contacting temperature is from about 25° C. to about 65° C. for from about 0.1 h to about 24 h.

In a further preferred embodiment, the L-arabinose acetate may separately be hydrolyzed with NaOMe in MeOH or aqueous $NH_4$ to provide L-arabinose. Still further, the isolated D-xylose acetate may preferably be separately hydrolyzed with NaOMe in MeOH or aqueous $NH_4$ to provide D-xylose.

In yet a further embodiment, the mixture of step (g) is preferably heated to a temperature of from about 40° C. to about 65° C. for from about 0.1 h to about 24 h, thereby providing a mixture of monosaccharide acetates and xylan acetate wherein the mixture of monosaccharide acetates comprises at least about 20 wt. % L-arabinose acetate. Still further, methanol, ethanol, n-propyl alcohol, isopropyl alcohol or aqueous acetic acid may be added, thereby providing a precipitate comprising xylan acetate and a mixture of monosaccharide acetates wherein the monosaccharide acetates comprises at least about 20 wt. % L-arabinose acetate. In yet a further embodiment, the xylan acetate precipitate is separated from the mixture of monosaccharide acetates comprising at least about 20 wt. % L-arabinose acetate via an ultrafiltration method. In a further preferred embodiment, the L-arabinose acetate may be separated from the mixture of monosaccharide acetates according to the SMB methods discussed above, thereby providing a L-arabinose acetate fraction and a mixture of monosaccharides.

In yet a further preferred embodiment, the method comprises the additional steps of: dispersing the xylan acetate precipitate in a suitable solvent, such as water, to provide a xylan acetate solution; adding from about 1 wt. % to about 30 wt. % of a catalyst to the xylan acetate solution; and adjusting the temperature to from about 70° C. to about 120° C. for from about 0.1 h to about 24 h, thereby providing a mixture of monosaccharides, wherein the mixture of monosaccharides comprises at least 50% D-xylose. In this preferred embodiment, the catalyst comprises $H_2SO_4$, HCl, acetic acid or a mixture thereof. In a still further preferred embodiment, the method comprises separating the D-xylose from the mixture of monosaccharides, thereby providing a D-xylose fraction and a mixture of monosaccharides. The separation may be utilizing the SMB method discussed above.

In yet a further preferred embodiment, the method of obtaining at least one monosaccharide from corn fiber comprises isolating xylan acetate via ultrafiltration through a xylan acetate-rejecting membrane, thereby providing a xylan acetate solution and a second solution of monosaccharide acetates comprising at least 20 wt. % L-arabinose acetate. In a further preferred embodiment, the L-arabinose acetate may be isolated from the mixture of monosaccharide acetates according to the SMB methods discussed above, thereby providing a L-arabinose fraction.

Yet further preferably, the isolated L-arabinose acetate is hydrolyzed with a NaOMe/MeOH solution or an aqueous $NH_4$ solution to provide a L-arabinose fraction. The hydrolysis is preferably conducted at a temperature of from about 25° C. to about 65° C. for from about 0.1 h to about 24 h. Still further, the isolated xylan acetate is hydrolyzed with a NaOMe/MeOH solution or an aqueous $NH_4$ solution to provide a D-xylose fraction. The hydrolysis is preferably conducted at a temperature of from about 25° C. to about 65° C. for from about 0.1 h to about 24 h.

In yet a further preferred embodiment of the invention herein, the xylan acetate is contacted with water and an acid at a temperature of from about 70° C. to about 120° C. for from about 0.1 h to about 24 h, thereby providing a mixture of monosaccharides comprising at least 50% D-xylose. The acid may preferably be $H_2SO_4$, HCl, or a mixture thereof. Yet still further preferably, the D-xylose maybe isolated from the mixture of monosaccharides as a individual fraction.

In a next embodiment, the invention provides a method of obtaining at least one monosaccharide from corn fiber comprising the steps of: (a) heating an aqueous mixture of corn fiber and a liquid; (b) contacting the mixture of step (a) with a protease enzyme, thereby providing a proteolyzed corn fiber and a liquid; (c) separating the liquid from the proteolyzed corn fiber; (d) contacting the proteolyzed corn fiber at least once with an alkali extractant, thereby providing an insoluble cellulose material and a liquid comprising arabinoxylan; (e) separating the insoluble cellulose material from the liquid comprising arabinoxylan; (f) reducing the volume of the liquid comprising arabinoxylan by removing excess alkaline extractant, thereby providing a concentrated liquid comprising from about 10 to about 50% solids, wherein the solids comprise an arabinoxylan; (g) hydrolyzing the arabinoxylan in the presence of a catalyst and a solvent, thereby providing a mixture comprising at least one monosaccharide; and (h) separating at least one monosaccharide from the mixture of monosaccharides.

In a preferred embodiment of the method of obtaining at least one monosaccharide from corn fiber, the at least one monosaccharide comprises L-arabinose and the method further comprises contacting the L-arabinose with a solvent and a Mo(VI) catalyst at a temperature and a pH sufficient to provide a mixture of L-arabinose and L-ribose. In this preferred method, at least some of the L-arabinose is epimerized to L-ribose. In a further embodiment, the solvent comprises water. In yet another embodiment, the solvent comprises a mixture of water and acetic acid. In a further embodiment, the concentration of acetic acid is from about 5 wt. % to about 90 wt. % based upon a total volume of acetic acid and water. Still further, the concentration of acetic acid is from about 20 wt. % to about 80 wt. % based upon a total volume of acetic acid and water. The preferred concentration of catalyst is from about 0.01 wt. % to about 10 wt. %, as measured by dry weight of L-arabinose. Yet further preferably, the concentration of catalyst is from about 0.5 to about 2 wt. %, as measured by dry weight of L-arabinose.

In this epimerization of arabinose and xylose, it has been surprisingly found that utilizing acetic acid as a solvent with Mo(VI) as the catalyst effectively promotes epimerization of arabinose to ribose and xylose to ribose. This is an unexpected result because one would anticipate that the acetic acid would, in fact, promote degradation of the arabinose and/or xylose. Further, it would be expected that acetic acid would deactivate the Mo(VI) catalyst. However, one of ordinary skill in the art will recognize that it is not necessary to first separate the arabinoxylan from the concentrated liquid in order to conduct this epimerization. In fact, it will be apparent that in some circumstances it is not desirable to perform such separations.

In a further embodiment, the concentration of L-arabinose in the mixture is from about 10 wt. % to about 70 wt. %. Still further, the concentration of L-arabinose in the mixture is from about 40 wt. % to about 60 wt. %. A preferred pH for the hydrolysis step is from about 1 to about 4.5, more preferably from about 2.5 to about 3.0. In a particularly preferred embodiment, the hydrolysis step is conducted at a temperature of from about 80° C. to about 100° C., or, at a still preferred temperature of from about 20° C. to about 100° C. Still further preferred is when the hydrolysis temperature is from about 60° C. to about 100° C. A preferred contact temperature is from about 20° C. to about 100° C. Still further preferred is when the hydrolysis temperature is from about 60° C. to about 100° C. The preferred hydrolysis time is from about 0.1 to about 20 h and, even more preferred from about 1 to about 5 h and, still more preferred, from about 2 to about 4 h.

Still further, it is preferred that the Mo(VI) catalyst is ammonium dimolybdate, sodium molybdate, $MoO_3$, or a mixture thereof. In a further embodiment, the catalyst is a solid catalyst obtained by heating ammonium dimolybdate in water at a sufficient pH, temperature and time to cause the precipitation of a polymolybdate from the aqueous solution. One of ordinary skill in the art will recognize that such conditions may be determined without undue experimentation. In a preferred embodiment, the solid catalyst is isolated and utilized in the hydrate form. Still further preferably, the catalyst is a solid catalyst obtained by heating ammonium dimolybdate in water at a pH of from about 1 to about 3 at from about 80° C. to about 100° C. for from about 2 to about 5 h.

In yet a further embodiment, the concentration of the catalyst is from about 0.01 wt. % to about 10 wt. %. It is further preferred that the concentration of the catalyst is from about 0.5 wt. % to about 2 wt. %. Still further, the catalyst is preferably deposited on an immobile solid support.

It is preferred that the L-ribose obtained in this aspect of the invention be isolated from the L-arabinose as an individual fraction, thereby separately providing a L-arabinose fraction and a L-ribose fraction. The L-ribose may be isolated via SMB chromatography, wherein a L-ribose eluent fraction and a L-arabinose eluent fraction are separately provided. In this method, it is preferred that the L-arabinose eluent fraction is contacted one or more times with a Mo(VI) catalyst at a time, temperature and pH suitable to provide further L-ribose.

One of ordinary skill in the art will recognize that the particular combination of pH, temperature and concentration of catalyst selected can impact the time required for converting L-arabinose to a mixture of L-arabinose and L-ribose. It should also be recognized that ultimately an equilibrium mixture of L-arabinose and L-ribose is obtained so that prolonged contact times are not believed to provide additional benefit and may, in fact, result in decomposition of the monosaccharides.

In a most preferred embodiment, the solution of L-arabinose utilized for the epimerization reaction is that obtained by SMB chromatographic separation of a D-xylose fraction and a L-arabinose fraction from the hydrolysis of arabinoxylan according to the methods herein.

The preferred amount of L-ribose fraction in the mixture of the L-arabinose fraction and L-ribose fraction after contact with the catalyst is from about 1 wt. % to about 30 wt. % based on the combined dry weight of L-arabinose and L-ribose. Still further preferably, the amount of L-ribose in the mixture of L-arabinose and L-ribose after contact with the catalyst is from about 20 wt. % to about 25 wt. % based on the combined dry weight of L-arabinose and L-ribose.

In yet a further embodiment, the L-arabinose and L-ribose are separated from each other by SMB chromatography as set out above to provide individual solutions. In yet a further preferred embodiment, the solution of separated L-arabinose is returned to the reaction vessel one or more times for further contact with the Mo(VI) catalyst under conditions sufficient to cause conversion of the L-arabinose to a mixture of L-arabinose and L-ribose, whereby a further separation of L-ribose is conducted. One of ordinary skill in the art will recognize that such a method maximizes the yield of L-ribose. In a particularly preferred process, the epimerization reaction is conducted in a continuous process. Still further preferably, the reaction vessel contains the polymolybdate catalyst described above deposited on an immobile solid support.

In yet a further embodiment, the method of obtaining monosaccharides from corn fiber further comprises the additional steps of: contacting the mixture of monosaccharides with a xylose reductase, thereby providing a mixture of xylitol and L-arabinose; and dispersing the xylitol in a solvent in which L-arabinose does not dissolve, thereby providing a xylitol/solvent solution and an L-arabinose precipitate. In a particularly preferred embodiment, the xylose reductase enzymes utilized herein are substantially free of arabinose reductase activity. The preferred xylose reductases exhibit a wide range of activities and conditions under which they exhibit maximum activity. In one embodiment, the xylose reductase treatment is conducted at a temperature of from about 20° C. to about 100° C., more preferably between about 40° C. to about 70° C. at a pH of from about 5 to about 8. Reaction times can range from between 0.1 to about 20 hours, preferably between about 1 to about 3 hours. Those of skill in the art will recognize that the exact conditions utilized for this, as well as the other enzyme treatments herein, will vary due to the source and, thus, the specific characteristics of the enzyme illustrated.

In a next major aspect, the invention comprises a method of obtaining soluble proteins and carbohydrates from corn fiber comprising the steps of: heating an aqueous suspension of corn fiber; contacting the fiber sequentially or concurrently with an amylase enzyme and protease enzyme for a time and at a temperature sufficient to provide an essentially destarched, proteolyzed corn fiber and a liquid(s) comprising soluble proteins, carbohydrates, or a mixture thereof; and separating the liquid from the destarched corn fiber, wherein the soluble proteins and carbohydrates are suitable as feedstock for the production of animal feed, chemicals, or polymers.

In yet a further major aspect of this invention, a method for obtaining animal feed is provided, wherein the method comprises the steps of: heating an aqueous suspension of corn fiber; contacting the fiber sequentially or concurrently with an amylase enzyme and protease enzyme for a time and at a temperature sufficient to provide an essentially destarched, proteolyzed corn fiber and a liquid(s) comprising soluble proteins, carbohydrates, or a mixture thereof; separating the liquid from the destarched, proteolyzed corn fiber; contacting the corn fiber at least once with an alkali extractant to provide an insoluble cellulose material and a liquid comprising arabinoxylan; separating the insoluble cellulose material from the liquid comprising arabinoxylan; adding a sufficient amount of a corn steep liquor to the cellulose material; and removing water from the heterogeneous mixture thereby providing an animal feed.

some errors and deviations should be taken into account. Unless indicated otherwise, parts are parts by weight, temperature is in ° C. or is at room temperature, and pressure is at or near atmospheric.

Example 1

Destarching of Corn Fiber

The following represents one method for destarching corn fiber utilized according to the methods herein. The corn fiber utilized either contained a low amount of moisture (about 10.4 wt. % $H_2O$) and no $SO_2$ or the corn fiber was wet (about 65% moisture) and contained $SO_2$ (about 852 ppm sulfur). Unless otherwise noted, the same corn fiber was utilized in the subsequent Examples.

A 2000 mL three-neck glass round bottom flask equipped with a mechanical stirrer and a reflux condenser was charged with 300 g of corn fiber, 1080 mL $H_2O$ and 120 mL of a 1 M phosphate buffer solution. The mixture was heated to 100° C. and held at this temperature for 20 minutes. The mixture was cooled to the appropriate temperature before addition of enzyme. When no starch was detectable by iodine staining, the solids were isolated by filtration, washed, and dried at 60° C.

TABLE 1

COMPARISON OF SAMPLE DESTARCHING TREATMENTS

| Sample | Enzyme | units/100 g corn fiber | Reaction Time (h) | Temp (° C.) | % Yield[1] | % Glu | % Xyl | % Gal | % Ara | % Man | Xyl/Ara |
|---|---|---|---|---|---|---|---|---|---|---|---|
| 1 | None (Corn Fiber) | | | | | 52.2 | 25.9 | 5.4 | 16.5 | 0.0 | 1.6 |
| 2 | Type X-A fungal from *Aspergillus oryzae* | 168000[2] | 1.7 | 30 | 73.3 | 35.2 | 37.0 | 6.8 | 21.0 | 0.0 | 1.8 |
| 3 | Type II-A Bacillus | 724000[2] | 3.5 | 30 | 68.9 | 35.9 | 36.5 | 6.9 | 20.6 | 0.0 | 1.8 |
| 4 | Type II-A Bacillus | 1140[2] | 72 | 30 | 75.1 | 39.4 | 33.8 | 5.9 | 20.7 | 0.1 | 1.6 |
| 5 | Spezyme AA-L | 297400[3] | 0.25 | 60 | 69.1 | 36.5 | 35.6 | 6.1 | 21.7 | 0.1 | 1.6 |
| 6 | Spezyme AA-L | 297400[3] | 0.28 | 80 | 70.7 | 36.6 | 36.2 | 4.6 | 22.4 | 0.1 | 1.6 |
| 7 | Spezyme AA-L | 50600[3] | 0.75 | 80 | 72.7 | 35.9 | 35.7 | 6.2 | 22.1 | 0.1 | 1.6 |
| 8 | Spezyme AA-L | 25300[3] | 0.83 | 80 | 74.6 | 37.6 | 35.0 | 6.0 | 21.3 | 0.1 | 1.6 |
| 9 | Spezyme AA-L | 25300[3] | 0.88 | 80 | 79.6 | 36.8 | 34.9 | 6.3 | 21.9 | 0.1 | 1.6 |

Notes for Table 1:
[1]. Yield of destarched fiber based upon dry weight of corn fiber.
[2]. One unit will liberate 1.0 mg of maltose from starch in 3 min., pH 6.9, 20° C.
[3]. The activity of thermostable amylase units (TAU) where 1 TAU is defined as the quantity of enzyme that will dextrinize 1 mg of starch per minute at pH 6.6 and 30° C.

EXAMPLES

The following Examples are set forth so as to provide those of ordinary skill in the art with a complete disclosure and description of how the compounds and methods claimed herein are made, performed and evaluated, and are intended to be purely exemplary of the invention and are not intended to limit the scope of what the inventors regard as their invention. Efforts have been made to ensure accuracy with respect to numbers (e.g., amounts, temperature, etc.) but This Example illustrates that the thermophilic α-amylase, Spezyme, exhibited a higher activity at a higher temperature, relative to the other amylase varieties examined. Thus, when Spezyme is utilized, less enzyme is required, reaction times are shorter, and the reaction temperature is comparable to the temperatures (about 75 to about 100° C.) useful for swelling the corn fiber prior to enzymatic destarching. As shown by Samples 5 and 6, each of which utilized an excess of Spezyme in order to ensure complete removal of starch, corn fiber contains approximately 30% starch. Hence, under optimal conditions, yields of from about 68% to about 73% of destarched corn fiber can be expected. Under conditions in which all of the starch component has been removed from the corn fiber, such as illustrated by Samples 3 and Samples 5–7, the glucose and xylose content of destarched corn fiber is typically from about 35% to about 37% and the arabinose content is from about 20% to about 23%, thereby providing a xyl/Arb ratio of from about 1.8 to about 1.5.

Example 2

Corn Fiber Destarching Process

A 5000 mL three-neck glass round bottom flask equipped with a mechanical stirrer and a reflux condenser was charged with 250 g of corn fiber, 1800 mL $H_2O$, and 200 mL of a 1 M phosphate buffer solution. The mixture was heated to 80° C., followed by addition of 10 mL of a Spezyme suspension. Generally, using iodine staining, no starch could be detected after 50 minutes.

In order to examine the effect of extended destarching periods, the destarching reaction was allowed to continue as indicated in Table 2 below. The solids were isolated by filtration, washed, and dried at 60° C.

assessed as complete when the concentration of soluble species no longer increased in the destarching reaction medium. The general details of the destarching were described above in Example 2. Two different destarching enzymes were utilized. A summary of the results is shown in FIGS. 1 and 2.

Figure 2:
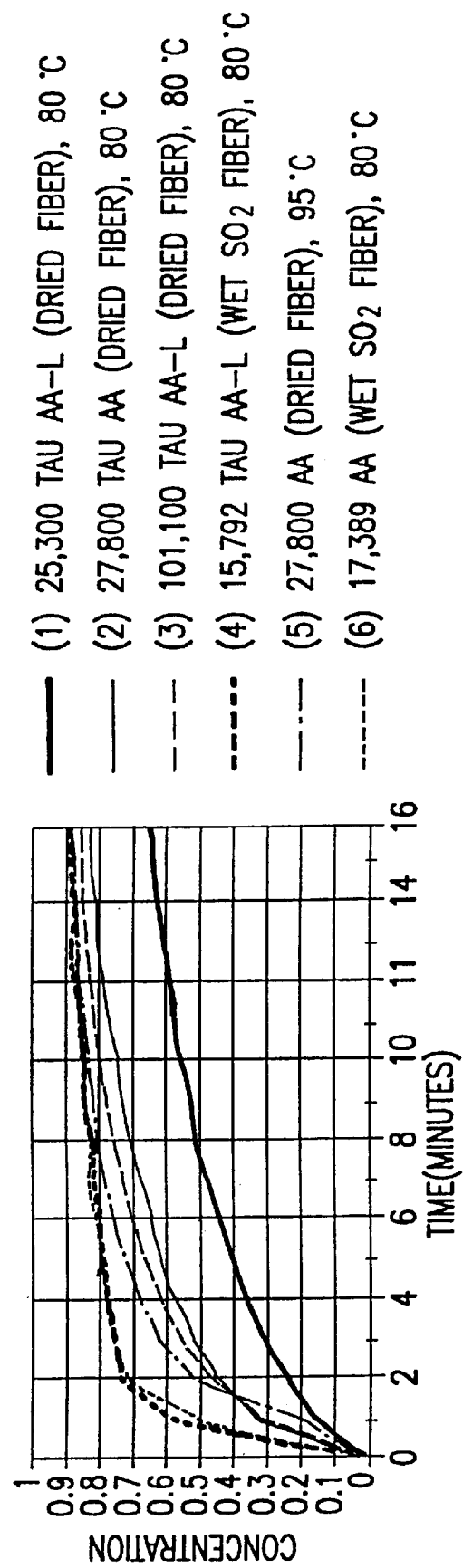
FIG. 2 shows the initial corn fiber destarching rate where the data has been normalized relative to total sugars extracted.

A number of important features are illustrated by FIGS. 1 and 2. Significantly, the fiber that was not dried prior to destarching and that contained $SO_2$ (852 ppm sulfur) as an artifact of the corn steeping process i.e., wet milled corn fiber, could be destarched more rapidly than the dried fiber even when less enzyme was utilized (compare Samples 1 with 4 and Samples 2 with 6). As noted previously, this result was surprising because it was expected that the $SO_2$ would act as a biocide, thus retarding enzymatic degradation of the starch.

FIG. 1 also illustrates that, with the exception of the lower concentration of the less active enzyme, all of the destarching reactions converged at 90% destarching at approximately 20 minutes. Further, prolonged reaction times (about 100 to about 180 min) were required to reach a steady state of concentration of soluble species.

FIG. 2 demonstrates that Spezyme AA gave a higher rate of destarching at equivalent concentration of enzyme and at

TABLE 2

STARCH REMOVAL MONITORING BY IODINE STAINING

| Sample | Enzyme | units/100 g corn fiber | Reaction Time (h) | Temp (° C.) | % Yield[1] | % Glu | % Xyl | % Gal | % Ara | % Man | Xyl/Ara |
|---|---|---|---|---|---|---|---|---|---|---|---|
| 1 | Spezyme AA-L | 25300[2] | 0.92 | 80 | 86.2 | 36.2 | 33.7 | 6.4 | 21.2 | 2.5 | 1.6 |
| 2 | Spezyme AA-L | 25300[2] | 0.92 | 80 | 81.9 | 36.9 | 33.7 | 6.2 | 20.4 | 2.9 | 1.6 |
| 3 | Spezyme AA-L | 25300[2] | 1.5 | 80 | 78.3 | 37.1 | 32.9 | 6.4 | 21.2 | 2.4 | 1.5 |
| 4 | Spezyme AA-L | 25300[2] | 3 | 80 | 77.5 | 37.4 | 32.6 | 6.5 | 21.1 | 2.4 | 1.5 |

Notes for Table 2:
[1]. Yield of destarched fiber based upon dry weight of corn fiber.
[2]. The activity of thermostable amylase units (TAU) where 1 TAU is defined as the quantity of enzyme that will dextrinize 1 mg of starch per minute at pH 6.6 and 30° C.

Table 2 shows that at the indicated concentration of enzyme, the amount of starch removed increases with increasing reaction time, but does not reach the anticipated about 68% to about 73% yield of destarched corn fiber. Further, the % Xyl does not fall within the expected range (See Example 1). Thus, Table 2 demonstrates that the classical means of determining the endpoint of starch removal (iodine staining) is not particularly reliable. In order to more accurately monitor starch removal in the methods disclosed and claimed herein, the following destarching analysis method was developed.

Example 3

In Situ Analysis of Destarching Reaction

The enzymatic degradation of starch in the corn fiber was monitored in situ by following the appearance of soluble oligiosaccharides and monosaccharides. The soluble fraction was measured by infrared spectroscopy using a ReactIR 1000 Spectrometer (ASI Applied Systems) to measure the peak area at 1050–1010 $cm^{-1}$ with baseline definition between 1192–1007 $cm^{-1}$. Enzymatic digestion was equivalent temperature (compare Samples 1 and 2). By increasing the concentration of the less active Spezyme AA-L, the rate of destarching could be increased to a rate equivalent to that of Spezyme AA (compare Samples 2 and 3). Increasing the temperature from 80° C. to 95° C. at equivalent Spezyme AA concentration increased the rate of destarching (compare Samples 2 and 5). As previously noted, the use of wet corn fiber containing $SO_2$ gave the highest rates of reaction (See Samples 4 and 6.) These observations illustrate the distinct advantages, e.g., less enzyme utilization and shorter reaction times, of using wet corn fiber versus dried corn fiber. Further, these results demonstrate that destarching can be completed in times significantly shorter than previously thought. Also, in situ monitoring of reactions by techniques such as those described in this Example (IR, Raman spectroscopy) provides the best process for monitoring the destarching of corn fiber.

Example 4

Simulations Destarching and Proteolysis of Corn Fiber at Elevated pH and Temperature Corn fiber (466.7 g, dry wt.) and distilled water (4000 mL) were added to a 5000 mL 3-necked round-bottomed flask equipped with an overhead stirrer, a condenser, and a thermometer attached to a Therm-O-Watch temperature controller. The pH of the mixture was adjusted to a pH of 8.5 with NaOH. The mixture was heated with stirring to 80° C. and was held at this temperature with stirring for approximately 15 minutes. Amylase (GC 521, 16.7 mL, Genencor, Palo Alto, Calif.) and protease (Protex 6L, 10.0 mL, Genencor, Palo Alto, Calif.) were added to the mixture simultaneously. The mixture was stirred for 2.5 hours at 80° C. with no attempt to control pH. The mixture was filtered through a 1 mm pore size Buchner funnel. The retained fiber was washed with eight 2000 mL portions of hot water (45–55° C.) followed by a single 2000 mL wash with distilled water. The fiber was then dried at 60° C. in a vacuum oven and submitted for carbohydrate analysis. The results are summarized in Table 3.

TABLE 3

NORMALIZED CARBOHYDRATE COMPOSITION OF CORN FIBER TREATED SIMULTANEOUSLY WITH PROTEASE AND AMYLASE AT AN INITIAL PH OF 8.5

| Sample | Sample Type | % glu | % xyl | % gal | % ara | % man | xyl/arb |
|---|---|---|---|---|---|---|---|
| 1 | Untreated Corn Fiber | 63.2 | 18.0 | 4.5 | 12.3 | 1.6 | 1.5 |
| 2 | Treated Corn Fiber | 33.4 | 36.2 | 6.4 | 22.3 | 1.7 | 1.6 |

Notes for Table 3:
Sample 1 was used as received i.e. no destarching and no protease treatment. Sample 2 was destarched and proteolyzed according to the methods herein.

This Example demonstrates that simultaneous addition of amylase and protease at an initial pH of 8.5 allows for rapid and effective destarching and proteolysis of corn fiber. Further, it is not necessary to control the pH, which will inherently decrease, during the reaction. Even further, both enzymes are sufficiently stable and active at pH 8.5 and 80° C. allowing rapid destarching and proteolysis of corn fiber.

Example 5

Extraction of Sterol Esters from Corn Fiber

Three hundred grams of ground corn fiber (3 mm mesh) were placed in a porous bag and in a soxhlet extractor and subjected to ethanol extraction for approximately 15 h (hours). The ethanol was removed in vacuo, thereby providing an ethanol fraction. The ethanol extracted corn fiber was further extracted with diethyl ether for approximately 7 h, thereby providing an ether fraction. Concentration of the ethanol fraction provided 6.7 g of material, while the ether fraction provided 2.7 g of material.

Examination of the two fractions by thin layer chromatography (precoated silica gel 60 $F_{254}$ with a layer thickness of 250 μm; solvent systems: 20:80 MeOH/$CH_2Cl_2$, 100 $CH_2Cl_2$, 100 EtOAc) with UV and phosphomolybidic acid stain detection revealed that only the ethanol fraction contained an UV visible component ($R_f$ 0.51 ($CH_2Cl_2$)). This component was thought to be a phytosterol ferulate ester.

To confirm this assumption, the ethanol fraction was partially separated by passing it through a 25×4.5 cm column packed with silica gel using $CH_2Cl_2$ as the eluting solvent. After a 200 mL precut, 50 mL fractions were collected. The fractions containing a UV visible component were pooled and passed a second time through a 23×4.5 cm column packed with silica gel using 75:25 $CH_2Cl_2$/hexane as the eluting solvent. After four 50 mL precut portions, fractions of 10 mL were collected. The fractions containing an UV visible component, which appeared essentially free from contaminating material, were pooled and concentrated to dryness, yielding 168.7 mg of a white amorphous solid. Examination of this material by field desorption mass spectroscopy revealed two parent ions {MS (FD) m/e 592 $M^+$ and 578 $M^+$}. Accurate mass measurement via electron impact mass spectroscopy with subsequent elemental composition analysis showed the following probable molecular formulas.

TABLE 4A

ANALYSIS OF UV VISIBLE COMPONENTS OF CORN FIBER EXTRACT

| Compound | FD-MS | EI-MS | Calcd | Formula | Error (ppm) |
|---|---|---|---|---|---|
| Sitostanol ferulate | 592 | 592.4490 | 592.4491 | $C_{39}H_{60}O_4$ | 0.3 |
| Campestanol ferulate | 578 | 578.4329 | 578.4335 | $C_{38}H_{58}O_4$ | 1.0 |

Figure 3:
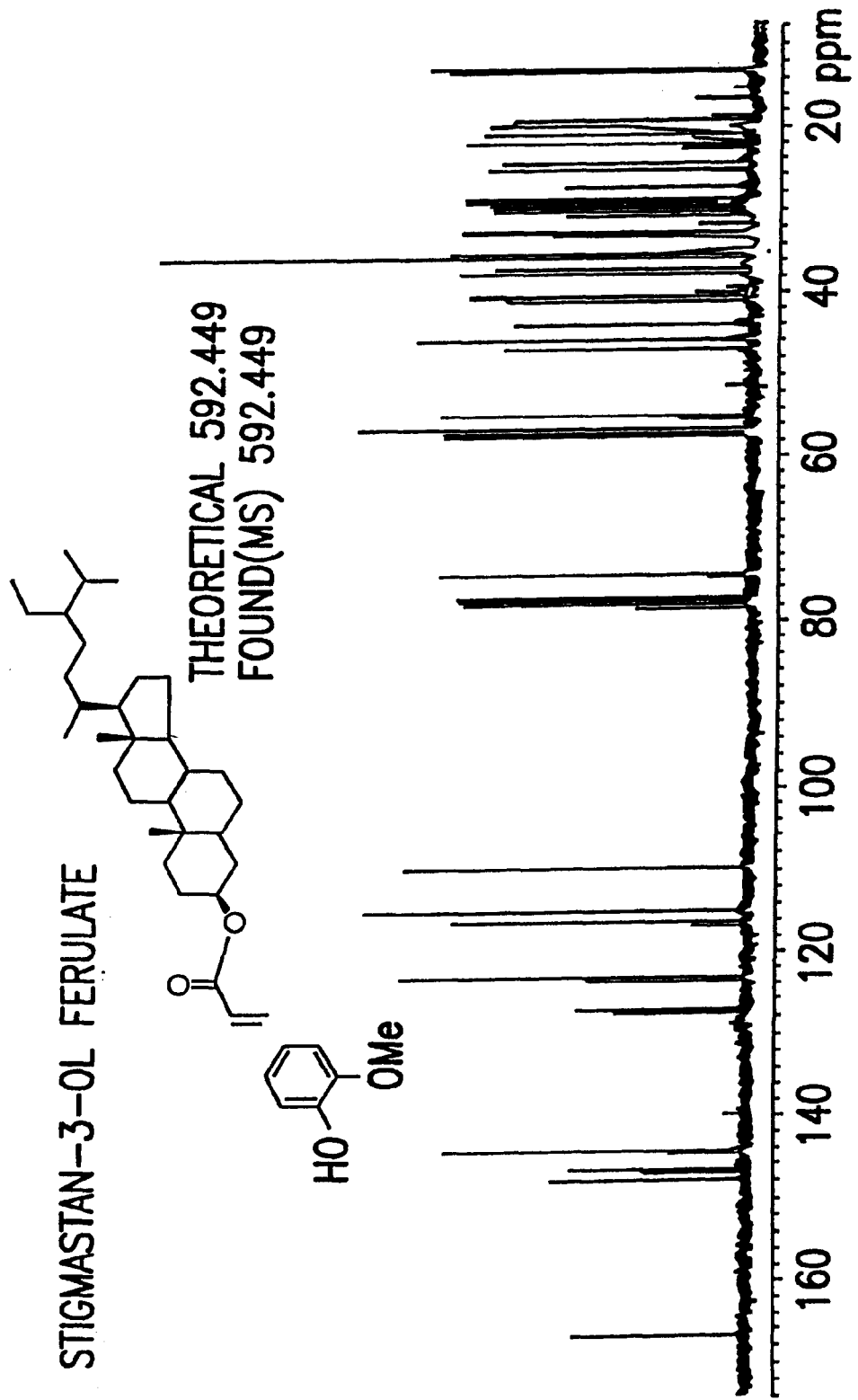
FIG. 3 shows the Carbon 13 NMR spectra of phytosterol ester isolated from destarched corn fiber oil.

$^1$H (300 MHz, $CDCl_3$) and $^{13}$C NMR (75 MHz, $CDCl_3$) spectroscopy (FIG. 3) confirmed the presence of phytosterol ferulate.

Example 6

Comparison of Oil Extraction from Starched and Destarched Corn Fiber

To compare the yield of the lipid fraction from non-destarched and destarched corn fiber, 300 g of unground corn fiber (90% solids, 10% moisture) were extracted with ethanol as described above in Example 5, thereby providing an ethanol fraction. Concentration of this ethanol fraction yielded 5.50 g of oil.

Three hundred grams of corn fiber were then destarched with 85363 TAU of Spezyme AA for 1.5 h according to the general procedure described above in Examples 1, 2 and 3. Surprisingly, the aqueous phase containing the soluble dextrins (corn fiber starch) had no UV active components (as measured by thin layer chromatography) at the appropriate $R_f$. This result indicated that the phytosterol ferulate esters remained with the destarched corn fiber. The aqueous phase was extracted four times with heptane which yielded only 157 mg of oil, thus confirming that very little of the corn oil is removed from the corn fiber during the destarching step. The destarched corn fiber was then extracted with ethanol in a manner identical to that used for the corn fiber that had not been destarched. After evaporation of the ethanol, 12.18 g of oil was obtained.

This Example demonstrates that solvent extraction of corn fiber yields an oil containing high levels of sitostanol ferulate (also called stigmastan-3-ol ferulate). This material has been shown to be effective in lowering human cholesterol. Further, this Example illustrates that destarching of corn fiber followed by solvent extraction provides a markedly higher yield of corn fiber oil (12.18 g) relative to that obtained when the corn fiber was not destarched (5.50 g). Significantly, the yield of corn fiber oil from unground/corn fiber is much higher than that obtained from ground corn fiber (9.40 g), even when the ground corn fiber is subjected to two solvent extractions. Compared to the process of Moreau et al. (U.S. Pat. No. 5,843,499), which requires grinding of the corn fiber to a small particle size before extraction with hexane or supercritical $CO_2$, extraction of unground and destarched corn fiber provides a much simpler process, while still providing higher yields of corn fiber oil. Moreover, the use of wet corn fiber allows further surprising economies in the industrial application of the processes herein.

Example 7

Extraction of Oil from Non-proteolyzed Corn Fiber

A 20.6 g sample of dry unground corn fiber (not enzymatically treated) was extracted with 250 mL of hexane for 60 min. The liquid was then filtered from the fiber through a 10–15 μm glass fritted funnel, washing with enough hexane so as to recover a total of 250 mL of solvent. The fiber was then removed from the frit and it was rinsed with 50 mL of hexane. The hexane was filtered through filter paper prior to concentration in vacuo. The procedure was repeated 6 times giving an average yield of 0.2878±0.0254 g. (1.40±0.12 wt. % oil). The same lot of corn fiber with a 60% moisture content was also extracted for 75 minutes in similar fashion with 219 mL of ethyl acetate or isopropanol at the indicated temperature. Treated corn fiber refers to corn fiber that has been treated to amylase and protease steps as has been described previously. The treated samples were run twice and the average value is given±the standard deviation.

TABLE 4B

COMPARISON OF CORN FIBER OIL EXTRACTION FROM PROTEOLYZED AND NON-PROTEOLYZED CORN FIBER

| Temperature | Solvent | Corn Fiber Type | Oil Mass (g) | Oil Wt. % |
|---|---|---|---|---|
| 22° C. | i-PrOH | Untreated | 0.3725 | 1.81 |
| 22° C. | EtOAc | Untreated | 0.0.3574 | 1.73 |
| 22° C. | i-ProH | Treated | 0.8184 ± 0.0031 | 3.97 ± 0.015 |
| 66° C. | i-PrOH | Untreated | 0.7504 | 3.64 |
| 66° C. | EtOAc | Untreated | 0.6867 | 3.33 |
| 66° C. | i-ProH | Treated | 1.3718 ± 0.0442 | 6.66 ± 0.21 |

Notes for Table 4B: Untreated corn fiber was used as received i.e., not destarched or proteolzyed. Treated corn fiber was destarched and proteolyzed.

It is surprising that compared to the process of Moreau et al. (U.S. Pat. No. 5,843,499), a 4.5 fold increase is seen (from 0.31 wt. %) in the amount of extractable oil from corn fiber. Furthermore, the process of Moreau et al. requires that the fiber be dried and ground prior to extraction. These steps have significant associated energy costs associated which adversely affects the economics of the process, especially if carried out on an industrial scale.

It has been determined that the drying and grinding steps are unnecessary to obtain useful amounts of extractable oil. By extracting wet fiber at elevated temperature the extraction efficiency has been found to be nearly double what can be obtained at room temperature or obtained from dry, unground fiber extracted with hexane. Furthermore, amylase and protease treatment allows further increases in the amount of extractable oils, nearly double in this Example on a same weight basis.

Example 8

Effect of Caustic Extraction Conditions on the Yield and Concentration of Corn Fiber Components The following procedure was used to examine caustic extraction of corn fiber, specifically the influence of NaOH concentration, temperature, time, and method of arabinoxylan precipitation on cellulose and arabinoxylan yield and composition.

Destarched corn fiber was added to a 500 mL three-neck glass round bottom flask containing a solution of NaOH at 80° C. The flask was equipped with a mechanical stirrer and reflux condenser. The reaction was stirred for the designated time and temperature before cooling to room temperature. The mixture of destarched corn fiber in NaOH was then filtered at room temperature to remove the cellulose material. The cellulose material was washed twice with water. The alkaline filtrate was collected to provide a liquid comprising arabinoxylan. The cellulose material was further treated by soxhlet extraction with water for about 14 hours. After extraction, the cellulose material was dried at 60° C. under house vacuum. The alkaline filtrates were combined and the pH of the combined filtrate was adjusted to 5, followed by filtration through celite. Alcohol (about 3/1 ROH/filtrate liquids) was added to the filter cake, giving a gummy precipitate containing arabinoxylan. The precipitate was filtered to remove the alcohol, thereby providing an arabinoxylan-containing precipitate. When nearly all of the liquid had been removed from the precipitate, fresh alcohol was added to harden the arabinoxylan precipitate. The isolated arabinoxylan precipitate was dried at 60° C. under vacuum.

In each case, precipitation of the arabinoxylan with alcohol gave a highly colored (tan to black) solid containing arabinoxylan. For each case, the arabinoxylan was redissolved in water (about. 10 wt. % solids) and precipitated with acetic acid (ca. 4/1 HOAc/water) which provided a white solid.

TABLE 5

EFFECT OF EXTRACTION CONDITIONS ON ARABINOXYLAN (PROPERTIES)

| Sample | NaOH (M) | Temp (° C.) | % Yield ROH | % Yield HOAc | Total[5] Carb ROH | Total[5] Carb HOAc | % Glu ROH | % Xyl ROH | % Gal ROH | % Ara ROH |
|---|---|---|---|---|---|---|---|---|---|---|
| 1[1] | 0.63 | 101 | 40.3[3] | 18.7 | 80.8 | 88.7 | 1 | 56 | 10 | 34 |
| 2[1] | 0.63 | 101 | 38.4[3] | 26.7 | 78.1 | 86.4 | 1 | 54 | 10 | 35 |
| 3[1] | 1.25 | 100 | 43.1[3] | 29.6 | 76.6 | 88.9 | 3 | 56 | 9 | 32 |
| 4[1] | 1.25 | 102 | 40.2[3] | 24.1 | 83.0 | 89.7 | 1 | 56 | 9 | 34 |
| 5[1] | 2.5 | RT | 31.1[3] | 22.7 | 78.6 | 84.0 | 7 | 51 | 9 | 33 |
| 6[1] | 2.5 | 60 | 47.0[3] | 35.2 | 73.4 | 85.8 | 8 | 51 | 10 | 31 |
| 7[1] | 2.5 | 80 | 72.4[4] | Nd | 42.4 | nd | 7 | 50 | 9 | 34 |
| 8[2] | 2.5 | 80 | 60.6[4] | 32.7 | 71.7 | 85.9 | 8 | 51 | 9 | 32 |
| 9[2] | 2.5 | 80 | 58.7[4] | 34.4 | 72.1 | 86.2 | 7 | 51 | 9 | 32 |
| 10[2] | 2.5 | 80 | 59.9[4] | 32.9 | 66.6 | 82.6 | 7 | 50 | 9 | 35 |
| 11[2] | 2.5 | 102 | 45.3[3] | 30.4 | 71.9 | 84.2 | 5 | 54 | 10 | 31 |
| 12 | 2.5 | 120 | 50.9[3] | 37.1 | 80.6 | 88.0 | 3 | 55 | 9 | 33 |
| 13[1] | 3.75 | 101 | 52.6[3] | 13.5 | 69.4 | 87.8 | 5 | 54 | 10 | 32 |

| Sample | % Man ROH | Xyl/Ara ROH | % Glu Ac | % Xyl Ac | % Gal Ac | % Ara Ac | % Man Ac | Xyl/Ara Ac | % C[6] | % H[6] |
|---|---|---|---|---|---|---|---|---|---|---|
| 1[1] | 0 | 1.7 | 1 | 54 | 10 | 35 | 0 | 1.5 | 42.3 | 6.7 |

TABLE 5-continued

EFFECT OF EXTRACTION CONDITIONS ON ARABINOXYLAN (PROPERTIES)

| | | | | | | | | | | |
|---|---|---|---|---|---|---|---|---|---|---|
| 2[1] | 0 | 1.5 | 1 | 54 | 10 | 35 | 0 | 1.5 | 41.9 | 7.0 |
| 3[1] | 0 | 1.7 | 3 | 54 | 10 | 34 | 0 | 1.6 | 42.1 | 7.1 |
| 4[1] | 0 | 1.7 | 1 | 55 | 9 | 35 | 0 | 1.6 | 42.3 | 6.6 |
| 5[1] | 0 | 1.6 | 7 | 51 | 8 | 34 | 0 | 1.5 | 36.7 | 5.4 |
| 6[1] | 0 | 1.7 | 9 | 51 | 9 | 31 | 0 | 1.6 | 31.4 | 4.6 |
| 7[1] | 0 | 1.5 | nd | nd | nd | nd | nd | nd | 15.7 | 2.4 |
| 8[2] | 0 | 1.6 | 7 | 51 | 9 | 32 | 0 | 1.6 | 35.0 | 6.0 |
| 9[2] | 0 | 1.6 | 7 | 52 | 9 | 32 | 0 | 1.6 | 15.3 | 2.3 |
| 10[2] | 0 | 1.4 | 6 | 51 | 9 | 33 | 0 | 1.5 | 28.1 | 4.9 |
| 11[2] | 0 | 1.7 | 8 | 51 | 9 | 32 | 0 | 1.6 | 37.9 | 5.9 |
| 12 | 0 | 1.7 | 4 | 55 | 9 | 32 | 0 | 1.7 | 38.0 | 6.7 |
| 13[1] | 0 | 1.7 | 5 | 53 | 9 | 33 | 0 | 1.6 | 36.9 | 6.1 |

TABLE 6

EFFECT OF EXTRACTION CONDITIONS ON PROPERTIES OF CELLULOSE MATERIAL

| Sample | NaOH (M) | Time (h) | Temp (° C.) | % Yield Cellulose | Total[5] Carb | % Glu ROH | % Xyl ROH | % Gal ROH | % Ara ROH | % Man ROH | Xyl/Ara ROH | % C[6] | % H[6] | Total % Yield Polysaccharide (ROH) | Total % Yield Polysaccharide (HOAc) | % Cellulose I |
|---|---|---|---|---|---|---|---|---|---|---|---|---|---|---|---|---|
| 1[1] | 0.63 | 1 | 101 | 28.8 | 82.8 | 63 | 21 | 4 | 10 | 2 | 2 | 45.4 | 7.4 | 69.1 | 47.5 | Nd |
| 2[1] | 0.63 | 8 | 101 | 24.5 | 90.4 | 68 | 17 | 3 | 8 | 3 | 2 | 42.6 | 6.9 | 62.9 | 51.2 | Nd |
| 3[1] | 1.25 | 1 | 100 | 25.4 | 83.9 | 71 | 15 | 3 | 7 | 3 | 2 | 43.0 | 7.0 | 68.5 | 55 | 100 |
| 4[1] | 1.25 | 8 | 102 | 22.0 | 80.1 | 72 | 15 | 3 | 7 | 3 | 2 | 42.4 | 6.7 | 62.2 | 46.1 | Nd |
| 5[1] | 2.5 | 4 | RT | 41.8 | 69.9 | 55 | 24 | 6 | 13 | 2 | 2 | 45.5 | 7.2 | 72.9 | 64.5 | 100 |
| 6[1] | 2.5 | 4 | 60 | 30.0 | 76.6 | 82 | 8 | 2 | 5 | 3 | 2 | 25.2 | 3.6 | 77.0 | 65.2 | 50 |
| 7[1] | 2.5 | 0.5 | 80 | 20.7 | 79.1 | 83 | 8 | 2 | 5 | 2 | 2 | 41.0 | 6.5 | 93.1 | nd | 75 |
| 8[2] | 2.5 | 1 | 80 | 21.5 | 78.6 | 84 | 7 | 2 | 4 | 3 | 2 | 35.7 | 5.8 | 82.1 | 54.2 | 50 |
| 9[2] | 2.5 | 2 | 80 | 21.3 | 77.9 | 87 | 6 | 1 | 3 | 3 | 2 | 36.9 | 6.0 | 80.0 | 55.7 | nd |
| 10[2] | 2.5 | 4 | 80 | 22.9 | 71.1 | 82 | 8 | 2 | 5 | 3 | 2 | 36.1 | 5.3 | 82.8 | 55.8 | 50 |
| 11[2] | 2.5 | 4 | 102 | 17.4 | 82.4 | 91 | 4 | 1 | 2 | 3 | 2 | 39.1 | 6.2 | 62.7 | 47.8 | nd |
| 12 | 2.5 | 4 | 120 | 15.2 | 92.0 | 91 | 4 | 1 | 1 | 3 | 3 | 43.2 | 6.9 | 66.1 | 52.3 | nd |
| 13[1] | 3.75 | 8 | 101 | 22.9 | 60.4 | 77 | 11 | 2 | 7 | 3 | 2 | 37.2 | 5.8 | 75.5 | 36.4 | nd |

Notes for Tables 5 and 6: All reactions at 5% solids. nd = not determined.
[1]Bacillus was used for destarching fiber.
[2]A. Oryzae was used for destarching corn fiber.
[3]ROH = MeOH.
[4]ROH = EtOH.
[5]Carbohydrate balance from carbohydrate analysis.
[6]Carbon and hydrogen analysis was performed on the arabinoxylan samples isolated by ROH precipitation.

For an arabinoxylan consisting of 90% C5 sugars and 10% C6 sugars, the expected values are 45.39% carbon and 6.11% hydrogen. For cellulose material, the expected values are 44.45% carbon and 6.21% hydrogen.

A number of significant results are demonstrated by Tables 5 and 6. First, the method of arabinoxylan precipitation from the caustic solution has a significant impact on the purity and quality of the arabinoxylan obtained. Precipitation of the arabinoxylan from the caustic extraction solution using EtOH generally resulted in higher yields (59 to 72%, Samples 7 to 10). However, analysis by HPLC indicated that only 42 to 72% of the samples comprised carbohydrate; elemental analysis revealed that the carbon and hydrogen percentages significantly deviated from the theoretical values. Furthermore, the samples precipitated using EtOH were highly colored (brown-black) indicating significant contamination by salts and other organic materials. Precipitation of the arabinoxylan from the caustic extraction solution using MeOH resulted in lower yields of arabinoxylan (31 to 52%, Samples 1 to 6, 11 to 13), improved carbohydrate balance (72 to 80%), and slightly improved color (brown). Precipitation of the arabinoxylan from the caustic extraction solution using HOAc gave a more pure form of arabinoxylan with yields in the range of 24 to 37%, good carbohydrate balance (83 to 90%), and excellent color (white-off white). These results indicate that precipitation with HOAc provides arabinoxylan of higher purity and significantly improved color.

Second, the best combination of maximum arabinoxylan yield and cellulose purity, based on a single caustic extraction, was obtained at 2.5 M NaOH concentration in the temperature range of 60° C. to 120° C. Under these conditions, the percent xylose (as measured by carbohydrate analysis) is reduced slightly from that observed under the other stated conditions i.e., from 54 to 55% to 51 to 52%, but the xyl/arb ratio remains constant at about 1.6.

With respect to the cellulose component, the highest yield of derivatizable cellulose was obtained at a NaOH concentration of 2.5 M at 25° C. As the temperature or reaction time is increased at a fixed concentration of 2.5 M NaOH, the yield of cellulose decreases but, very importantly, the α-purity (% glucose) of the cellulose increases. The highest level of purity for the cellulose (91%) was obtained at 2.5 M NaOH at 100° C. and 120° C. It should be noted that the percentage of cellulose I in these samples was unpredictable and ranged from 50 to 100%.

Collectively, Example 8 demonstrates that, for a single extraction, the best balance of conditions for optimal polysaccharide yield and purity is 2.5 M NaOH at 80° C. followed by precipitation of the extracted arabinoxylan in acetic acid.

Example 9

Examination of Different Caustic Types on Extraction

The general procedure of Example 8 was used to examine the effect of different caustic types, i.e., KOH and Ca(OH)$_2$, on the separation of destarched corn fiber into arabinoxylan and cellulose fractions in comparison to when the caustic was NaOH.

was utilized as the base. Also, the arabinoxylan obtained using either KOH or Ca(OH)$_2$ had a lower percent glucose and slightly higher percent arabinose (as measured by carbohydrate analysis).

From Table 8 it is apparent that, in terms of the cellulose component, when Ca(OH)$_2$ was utilized as the base, the excessively high yields and the poor carbohydrate balance indicate that Ca(OH)$_2$ is not removed from the cellulose fraction, probably due to the low solubility of Ca(OH)$_2$ in water. The carbohydrate and the carbon, hydrogen analyses

TABLE 7

EFFECT OF CAUSTIC TYPE, TEMPERATURE AND CONCENTRATION ON ARABINOXYLAN EXTRACTION

| Sample | NaOH (M) | Time (h) | Temp (° C.) | % Yield ROH | % Yield HOAc | Total[5] Carb ROH | Total[5] Carb HOAc | % Glu ROH | % Xyl ROH | % Gal ROH | % Arabinoxylan ROH |
|---|---|---|---|---|---|---|---|---|---|---|---|
| 1[1] | 1.78 KOH | 4 | 102 | 38.4[3] | 31.2 | 83.1 | 83.3 | 1 | 53 | 10 | 36 |
| 2[1] | Sat. Ca(OH)$_2$ | 4 | 60 | 18.8[3] | 15.2 | 48.4 | na | 0 | 54 | 9 | 37 |
| 3[1] | Sat. Ca(OH)$_2$ | 4 | 102 | 30.7[3] | 22.2 | 85.7 | 87.8 | 0 | 55 | 10 | 35 |
| 4[1] | Sat. Ca(OH)$_2$ | 4 | 120 | 26.5[3] | 12.8 | 81.4 | 84.7 | 1 | 55 | 10 | 34 |
| 5[1] | Sat. Ca(OH)$_2$ | 8 | 100 | 28.4[3] | 22.8 | 79.2 | 85.7 | 0 | 55 | 10 | 35 |
| 6[1] | 2.5 NaOH | 4 | 60 | 47.0[3] | 35.2 | 73.4 | 85.8 | 8 | 51 | 10 | 31 |
| 7[2] | 2.5 NaOH | 4 | 102 | 45.3[3] | 30.4 | 71.9 | 84.2 | 5 | 54 | 10 | 31 |
| 8 | 2.5 NaOH | 4 | 120 | 50.9[3] | 37.1 | 80.6 | 88.0 | 3 | 55 | 9 | 33 |

| Sample | % Man ROH | Xyl/Ara ROH | % Glu Ac | % Xyl Ac | % Gal Ac | % Ara Ac | % Man Ac | Xyl/Ara Ac | % C[6] | % H[6] |
|---|---|---|---|---|---|---|---|---|---|---|
| 1[1] | 0 | 1.5 | 1 | 54 | 10 | 36 | 0 | 1.5 | 41.68 | 7.02 |
| 2[1] | 0 | 1.4 | 0 | 55 | 9 | 36 | 0 | 1.5 | 41.03 | 6.16 |
| 3[1] | 0 | 1.5 | 0 | 55 | 9 | 35 | 0 | 1.6 | 42.86 | 7.11 |
| 4[1] | 0 | 1.6 | 0 | 55 | 9 | 35 | 0 | 1.6 | 42.04 | 7.43 |
| 5[1] | 0 | 1.6 | 0 | 55 | 9 | 36 | 0 | 1.5 | 42.47 | 7.08 |
| 6[1] | 0 | 1.7 | 9 | 51 | 9 | 31 | 0 | 1.6 | 31.4 | 4.6 |
| 7[2] | 0 | 1.7 | 8 | 51 | 9 | 32 | 0 | 1.6 | 37.9 | 5.9 |
| 8 | 0 | 1.7 | 4 | 55 | 9 | 32 | 0 | 1.7 | 38.0 | 6.7 |

TABLE 8

EFFECT OF CAUSTIC TYPE, TEMPERATURE AND CONCENTRATION ON CELLULOSE

| Entry | NaOH (M) | Time (h) | Temp (° C.) | % Yield Cellulose | Total[5] Carb | % Glu ROH | % Xyl ROH | % Gal ROH | % Ara ROH | % Man ROH | Xyl/Ara ROH | % C[6] | % H[6] |
|---|---|---|---|---|---|---|---|---|---|---|---|---|---|
| 1[1] | 1.78 KOH | 4 | 102 | 25.8 | 95.0 | 68 | 17 | 3 | 8 | 3 | 2.0 | 44.72 | 7.18 |
| 2[1] | Sat. Ca(OH)$_2$ | 4 | 60 | >100 | 14.1 | 51 | 26 | 5 | 16 | 2 | 1.6 | 14.26 | 3.57 |
| 3[1] | Sat. Ca(OH)$_2$ | 4 | 102 | >100 | 22.7 | 55 | 21 | 5 | 13 | 7 | 1.6 | 13.06 | 3.57 |
| 4[1] | Sat. Ca(OH)$_2$ | 4 | 120 | >100 | 16.4 | 62 | 22 | 4 | 12 | 0 | 1.8 | 9.51 | 3.04 |
| 5[1] | Sat. Ca(OH)$_2$ | 8 | 100 | >100 | 11.2 | 57 | 23 | 4 | 14 | 2 | 1.7 | 12.55 | 2.19 |
| 6[1] | 2.5 NaOH | 4 | 60 | 30.0 | 76.6 | 82 | 8 | 2 | 5 | 3 | 2 | 25.2 | 3.6 |
| 7[2] | 2.5 NaOH | 4 | 102 | 17.4 | 82.4 | 91 | 4 | 1 | 2 | 3 | 2 | 39.1 | 6.2 |
| 8 | 2.5 NaOH | 4 | 120 | 15.2 | 92.0 | 91 | 4 | 1 | 1 | 3 | 3 | 43.2 | 6.9 |

Carbon and hydrogen analyses were performed on the arabinoxylan samples isolated by ROH precipitation.

For an arabinoxylan consisting of 90% C5 sugars and 10% C6 sugars, the expected vales are 45.39% carbon and 6.11% hydrogen. For cellulose, the expected values are 44.45% carbon and 6.21% hydrogen.

From Table 7 it is apparent that caustic extraction of the corn fiber with either KOH or Ca(OH)$_2$ provided a lower yield of arabinoxylan relative to that obtained when NaOH indicated that the K salts were most easily removed from the cellulose relative to Ca(OH)$_2$ and NaOH. Importantly, the α-purity (% glucose) of the cellulose obtained using Ca(OH)$_2$ and KOH (51 to 68%) was much less than that obtained using NaOH (82 to 91%).

When taken together, the results from Tables 7 and 8 indicate that NaOH provides the most satisfactory balance of qualities for both the arabinoxylan and cellulose aspects of the present invention. KOH also provides satisfactory results, but it is not as good as NaOH.

Example 10

Examination of Solids Level on NaOH Extraction

Following the general procedure of Example 8 above, destarched corn fiber was separated into arabinoxylan and cellulose fractions by treating the corn fiber with NaOH at 80° C. for 1 hour and varying the solids and NaOH concentration as specified in the following tables.

TABLE 9

EFFECT OF SOLIDS LEVEL AND NAOH CONCENTRATION ON ARABINOXYLAN PROPERTIES

| Sample | NaOH (M) | % Solids | % Yield Ara | Total Carb | % Glu | % Xyl | % Gal | % Ara | % Man | Xyl/Ara | % C | % H |
|---|---|---|---|---|---|---|---|---|---|---|---|---|
| 1 | 2.5 | 5 | 32.7 | 85.9 | 7 | 51 | 9 | 32 | 0 | 1.6 | 34.98 | 6.02 |
| 2 | 2.5 | 10 | 31.1 | 81.9 | 6 | 51 | 9 | 34 | 0 | 1.5 | 34.7 | 6.35 |
| 3 | 2.5 | 15 | 32.0 | 89.3 | 4 | 51 | 11 | 34 | 0 | 1.5 | 39.58 | 6.04 |
| 4 | 2.5 | 20 | 27.5 | 75.2 | 2 | 53 | 9 | 35 | 0 | 1.5 | 40.08 | 7.19 |
| 5 | 5 | 10 | 33.3 | 85.7 | 8 | 50 | 9 | 33 | 0 | 1.5 | 33.72 | 5.41 |
| 6 | 10 | 20 | 33.9 | 85.0 | 9 | 50 | 9 | 32 | 0 | 1.6 | 29.53 | 6.62 |

TABLE 10

EFFECT OF SOLIDS LEVEL AND NAOH CONCENTRATION ON CELLULOSE PROPERTIES

| Sample | NaOH (M) | % Solids | % Yield Cellulose | Total Carb | % Glu | % Xyl | % Gal | % Ara | % Man | Xyl/Ara | % C | % H |
|---|---|---|---|---|---|---|---|---|---|---|---|---|
| 1 | 2.5 | 5 | 21.5 | 78.6 | 84 | 7 | 2 | 4 | 3 | 1.8 | 35.73 | 5.75 |
| 2 | 2.5 | 10 | 23.0 | 79.5 | 79 | 10 | 2 | 5 | 3 | 1.9 | 36.15 | 5.96 |
| 3 | 2.5 | 15 | Nd | 64.2 | 63 | 20 | 4 | 11 | 2 | 1.7 | 34.37 | 5.16 |
| 4 | 2.5 | 20 | 26.4 | 84.2 | 71 | 16 | 3 | 8 | 2 | 2.0 | 39.19 | 6.15 |
| 5 | 5 | 10 | 25.9 | 58.3 | 81 | 9 | 2 | 5 | 3 | 1.6 | 35.37 | 5.68 |
| 6 | 10 | 20 | 24.8 | 70.3 | 85 | 7 | 2 | 3 | 3 | 2.1 | 32.49 | 5.33 |

It was found that at above 10% solids i.e., the amount of corn fiber utilized in the caustic extraction step, the viscosity of the caustic solution/corn fiber mixture at room temperature was high, making it difficult to separate the solution comprising arabinoxylan from the cellulose material. The amount of solids in the reaction mixture did not have a significant effect on arabinoxylan yield or composition. However, surprisingly, increasing the solids at a constant NaOH concentration led to lower α purity (% glucose) for the cellulose. By increasing the NaOH concentration, the purity of the cellulose could be increased significantly so that, for example, at 20% solids and 10 M NaOH, the purity of the cellulose was comparable to that obtained at 2.5 M NaOH and 5% solids.

Example 11

Effect of Differing Caustic Strength, Times and Temperatures on Arabinoxylan Extraction Examples 9 and 10 above provide results when both polysaccharide fractions (cellulose material and arabinoxylan) are obtained as products when the objective was obtaining the maximum purity for each material. However, with the invention herein it is possible to achieve a suitable industrial process by focusing on one polysaccharide component.

In this regard, the rate of extraction of the arabinoxylan fraction was examined by using a ReactIR 1000 Spectrometer as described above in Example 3. The extraction of the arabinoxylan from the corn fiber was monitored by following the appearance of solubilized arabinoxylan in solution. The soluble fraction was measured by infrared spectroscopy by measuring the peak area at 1050–1010 $cm^{-1}$ with baseline definition between 1098–988 $cm^{-1}$. The extraction of arabinoxylan from the corn fiber was considered to be complete when the concentration of soluble species in the extractant no longer increased.

Figure 4:
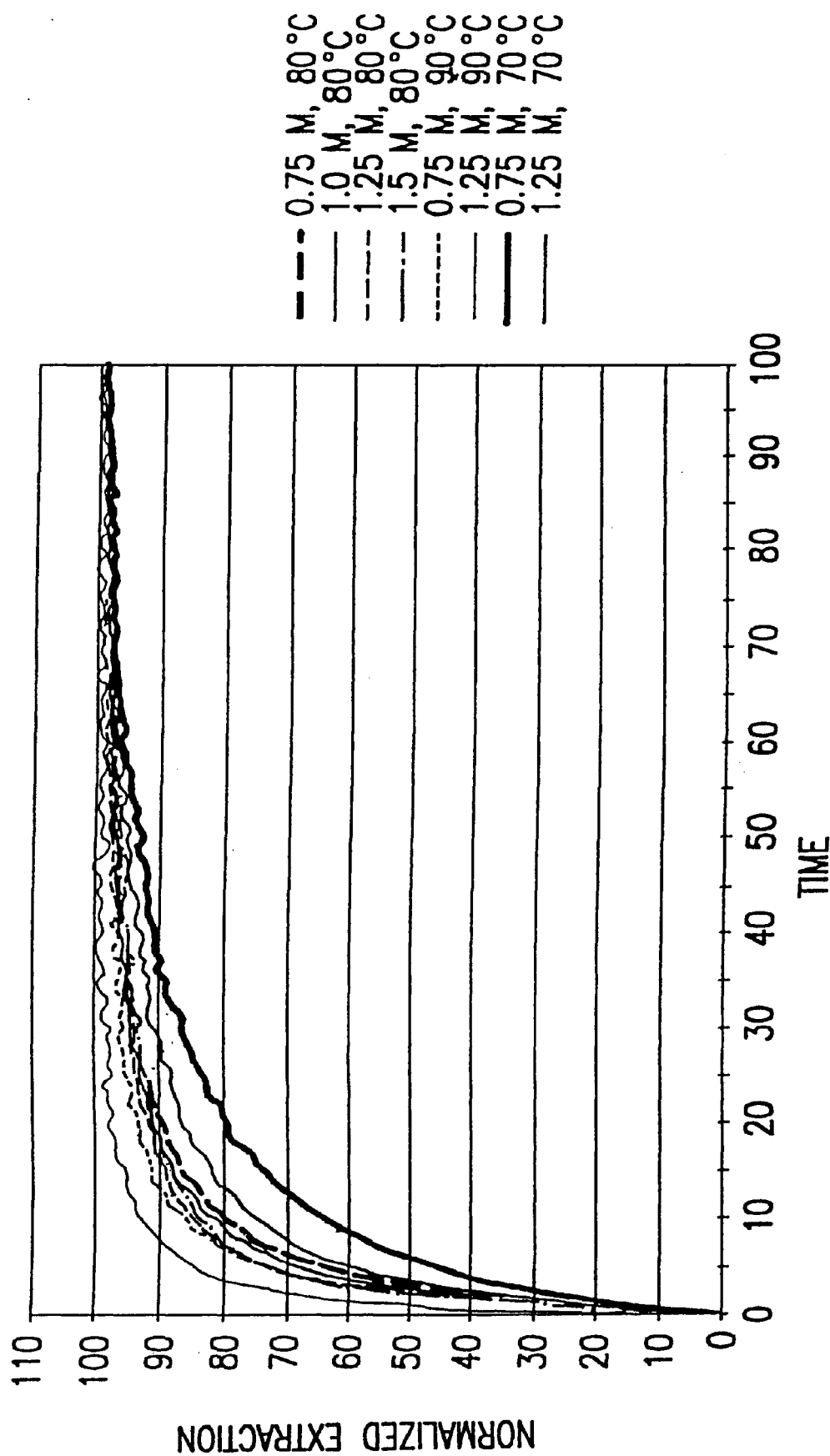
FIG. 4 shows the caustic extraction rates of destarched corn fiber measured in situ where the solubilized arabinoxylan has been normalized to total extractables.

The results are summarized in FIG. 4, in which a number of key points are illustrated. First, the extraction of arabinoxylan from the corn fiber can occur very rapidly depending upon the combination of temperature and caustic strength utilized. Surprisingly, the extraction rate is quite rapid at low caustic strengths, provided the temperature is high. (See FIG. 4, 0.75 M NaOH, 90° C.) That is, temperature appears to have a more significant effect on arabinoxylan extraction rates than caustic strength alone. Conversely, a lower temperature can be used when the caustic strength is high. (See 1.25 M NaOH, 70° C.) In the case of 1.25 M NaOH at 90° C. (higher caustic strength and higher temperature), essentially all of the arabinoxylan is extracted from the corn fiber in about 20 minutes and approximately 90% of arabinoxylan is extracted in about 8 minutes. These unexpected observations illustrate that significant quantities of the arabinoxylan can be extracted from the corn fiber in much shorter times at lower caustic strengths than previously disclosed. This indicates that arabinoxylan can be extracted from corn fiber using a continuous extraction process which greatly simplifies the isolation of arabinoxylan from corn fiber and allows marked economies in industrial processes.

Furthermore, in contrast to prior reports, no ferulate esters were observed even under the more mild extraction conditions. (L. Saulnier, C. Marot, E. Chanliaud, J.-F. Thibault, Carbohydrate Polym., 1995, 26, 279–287.)

Example 12

Extraction of Arabinoxylan from Corn Fiber at Low Caustic Strength and Short Contact Times Dried, destarched corn fiber (24.5 g) was rehydrated with 200 mL $H_2O$ and heated to 65° C. Hot, 0.5 M aqueous NaOH (225 ml) was added and the resulting mixture (70 to 75° C.) was stirred for 7 minutes before filtering through a Buchner funnel. The residual solids were washed with water (400 mL) for 8 minutes. The extractant contained approximately 2 to 3% solids and was centrifuged for 10 min at 2000 rpm, yielding a paste and a liquid. The liquid was decanted from the paste and concentrated. Arabinoxylan was precipitated from the liquid using AcOH. 3.71 g of arabinoxylan (15% yield from destarched corn fiber) was obtained.

This Example, which is illustrative of contacting the corn fiber very briefly with caustic, illustrates that significant yields of arabinoxylan can be obtained very rapidly with little or no effect on the ability to filter the caustic from the corn fiber.

Example 13

Effect of Multiple Caustic Contacting Steps on Arabinoxylan Extraction

Figure 5:
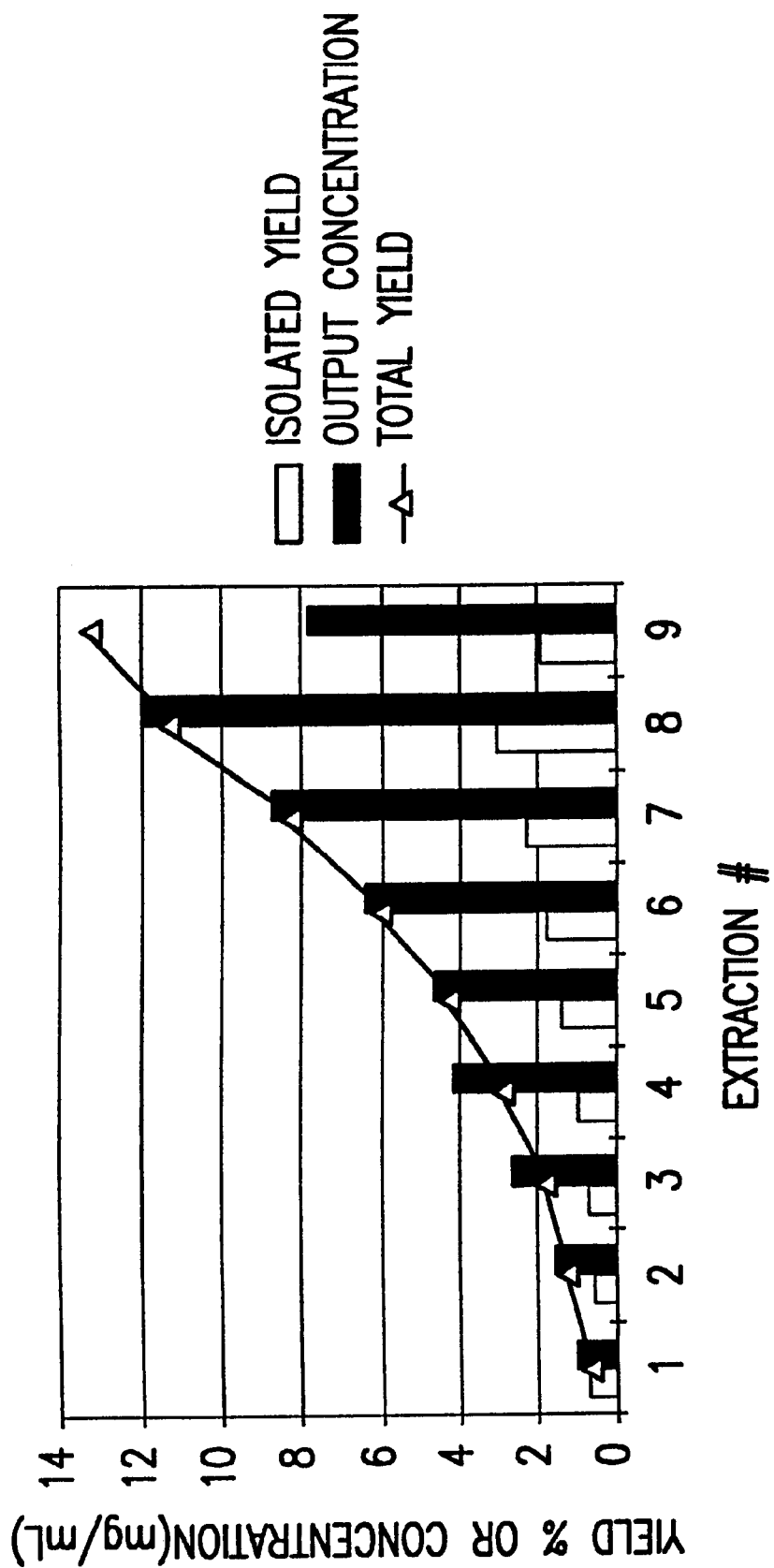
FIG. 5 shows the isolated yield of hemicellulose for each extraction step in a continuous extraction of destarched corn fiber.

Dried, destarched corn fiber (25.0 g) was rehydrated with 200 mL $H_2O$ and heated to 65° C. The corn fiber was added to a 600 mL glass fritted funnel with a pore size of 70 to 100. Warm 0.5 M aqueous NaOH (100 mL) was added and the resulting mixture (55 to 60° C.) was stirred for 3 seconds before filtering. This process was repeated 7 times (19 min total) and an additional time with 200 mL of water (no caustic). The filtrate from each caustic extraction was collected, concentrated and treated with AcOH to precipitate arabinoxylan. The overall yield of arabinoxylan from the combined caustic extractions was 13.3%. FIG. 5 shows the isolated yield, output concentration and total yield plotted for each extraction.

This Example demonstrates that arabinoxylan can be extracted from corn fiber in a continuous process by using multiple short contact steps of caustic with destarched corn fiber. It is significant in this Example that very low caustic strength can be used to obtain satisfactory extraction of arabinoxylan from the corn fiber. In contrast to prior reports, no ferulate esters were observed by NMR spectroscopy. (L. Saulnier, C. Marot, E. Chanliaud, J.-F. Thibault. Carbohydrate Polym., 26(1995), pp. 279–287.

Example 14

Microscopic Examination of Reason for Filtering Difficulty

Long exposure of destarched corn fiber to caustic was seen to cause difficulty in separating the caustic solution containing arabinoxylan from the cellulose material. In order to determine the source of the difficult filtration, the heterogeneous caustic extraction mixture was examined by optical microscopy.

Figure 6:
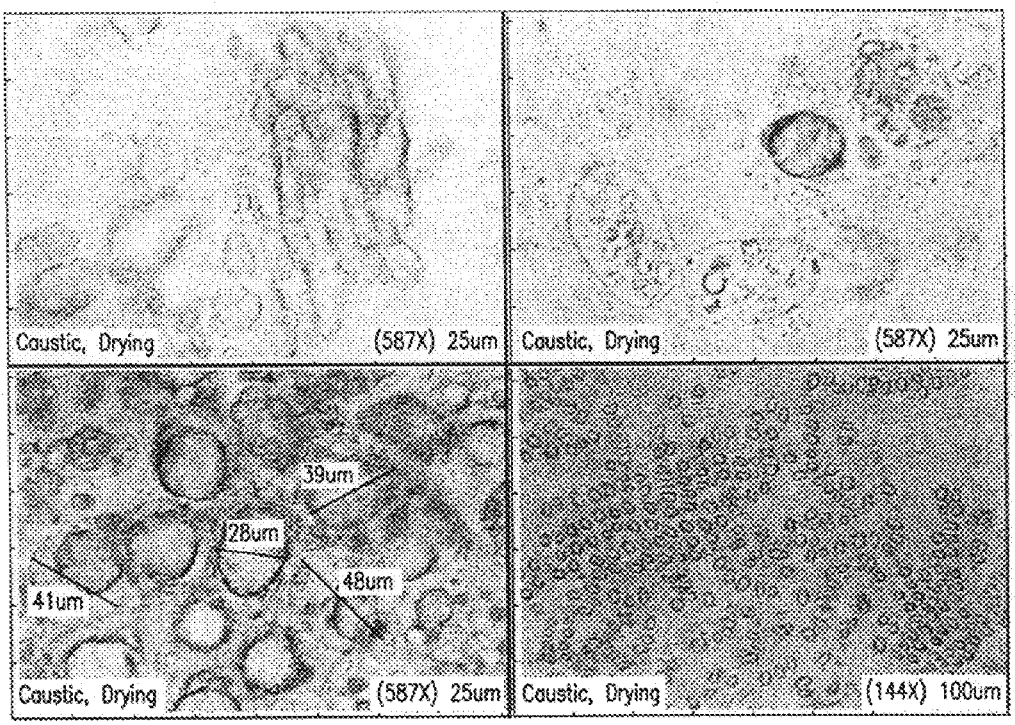
FIG. 6 is a photomicrograph of small particles that can often be present in liquids after caustic extraction of destarched corn fiber.

After caustic treatment and treatment with AcOH, the cellulose material was made of fibers of significant length. In the absence of other contaminates, filtration of these fibers would not be problematic. However, it was found that the presence of lipid, proteinacious material, and/or starch granules in the heterogeneous caustic extraction mixture caused difficulty in filtering the cellulose fiber from the caustic extractant. (FIG. 6.) This difficulty appeared to be caused by a clogging of the filter with the small particle size proteinacious material and/or starch granules. Accordingly, experiments were performed to determine ways in which the filtration process could be optimized.

Example 15

Effect of Proteolysis and Lipid Extraction on Corn Fiber Purity and Ease of Filtration of the Liquid Comprising Arabinoxylan This Example demonstrates the effect of proteolysis and lipid extraction on such variables as corn fiber purity and filtration ease. This Example further demonstrates that the combination of destarching and proteolysis of corn fiber provides a significant higher yield of corn fiber oil relative to that obtained from unground or ground corn fiber that was not subjected to these enzymatic reactions.

A 100 mL round-bottom flask was charged with 5 g (3.67 g dry weight basis) of destarched corn fiber (Sample 1), 72 mL of deionized water, and 8.0 mL of 1.0 M sodium phosphate buffer (pH 7). The mixture was heated to 40° C. before addition of 1.0 mL (42 GSU) of Purafect 4000L, a protease enzyme (Genencor, Palo Alto, Calif.). The mixture was stirred for 18 h at 40° C. before being allowed to cool to room temperature over a 30 min time period. The sample was filtered, washed with 250 mL of deionized water, and dried at 50° C. in vacuo to provide 2.7 g of coarse fiber (Sample 2). Fine particles were removed from the filtrate by centrifugation. The fines were re-suspended in water, removed from the water by centrifugation, and dried at 50° C. in vacuo which gave 0.28 g of fines (Sample 3). The filtrate from which the fine particle solids were removed was concentrated to dryness which gave a yellow solid (Sample 4). The results are summarized in Table 11.

TABLE 11

EFFECT OF DESTARCHING AND PROTEOLYSIS ON CORN FIBER FILTRATION

| Sample | Description | % nitrogen | % Glu | % Xyl | % Gal | % Ara | % Man | Xyl/Ara |
|---|---|---|---|---|---|---|---|---|
| 1 | Destarched Corn Fiber | 1.26 | 33.7 | 35.5 | 5.3 | 23.7 | 2.0 | 1.5 |
| 2 | Destarched, Proteolyzed Corn Fiber | 0.19 | 32.9 | 38.1 | 5.7 | 22.0 | 1.5 | 1.7 |
| 3 | Fines From Proteolyzed Corn Fiber Filtrate | 1.09 | 60.6 | 18.5 | 4.8 | 10.9 | 5.2 | 1.7 |
| 4 | Yellow Solid | 1.62 | nd | nd | nd | nd | nd | nd |

This Example illustrates that treatment of destarched corn fiber with a protease enzyme significantly lowers the percent nitrogen in the remaining coarse corn fiber to near the limit of detection (compare Samples 1 and 2). Significantly, nearly all of the protein is found in the fines and filtrate liquids (Samples 2 and 4.) Furthermore, proteolysis of the destarched corn fiber lowers the percent glucose while increasing the percent xylose (Sample 2). In contrast, the unwanted fines have significantly more glucose (60.6%, Sample 3).

Collectively, this data demonstrates that treatment of destarched corn fiber with a protease enzyme removes nearly all of the protein fraction, thus providing a cleaner corn fiber that ultimately leads to a cleaner arabinoxylan and cellulose fraction (vide infra).

In a further examination of the filtration step, dried, destarched, protease treated, and oil extracted corn fiber (19.3 g) was rehydrated with $H_2O$ (100 mL) at 60° C. for 30 minutes. To this was added hot (95° C.) 1.0 M aqueous NaOH (250 mL) and the resulting mixture (80° C.) was stirred and heated to 95° C. over 20 minutes. The slurry had a volume of approximately 400 mL and was filtered in a 600 mL glass fritted funnel with a pore size of 70–100 μm. Filtration of this destarched, proteolyzed corn fiber was completed in only 2 minutes with subsequent $H_2O$ washes (~250 mL each) taking between 30–45 seconds. The filtrate was concentrated before precipitation of the arabinoxylan with HOAc to provide 6.30 g of hemicellulose (33% yield). Significantly and surprisingly, without removal of the protein fraction, such filtration would normally require about 12 h. Thus, in a preferred method of the invention herein, it is critical to subject the corn fiber, whether destarched or not, to a proteolysis treatment.

A similar reaction was carried out utilizing destarched and protease treated corn fiber from which the corn fiber oil had not been extracted. This corn fiber was treated to more extreme caustic conditions (2.5 M NaOH at 80° C. for 4 hours). Again, significantly and surprisingly, filtration and rinsing also occurred rapidly. This demonstrates that proteolysis of the corn fiber also increases the filtration efficacy even when corn fiber oil has not been extracted from the corn fiber.

In summary, this Example demonstrates that after removal of the protein component from the corn fiber, separation of the caustic slurry from the cellulose fraction by filtration can be carried out without difficulty. This method is very efficient and suitable for an industrial setting. It is not necessary to carry out partial fractionation of the corn fiber to achieve more reasonable filtration speeds as described earlier. Short caustic treatments as well as long, high caustic strength and high temperature treatments both provide reaction mixtures that can be filtered with ease. Finally, it is not necessary to remove the oil content from the corn fiber prior to caustic extraction to achieve rapid filtration.

Example 16

Examination of One-step Destarching and Proteolysis of Corn Fiber

A 5000-mL 3-necked round-bottomed flask, equipped with an overhead stirrer, an air-cooled condenser, and a thermometer connected to a Therm-o-watch temperature controller, was charged with approximately 1082.9 g of wet corn fiber (385.7 g dry wt.), 3150 mL of water and 270 mL of 1 M sodium phosphate buffer, as pH 7. The mixture was heated to approximately 80° C. at which point approximately 15 mL of Spezyme AA was added and the mixture was stirred at 80° C. for about 2.5 hours. The mixture was allowed to cool to 40° C. and about 25 mL of Purafect 4000L was added and the mixture was stirred for approximately 11 hours. The mixture was filtered through a Buchner funnel and washed with 9×1000 mL of hot (about 60° C.) water, followed by 3×1000 mL of deionized water to assure effective removal of corn fiber fines. The resulting material was dried at 50° C. in a vacuum oven to produce 204 g of proteolyzed, destarched corn fiber at approximately 53% recovery from the starting corn fiber.

This Example illustrates that the amylase and protease treatment can occur sequentially in the same reaction vessel with very effective removal of the starch and protein fractions.

Example 17

Figure 7A:
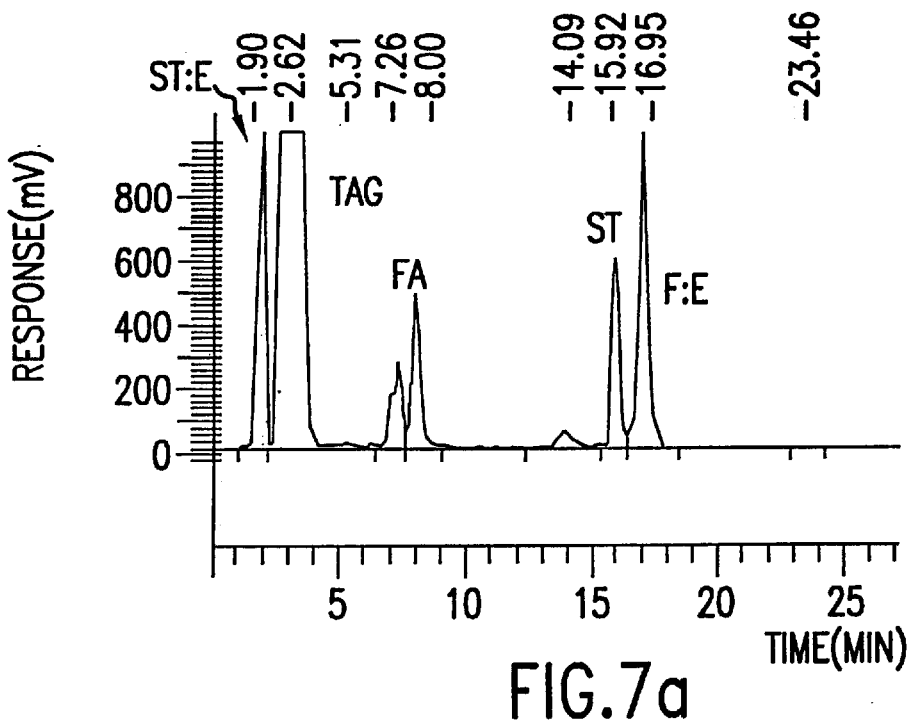
FIG. 7 shows a HPLC analysis of corn fiber oil obtained by (a) hexane extraction of dry, unground, untreated corn fiber; and (b) hexane extraction of dry, unground, amylase and protease treated corn fiber
Figure 7B:
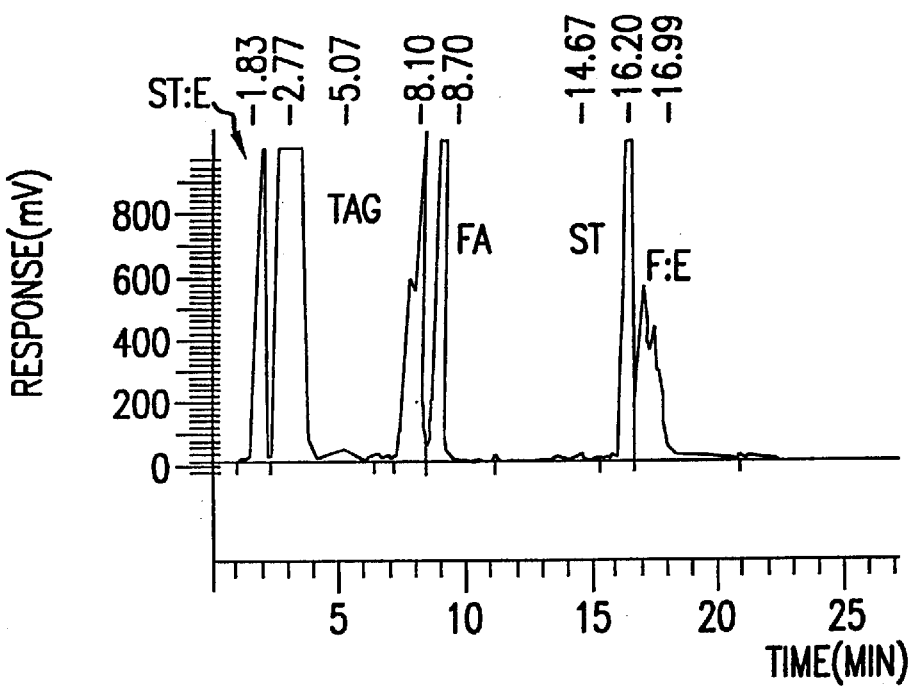

Extraction of Destarched, Proteolyzed Corn Fiber Providing a Novel Corn Fiber Lipid Fraction A 20.6 g sample of dry untreated corn fiber and a 20.6 g sample of destarched, proteolyzed corn fiber was extracted with 250 mL of hexane for 60 minutes. The liquid was then filtered from the fiber through a 10–15 μm glass fritted funnel, washing with enough hexane so that a total of 250 mL of liquids were recovered. The fiber was then rinsed with an additional 50 mL of hexane. The hexane extract was filtered through filter paper and concentrated in vacuo. The recovered oil samples were then subjected to HPLC analysis according to the method of Moreau et al. (U.S. Pat. No. 5,843,499). Each experiment was repeated three times. Typical results are shown in FIG. 7.

Quite surprisingly and unexpectedly, the composition of the corn fiber lipid fraction from the proteolyzed, destarched corn fiber was significantly different from that observed from untreated corn fiber. Specifically, the concentration of phytosterols in the lipid fraction of the destarched, proteolyzed corn fiber was 2.1±0.5 times greater than the concentration of phytosterols in the lipid fraction of nontreated corn fiber. Furthermore, the concentration of phytosterol ferulates in the lipid fraction of the destarched, proteolyzed corn fiber was 1.9±0.25 times less than the concentration of phytosterol ferulates in the lipid fraction of nontreated corn fiber. That is, destarching and proteolysis of corn fiber provides for corn fiber oil more enriched in phytosterols with less phytosterol ferulate relative to corn fiber oil from untreated fiber.

Example 18

Effect of Varying Parameters on Extraction of Corn Fiber Oil

Corn fiber (20.6 g) that had been subjected to different types of treatment (vide infra), was exposed to 206 mL of an organic solvent with stirring at room temperature for 1 hour. The solution was then filtered, concentrated under reduced pressure, and any residual solvent was removed under high vacuum (0.05–0.1 torr) thereby providing a corn fiber oil. The amount of oil that was isolated and the analyses thereof are summarized in Table 12, below. Sample 3 is a comparative example reflecting the art disclosed in U.S. Pat. No. 5,843,499, to Moreau et al. Phytosterol ferulate esters content was analyzed by HPLC utilizing the method disclosed in that patent.

TABLE 12

ANALYSIS OF EXTRACTION CONDITIONS ON CORN FIBER OIL

| Sample | Solvent | Special Conditions | Campestanyl ferulate (wt. % of oil) | Sitostanyl ferulate (wt. % of oil) | Ferulate esters (mg) | Oil extracted (mg) | Extractable oil from fiber (wt. %) | phytosterol ferulate (mg)/fiber (g) |
|---|---|---|---|---|---|---|---|---|
| 1 | Hexane | U, D, P1 | 1.58 | 3.28 | 37.5 | 772.4 | 3.75 | 1.823 |
| 2 | Hexane | G, D, P1 | 0.70 | 1.44 | 18.5 | 866.6 | 4.21 | 0.901 |

TABLE 12-continued

ANALYSIS OF EXTRACTION CONDITIONS ON CORN FIBER OIL

| Sample | Solvent | Special Conditions | Campestanyl ferulate (wt. % of oil) | Sitostanyl ferulate (wt. % of oil) | Ferulate esters (mg) | Oil extracted (mg) | Extractable oil from fiber (wt. %) | phytosterol ferulate (mg)/fiber (g) |
|---|---|---|---|---|---|---|---|---|
| 3 | Hexane | G, D, R | 1.54 | 3.03 | 17.2 | 375.9 | 1.82 | 0.832 |
| 4 | Hexane | G, D, A | 0.69 | 1.42 | 11.5 | 543.8 | 2.64 | 0.557 |
| 5 | Hexane | U, D, R | 1.59 | 3.13 | 5.4 | 113.7 | 0.55 | 0.260 |
| 6 | EtOAc | U, W, P2 | 1.27 | 2.47 | 24.1 | 643.4 | 3.12 | 1.167 |
| 7 | Acetone | U, D, P2 | 1.62 | 2.91 | 22.6 | 499.3 | 2.42 | 1.096 |
| 8 | EtOAc | U, D, P2 | 1.34 | 2.51 | 20.6 | 533.8 | 2.59 | 0.997 |
| 9 | MEK | U, D, P2 | 1.37 | 2.47 | 19.6 | 509.9 | 2.48 | 0.952 |
| 10 | Methanol | U, D, P2 | 1.48 | 2.73 | 17.5 | 415.1 | 2.02 | 0.850 |
| 11 | Heptane | U, D, P2 | 1.29 | 2.39 | 17.2 | 467.2 | 2.27 | 0.835 |
| 12 | Hexane | U, D, P2 | 1.13 | 2.23 | 15.6 | 464.6 | 2.26 | 0.759 |
| 13 | Isopropanol | U, D, P2 | 1.28 | 2.43 | 14.2 | 382.5 | 1.86 | 0.690 |
| 14 | Hexane | U, W, P2 | 1.21 | 2.26 | 9.4 | 270.7 | 1.31 | 0.455 |

Notes for Table 12:
U = unground, G = Ground, R = Non-enzymatically treated fiber, A = amylase treated, P1 = amylase & protease (18 h) treated, P2 = amylase & protease (11 h) treated, D = Dry fiber, W = Wet fiber (65% moisture).
NOTES FOR TABLES 7 AND 8:
All reactions at 5% solids. nd = not determined.
(1) Bacillus was used for destarching corn fiber.
(2) A. Oryzae was used for destarching corn fiber.
(3) ROH = MeOH
(4) ROH = EtOH
(5) Carbohydrate balance from carbohydrate analysis.

As noted, Sample 3 is a comparative example utilizing the method disclosed in U.S. Pat. No. 5,843,499 (dry, ground fiber, hexane extraction). Comparison of Samples 3 and 5 (dry, unground fiber, hexane extraction) reveals, as disclosed in U.S. Pat. No. 5,843,499, grinding of the fiber increases both the total oil extracted and the yield of phytosterol ferulate (mg phytosterol ferulate/g fiber). The wt. % and ratio of campestanyl and sitostanyl ferulates remain constant. In the case of destarching of dry, ground corn fiber followed by extraction with hexane (Sample 4), in comparison to Sample 3, the total amount of extractable oil increases but the yield (mg phytosterol ferulate/g fiber) and wt. % of ferulate esters in the oil decreased. However, amylase and protease treatment of dry, ground corn fiber followed by extraction with hexane (Sample 2), when compared to Samples 3 and 4, increased the total oil extracted and yield of (mg phytosterol ferulate/g fiber) ferulate esters. However, the wt. % of ferulate esters in the oil was still lower than Sample 3.

When the fiber was not ground and was subjected to destarching and protease treatment followed by extraction with hexane, Sample 1, when compared to Sample 3, the total extractable oil, the yield of phytosterol ferulate (mg phytosterol ferulate/g fiber), and, significantly, the wt. % of ferulate esters (sitostanyl ferulate) increased. This data indicates that destarching of corn fiber increases the total extractable oil while extraction of amylase and protease treated corn fiber increases both yields of phytosterol ferulate and total oil. Maximum benefit is obtained by extraction of destarched and protease treated unground corn fiber.

Because it is evident that extraction of destarched and protease treated unground corn fiber provides significant advantages over the methods disclosed in U.S. Pat. No. 5,843,499, different solvents were examined to assess their effectiveness in corn fiber oil extraction relative to a hexane solvent. As can be seen from Table 12 above, several solvents provide increased total extractable oil, increased yield of phytosterol ferulate (mg phytosterol ferulate/g fiber), and, significantly, increased wt. % of ferulate esters in the oil. The most efficient solvents tested in this Example are ethyl acetate and acetone. These solvents provide significant advantage over hexane in that they can be used directly on wet corn fiber (See Examples 6 and 7.) Thus, it has surprisingly been found that extraction of wet, unground destarched and protease treated corn fiber, offers distinct advantage in terms of industrial utility, enhanced yields of total extractable oil, enhanced yield of phytosterol ferulate (mg phytosterol ferulate/g fiber) and comparable wt. % of extracted ferulate esters in the oil, relative to the methods disclosed in the prior art.

Example 19

Effect of Bleaching Agent Concentration on Cellulose Purity

Water wet cellulose obtained by a sequence of two caustic extractions (2 h, 80° C.; 4 h, 100° C.) was added to a 300 mL three-neck round bottom flask equipped with a reflux condenser and mechanical stirrer. Water was added and the pH was adjusted to 14. After heating the solution to 60° C., 30% $H_2O_2$ was added slowly. During the course of the reaction, NaOH was added as necessary to maintain the pH at about 14. After adding all of the $H_2O_2$, the reaction was stirred for 55 min before filtering to separate the cellulose material from the extractant. The cellulose material was washed with four 150 mL portions of $H_2O$ followed by washing with two 150 mL portions of acetic acid. In Table 13 below, carbohydrate analysis of the starting material (cellulose material after 2 alkaline extractions) is set out in Sample 1 and the results of bleaching of this sample using varying amounts of $H_2O_2$ under otherwise identical conditions are set out in Samples 2 to 4.

TABLE 13

EFFECT OF BLEACHING AGENT CONCENTRATION ON PURITY OF CELLULOSE MATERIAL

| Sample | $H_2O_2$ (molar) | % Yield Cellulose | % Glu | % Xyl | % Gal | % Ara | % Man |
|---|---|---|---|---|---|---|---|
| 1 | SM | SM | 81.2 | 9.7 | 2.3 | 4.0 | 2.0 |
| 2 | 0.85 | 50 | 93.0 | 3.5 | 0.0 | 0.5 | 3.0 |
| 3 | 2.0 | 65 | 92.7 | 3.5 | 0.0 | 1.2 | 2.5 |
| 4 | 4.0 | 98 | 93.6 | 3.2 | 0.0 | 0.9 | 2.3 |

Notes for Table 13: SM = statring material (caustic extracted corn fiber)

The results in Table 13 demonstrate that a wide concentration of bleaching agent can be utilized to increase the purity of cellulose material extracted with alkali. Surprisingly, as the concentration of bleaching agent was increased, the recovery of cellulose increased. Furthermore, higher concentrations of bleaching agent were more effective at decreasing the xylose and mannose content of the cellulose material, while all concentrations of bleaching agent examined effectively lowered the amount of galactose and arabinose as compared to the starting material.

Example 20

Effect of Bleaching on Derivatization of Cellulose Obtained from Corn Fiber

The influence of bleaching agent concentration on the ability to obtain high purity cellulose suitable for use in derivatization reactions was examined using the following standard procedures in which the cellulose samples correspond to those described in Table 13 which were prepared by a sequence of two caustic extractions (2 h, 80° C.; 4 h, 100° C.) and $H_2O_2$ bleaching.

$H_2SO_4$ Procedure: Acetic acid wet cellulose was added to a 50 mL three-neck round bottom flask equipped with a reflux condenser and mechanical stirrer. Acetic acid, 5 wt. % $H_2SO_4$ (based on dry weight of cellulose) and acetic anhydride, respectively, were added to the cellulose. The reaction was heated to 50° C. and stirred for 65 minutes, which yielded a slightly hazy solution. The resulting cellulose triacetate was isolated by pouring the solution into water, thus yielding a cellulose triacetate precipitate. The solids were isolated by filtration, washed with water, and dried at 60° C. under reduced vacuum.

TFAA Procedure: Acetic acid wet cellulose was added to a 100 mL three-neck round bottom flask equipped with a reflux condenser and mechanical stirrer. Acetic acid, acetic anhydride, and TFAA (1.2/1/2.1 v/v/v) were added to the cellulose. The reaction was heated to 50° C. and stirred for 65 minutes, which provided a clear solution. The resulting cellulose triacetate was isolated by pouring the solution into water, thus yielding a cellulose triacetate precipitate. The solids were isolated by filtration, washed with water, and dried at 60° C. under vacuum. The results are summarized in Table 14 below. The reference to carbohydrate composition in the Table relates to the starting cellulose material.

TABLE 14

COMPOSITION OF CELLULOSE DERIVATIVES (ESTERS) OBTAINED FROM BLEACHED CELLULOSE MATERIAL

$H_2SO_4$ Procedure

| Sample | % Yield CTA[a] | % Glu | % Xyl | % Gal | % Ara | % Man | DS ($^1$H) | Mn ($10^3$) | Mw ($10^4$) | Mz ($10^5$) | Mw/Mn |
|---|---|---|---|---|---|---|---|---|---|---|---|
| 1 | 65 | 93.0 | 3.5 | 0.0 | 0.5 | 3.0 | 2.98 | 8.62 | 3.27 | 0.89 | 3.8 |
| 2 | 85 | 92.7 | 3.5 | 0.0 | 1.2 | 2.5 | 2.9 | 9.94 | 4.14 | 1.03 | 4.17 |
| 3 | 94 | 93.6 | 3.2 | 0.0 | 0.9 | 2.3 | 3.09 | 8.79 | 3.57 | 0.89 | 4.06 |
| TFAA Procedure | | | | | | | | | | | |
| 4 | 63 | 93.0 | 3.5 | 0.0 | 0.5 | 3.0 | 2.92 | 10.21 | 7.64 | 4.81 | 7.48 |
| 5 | 84 | 92.7 | 3.5 | 0.0 | 1.2 | 2.5 | 2.78 | 12.72 | 8.05 | 3.44 | 6.33 |
| 6 | 93 | 93.6 | 3.2 | 0.0 | 0.9 | 2.3 | 3.12 | 11.26 | 6.46 | 3.06 | 5.74 |

Notes for Table 14:
[a]Yields are based upon the amount of recovered triacetate and unreacted material.

This Example reveals that the sequence of two caustic extractions followed by bleaching provides cellulose of sufficient purity for use in esterification reactions. The cellulose that was bleached with 4 M $H_2O_2$ and having the highest value of glucose (Sample 3 and 6) gave the highest yields of CTA (cellulose triacetate). With the $H_2SO_4$ procedure, weight-average molecular weights in the range of 33,000 to 41,000 were obtained, while the TFAA procedure using the same cellulose gave weight-average molecular weights in the range of 65,000 to 81,000. In the case of $H_2SO_4$, the polydispersity was about ca. 3.8 to 4.1, while the TFAA procedure gave a much higher polydispersity of 5.7 to 7.5. These observations indicate that TFAA degrades the cellulose less than $H_2SO_4$ and that TFAA is more effective in esterifying non-glucose monomers and solubilizing any low-molecular weight polymers present.

Example 21

Effect of an Acid Step on the Purity of Cellulose Obtained from Corn Fiber

In order to examine the effect of an acid step during the treatment of cellulose from corn fiber, different combinations of caustic, bleaching and acid treatments were examined. The results are summarized in the following Table

TABLE 15

EFFECT OF DIFFERENT COMBINATIONS OF CAUSTIC, BLEACHING TREATMENTS AND ACID RINSES ON COMPOSITIONS OF CELLULOSE ESTERS

| Sample | Treatment | CTA (g) | Residue (g) | DS ($^1$H) | Mn ($10^3$) | Mw ($10^4$) | Mz ($10^5$) | Mw/Mn | % Glu | % Xyl | % Gal | % Arab | % Man |
|---|---|---|---|---|---|---|---|---|---|---|---|---|---|
| 1 | C1-C2-B1-HOAc(30) | 2.47 | 0 | 3.1 | 5.18 | 1.01 | 0.18 | 1.9 | 91.8 | 3.5 | 1.0 | 0.4 | 3.2 |
| 2 | C1-H$_2$SO$_4$(30)-C2-B1 | 2.51 | 0.25 | 3.09 | 7.27 | 2.3 | 0.68 | 3.2 | 93.5 | 2.8 | 0.4 | 0.4 | 2.8 |
| 3 | C1-HOAc(15)-C2-B1 | 3.82 | 0.43 | 2.98 | 17.9 | 6.54 | 1.95 | 3.6 | 94.7 | 2.0 | 0.0 | 0.0 | 3.3 |
| 4 | C1-HOAc(15)-B1 | 2.47 | 0.21 | 3.04 | 38.31 | 7.9 | 1.36 | 2.06 | 95.2 | 2.1 | 0.0 | 0.0 | 2.7 |
| 5 | C1-HOAc(15)-B2 | 2.47 | 0.05 | 3.07 | 5.32 | 2.15 | 0.73 | 4.05 | 95.4 | 2.2 | 0.0 | 0.0 | 2.4 |

Notes for Table 15:
C1 = Caustic treatment of destarched corn fiber at 80° C., 2 h. C2 = Second caustic treatment of cellulose fiber obtained from corn fiber at 80° C., 2 h. HOAc(30) = Treatment with refluxing acetic acid for 30 min. HOAc (15) = Treatment with refluxing acetic acid for 15 min. B1 = Bleaching at 60° C., 1 h. B2 = Bleaching at 80° C., 2 h. Acetylation with 5% H$_2$SO$_4$, Ac$_2$O, HOAc.

The results above illustrate that inclusion of an acid step can significantly decrease the amount of unreacted starting material, which greatly improves the clarity of the reaction mixture and facilitates filtration of the reaction mixture prior to precipitation. Furthermore, the molecular weights of the CTA were high, ranging from about 10,000 to 80,000. When the acid step followed a caustic step and preceded the bleaching step (compare Samples 1, 4 and 5), inclusion of an acid step significantly increased the glucose content (purity) measured in the CTA. The values of 95% glucose for Samples 4 and 5 are among the highest observed for cellulose esters made from corn fiber cellulose.

Example 22

Effect of Xylanase Treatment on Purity of Cellulose

In order to explore the possibility of further purifying cellulose from corn fiber by enzymatic pulping e.g., treatment with a xylanase enzyme, the following experiment was performed.

A 100-mL round-bottomed flask equipped with an overhead mechanical stirrer was charged with 5 g of cellulose material produced from a single caustic extraction (80° C., 2.5 hours of corn fiber and 40 mL of water. The pH of the mixture at this point as determined by pH paper was around pH 6. The mixture was heated to 60° C. and 5.0 mL of xylanase was added to the mixture. The mixture was stirred at 60° C. for 15 minutes and an additional 20 mL of water was added. The mixture was stirred at 60° C. for 90 additional minutes. The cellulose material was separated by filtration and was washed with about 200 mL of water.

Sample 1 was split into two portions. One portion of the solid was dried in a vacuum oven at 50° C. overnight to produce Sample 2 in Table 16 and was submitted for X-ray, GPC, and carbohydrate analyses. A 100-mL round-bottomed flask equipped with an overhead mechanical stirrer was charged with the remaining portion of the moist cellulose material and 50 mL of water. The mixture was heated to 70° C. with stirring for 30 minutes before adding 2.0 g of NaOH to the mixture. The reaction was then heated to 80° C. and held at this temperature with stirring for 120 minutes. The cellulose material was isolated by filtration at or above 60° C. The filtercake was washed with about 500 mL of water at 60° C., 200 mL of 20 vol. % HOAc and an additional 300 mL of water. The cellulose material was dried at 50° C. in a vacuum oven to produce Sample 3 and was submitted for X-ray, GPC, and carbohydrate analyses.

TABLE 16

EFFECT OF XYLANASE TREATMENT ON CELLULOSE PURITY

| Sample | Treatment[1] | % Yield Cellulose[2] | Total Carb | % Glu | % Xyl | % Gal | % Ara | % Man | Xyl/Ara | $M_w$[3] | $M_n$[3] | Mw/Mn[3] |
|---|---|---|---|---|---|---|---|---|---|---|---|---|
| 1 | C1 | 17.8 | 89 | 75.3 | 13 | 2.6 | 6.8 | 2.7 | 2 | nd | Nd | nd |
| 2 | C1-X | 12.8 | 89 | 91.1 | 4.2 | 1.1 | 1 | 2.7 | 4 | 171,496 | 90,209 | 1.9 |
| 3 | C1-X-C2 | 10.7 | 100 | 93.1 | 3 | 0.5 | 0.7 | 2.7 | 4 | 152,610 | 31,262 | 4.9 |

Notes for Table 16:
[1] C1 = NaOH, for 2.5 h at 80° C.; C1-X = NaOH, for 2.5 h at 80° C. then Multifect Xylanase for 1.75 h at 60° C.; C1-X-C2 = NaOH, for 2.5 h at 80° C. then Multifect Xylanase for 1.75 h at 60° C. then NaOH for 2 h at 80° C.
[2] Total yield of cellulose from 250 g of dried corn fiber.
[3] GPC results for cellulose as determined from cellulose tricarbailate.

These results show that the purity of the corn fiber cellulose can be significantly improved by treating the cellulose, obtained by a single caustic extraction, with a xylanase enzyme. In this case, the glucose content (purity) increased from 75% to 91%. A second caustic extraction of the xylanase treated cellulose increased the purity slightly to 93% glucose. As the samples illustrate, the molecular weight of the cellulose was high which, when combined with the purity, makes this cellulose suitable for derivatization.

extracted filtrate was combined from the rinsings and the pH of the combined filtrate was adjusted to 5 followed by filtering through celite. Ethanol (about 3/1 ROH/filtrate liquids) was added to the filtrate, resulting in a gummy precipitate that was separated by filtration. When nearly all liquid had been removed from the gummy precipitate, fresh alcohol was added to harden the solid to provide a precipitate containing arabinoxylan. The arabinoxylan samples were then dried at 60° C. under reduced pressure.

TABLE 17

EXAMINATION OF ARABINOXYLAN AND CELLULOSE COMPOSITION AS A FUNCTION OF BLEACHING AND PRECIPITATION AGENT

| Entry | % Glu Arabino-xylan | % Xyl Arabino-xylan | % Gal Arabino-xylan | % Ara Arabino-xylan | % Man Arabino-xylan | % Glu Cell | % Xyl Cell | % Gal Cell | % Ara Cell | % Man Cell |
|---|---|---|---|---|---|---|---|---|---|---|
| 1[a] | 8.1 | 51.1 | 9.1 | 31.7 | 0.0 | 81.4 | 8.5 | 2.0 | 4.7 | 3.5 |
| 2[a] | 11.0 | 52.5 | 6.1 | 30.4 | 0.0 | 89.1 | 4.6 | 1.0 | 1.7 | 3.6 |
| 3[a] | 7.5 | 50.7 | 8.8 | 32.9 | 0.0 | 82.1 | 8.3 | 2.0 | 4.4 | 3.1 |
| 4[a] | 8.0 | 48.4 | 8.7 | 34.6 | 0.2 | 78.7 | 10.8 | 2.2 | 5.0 | 3.2 |
| 5[b] | 2.9 | 53.2 | 8.2 | 35.7 | 0.0 | 93.6 | 3.2 | 0.0 | 0.9 | 2.3 |

Notes for Table 17:
[a]Isolated by precipitation with alcohol. [b]Isolated by precipitation with acetic acid. Ara = Arabinose. Cell = cellulose.

Example 23

Effect of Bleaching Treatment on Arabinoxylan and Cellulose

A series of bleachings experiments were performed to examine the effect of bleaching at various times in the alkaline extraction process.

10 g of destarched corn fiber (about 3.0 mmol of polysaccharide based upon the typical yield of cellulose and arabinoxylan) were added to a solution of NaOH at 80° C. in a 500 mL three-neck glass round bottom flask equipped with a mechanical stirrer and reflux condenser. The reaction was stirred for 30 min at 80° C. In Sample 1, no bleaching agent was added. In Sample 2, about 2.4 molar equivalents of $H_2O_2$ were added to the destarched corn fiber according to the method of Doner et al. disclosed in WO 98/40413. Very vigorous bubbling and frothing occurred during this reaction, thus requiring the exercise of extreme caution during the process. In Sample 3, after extraction with alkali, the cellulose material was allowed to cool to room temperature before adding 2.4 molar equivalents of $H_2O_2$ and allowing the cellulose material to bleach for 30 min. Sample 4 was processed similarly to Sample 3 except that bleaching was for 95 min. For comparison purposes, arabinoxylan, isolated directly by precipitation in acetic acid, from the first caustic extraction of arabinoxylan (2 h, 80° C.) and the corresponding bleached cellulose (Example 19) are included in Table 17 as Sample 5.

In each of the samples, the alkali extracted corn fiber was filtered to remove the alkali extractant containing arabinoxylan and the remaining cellulose material was washed with water. The alkali extractant was collected. The cellulose material was dried at 60° C. under house vacuum. The The above table illustrates that the composition of arabinoxylan obtained by the method disclosed by Doner et al. (Sample 2) is different from that of the arabinoxylan obtained by bleaching after alkaline extraction or by omitting bleaching of the arabinoxylan altogether. In particular, the arabinoxylan of Sample 2 has a higher level of glucose and lower level of arabinose. Bleaching after alkaline extraction but before isolation of the arabinoxylan had only a marginal influence on the arabinoxylan, as the composition of the arabinoxylan in Samples 3 and 4 are similar to Sample 1 where the reaction conditions and isolation procedure was the same and there was no bleaching step. The differences in composition of the arabinoxylan are particularly pronounced when Sample 2 is compared to Sample 5 (alkaline extraction, no bleaching, isolated by acetic acid precipitation) which is illustrative of a preferred practice of this invention.

When the cellulose material obtained from the caustic extraction was examined, the process of Doner et al. (Sample 2) led to a higher percentage of glucose in the cellulose fraction relative to Samples 1, 3, and 4. Bleaching after extraction but before separation (compare Samples 1, 3 and 4) had no significant influence of the purity (wt. % glucose) of the cellulose. Bleaching of the cellulose after separation of the alkali extractant (Sample 5) significantly improved the purity of the cellulose.

To further illustrate the impact of bleaching upon the arabinoxylan structure, the composition and molecular weight of the arabinoxylan prepared according to the method of Donner et al. was compared to those obtained under different conditions (no bleaching) which are summarized below.

TABLE 18

COMPARISON OF ARABINOXYLAN COMPOSITION AS A
FUNCTION OF ALKALI/BLEACHING TREATMENT CONDITIONS

| Sample | Base (M) | Time (h) | Temp (° C.) | % Glu | % Xyl | % Gal | % Ara | % Man | Xyl/Ara Ac | Mn ($10^3$) | Mw ($10^4$) | Mz ($10^5$) | Mw/Mn |
|---|---|---|---|---|---|---|---|---|---|---|---|---|---|
| 1 | 2.5 NaOH | 0.5 | 80 | 11.0 | 52.5 | 6.1 | 30.4 | 0.0 | 1.7 | 60.98 | 27.65 | 12.77 | 4.53 |
| 2 | 2.5 NaOH | 0.5 | 80 | 7.1 | 50.2 | 9.2 | 33.3 | 0.1 | 1.5 | 105.1 | 40.49 | 13.6 | 3.85 |
| 3 | 2.5 NaOH | 0.5 | 80 | 6.5 | 49.9 | 7.4 | 33.3 | 2.9 | 1.5 | 119.6 | 41.2 | 20.5 | 3.45 |
| 4 | 2.5 NaOH | 1 | 80 | 7.9 | 50.9 | 9.1 | 32.1 | 0.0 | 1.6 | 92.65 | 34.81 | 9.79 | 3.76 |
| 5 | 2.5 NaOH | 2 | 80 | 7.1 | 51.5 | 9.0 | 32.5 | 0.0 | 1.6 | 105.5 | 38.85 | 11.95 | 3.68 |
| 6 | 2.5 NaOH | 2 | 80 | 2.9 | 53.2 | 8.2 | 35.7 | 0.0 | 1.5 | 121.2 | 41.67 | 21.01 | 3.44 |

The arabinoxylan of Sample 1, prepared according to the method of Doner et al. as discussed above, has a weight-average molecular weight of 276,500. In the case of the arabinoxylan that was not subjected a bleaching step (Samples 2–6), the weight-average molecular weights were significantly higher (416,700 to 348,100) and the samples exhibited lower polydispersity as compared to Sample 1. This surprising result is critical to the invention because it is highly desirable to have high molecular weight polymers with low polydispersity for most applications. These results demonstrate that bleaching of the cellulose fiber prior to separation of the arabinoxylan component, as performed according to the method of Doner et al., has undesirable effects on the molecular weight of the arabinoxylan obtained.

To further explore the effects of bleaching on the color of aqueous solutions of arabinoxylan, the yellowness index color of arabinoxylan samples were compared. In the case of Sample 1, precipitation with ethanol gave a brown colored solid. The arabinoxylan from Samples 2 to 4 were semi-white. Further, precipitation of the arabinoxylan of Sample 1 in acetic acid, as set forth in Sample 5, provided a semi-white solid comparable in color to Samples 2 to 4 after alcohol precipitation. Further precipitation of Samples 2 to 4 in acetic acid improved the color relative to that obtained by alcohol precipitation alone. Relative physical property data is summarized in Table 19 below.

TABLE 19

YELLOWNESS INDEX OF ARABINOXYLAN SOLUTIONS

| Sample | Base (M) | Reaction Time (h) | Temp (° C.) | YI Color (ROH ppt) | YI Color (HOAc ppt) |
|---|---|---|---|---|---|
| 1 | 2.5 NaOH | 0.5 | 80 | 1449 | 1096 |
| 2 | 2.5 NaOH | 0.5 | 80 | 831 | 463 |
| 3 | 2.5 NaOH | 0.5 | 80 | 692 | 466 |
| 4 | 2.5 NaOH | 0.5 | 80 | 611 | 410 |
| 5 | 2.5 NaOH | 2 | 80 | nd | nd |

Sample 2 is the arabinoxylan obtained according to the method of Doner et al. When precipitated in alcohol, this material had a YI (yellowness index) of 831. Subsequent precipitation of the arabinoxylan in Sample 2 with acetic acid improved the color of that sample (YI of 831 vs. 463 after acetic acid treatment). The samples bleached at RT (room temperature) after alkaline extraction, but before separation of the components, were less yellow than Sample 2 (compare Samples 3 and 4 with Sample 2).

This data illustrates that the method of Doner et al. yields an arabinoxylan with a different composition (higher glucose, lower arabinose), lower molecular weight, and an unacceptable (non-white) color. The method of Doner et al. does increase the purity of the cellulose somewhat; however, the purity provided by the Doner et al. method does not result in a reaction grade cellulose.

Significantly, the method of Doner et al. is not safe to practice on an industrial scale. In contrast, the methods of the present invention do not create unmanageable dangerous conditions. Thus, the methods of this invention are practicable on an industrial scale.

Example 24

Esterification of Cellulose Obtained from Corn Fiber

Three hundred grams of non-dried corn fiber were placed in a porous bag in a soxhlet extractor and extracted with ethanol for about 15 hours. The ethanol was removed and the corn fiber was extracted with diethyl ether for about 7 hours. The corn fiber was dried in a forced air oven at 60° C. providing 277.7 g of corn fiber. Concentration of the ethanol fraction gave 6.7 g of material and the ether fraction provided 2.7 g.

A 5000 mL three-neck glass round bottom flask equipped with a mechanical stirrer and reflux condenser was charged with 275 g of the extracted corn fiber, 1986 mL $H_2O$, and 220 mL of a 1 M phosphate buffer solution. The mixture was heated to 80° C. before adding 11 mL of Spezyme suspension. No starch could be detected after 55 minutes. The fiber was isolated by filtration, washed with water, and dried to obtain 191.2 g of destarched corn fiber (69.5% yield).

1514 mL of water was added to a 5 L three-neck round bottom flask equipped with a reflux condenser and mechanical stirrer. The water was heated to 80° C. and 189.2 g of the destarched corn fiber obtained above and 151 g of NaOH was added, respectively. The reaction was stirred for 2 h at 80° C. before filtering at 65° C. to remove the cellulose. The cellulose was washed with two 200 mL portions of water preheated to 65° C. The cellulose was transferred to the 5 L vessel containing 1514 mL of water preheated to 90° C. Addition of NaOH was not necessary because the solution maintained a pH of 14. The reaction was heated to 100° C. and stirred for 4 hours. The reaction was filtered at 65° C. to remove the cellulose. The cellulose was washed with two 200 mL portions of water preheated to 65° C. The cellulose was again transferred to the 5 L reaction vessel containing 491 mL of water preheated to 60° C. To this mixture was slowly added 66 mL of 30% $H_2O_2$ (2 equivalents). The pH of the solution was adjusted to 14 by the addition of 40 g NaOH. The reaction was stirred for 1 hour at 60° C. then filtered at 65° C. to remove the cellulose. The cellulose was washed with two 200 mL portions of water preheated to 65° C. followed by additional acetic acid to adjust the pH and to remove the water. A portion of the cellulose was removed and dried to determine the % solids and the yield was found to be 31.1 g (16.4% cellulose from the destarched corn fiber). X-ray analysis of cellulose samples after each stage of reaction revealed that the cellulose was maintained as cellulose I.

The cellulose obtained above was reacted with acetic anhydride according to the general methods described above in Example 20.

TABLE 20

EXAMINATION OF CELLULOSE ESTERS PREPARED USING DIFFERENT CATALYSTS

| Sample | % Yield CTA[a] | Reaction Time (min) | DS ($^1$H) | Mn ($10^3$) | Mw ($10^4$) | Mz ($10^5$) | Mw/Mn |
|---|---|---|---|---|---|---|---|
| | | $H_2SO_4$ Procedure | | | | | |
| 1 | 65 | 145 | 2.8 | 12.15 | 6.16 | 1.64 | 5.07 |
| | | TFAA Procedure | | | | | |
| 2 | 48 | 70 | 2.84 | 15.72 | 15.26 | 8.1 | 9.7 |

Notes for Table 20:
[a]Yields are based upon the amount of recovered triacetate and unreacted material.

The yield of CTA is that expected for bleaching of the corn fiber cellulose with 2 molar equivalents of bleaching agent (cf. Example 20). As these entries illustrate, weight-average molecular weights in the range of 62,000 to 153,000 can be expected from the cellulose samples depending upon the reaction conditions.

This Example, which encompasses 2 caustic extractions and a bleaching step, illustrates that if the cellulose fiber at each stage of reaction is handled hot and not allowed to cool below about 60° C. during filtration while at elevated pH, the morphology of the cellulose can be maintained as cellulose I. This point is particularly apparent when compared to the cellulose of Example 8 where the cellulose samples were allowed to cool to room temperature prior to filtration.

Example 25

Concentration of Arabinoxylan Solution and Precipitation Parameters

Portions of the filtrate from the first caustic extraction of Example 24 were concentrated by heating the sample under vacuum while providing for an airflow to the surface of the solution being concentrated. By this method, foaming of the solution during concentration is minimized. Otherwise, it was found necessary to acidify the solution with an acid such as $H_2SO_4$ or HCl, which leads to the formation of inorganic salts, which remain in the arabinoxylan during precipitation and washing. As an example, about 927 g of the filtrate from the first caustic extraction was concentrated to provide 596 g of distilled water and 330 g of a viscous liquid containing arabinoxylan (about 70 wt. % of the total reaction liquids and wash were removed). The viscous liquid (heated to 50° C. to 60° C.) was added slowly to rapidly stirred cold acetic acid. According to this method, 71.9 g of arabinoxylan was isolated (38 wt. % yield from destarched corn fiber). Alternatively, acetic acid can be added directly to the caustic solution as required to reduce foaming, allowing for more rapid concentration. The sodium acetate that forms does not remain in the arabinoxylan to any great extent (0.1–5 wt. %) as long as acetic acid is utilized to precipitate the arabinoxylan.

This Example also illustrates that by the method described above, it is possible to significantly concentrate the arabinoxylan-containing solution obtained from caustic extraction of corn fiber without having to acidify with an inorganic acid prior to adding the solution to acetic acid. This serves to both lower the pH and acts as a non-solvent for the arabinoxylan. By use of this method, arabinoxylan that is not contaminated with inorganic salts is obtained and the volume of acetic acid required to precipitate the arabinoxylan is significantly reduced.

Example 26

Concentration of the Arabinoxylan Solution with Recovery of Caustic by Ultrafiltration A solution of arabinoxylan obtained by caustic extraction of destarched and proteolyzed corn fiber was passed through a membrane having a molecular weight cutoff of 20 kD. The membrane unit was a M204-SW Membrane Pilot System with a 10 gal feed tank (LCI Corporation, Charlotte, N.C.). The membrane (CONSEP) was obtained from North Carolina SRT, Inc. and the geometry of the membrane was a flat sheet. The number of test cells was two which were arranged in parallel providing for 162 $cm^2$ of cell area. The flow rate was 1.1 grams per minute and the system pressure was 100 psi. The total processing time was 12.3 h. The results are summarized in Table 21 in which retentate is the fraction of the feed which did not pass through the membrane and permeate is the fraction of the feed which passed through the membrane.

TABLE 21

CONCENTRATION OF ARABINOXYLAN AND NAOH IN THE RETENTATE AND PERMEATE AFTER ULTRAFILTRATION.

| | | Arabinoxylan | | | NaOH | | |
|---|---|---|---|---|---|---|---|
| | | Total | | | | | |
| | Weight (g)[1] | weight % | Mass (g) | % of Feed | weight % | Total Mass (g) | % of Feed |
| Feed | 3111.75 | 1.3 | 40.5 | — | 3.38 | 105.2 | — |
| Retentate | 359.91 | 4.5 | 16.2 | 40.0 | 2.83 | 10.2 | 9.7 |
| Permeate | 2369.19 | <0.1 | <2.4 | <5.9 | 2.83 | 67.0 | 63.7 |

Notes for Table 21:1. Due to sampling during the experiment and the material retained in the system, the total weight of the retentate and permeate does not equal the weight of the initial feed.

This Example demonstrates that when a 1.3 wt. % arabinoxylan caustic solution is passed through the membrane, the solution is concentrated to 4.5 wt. % arabinoxylan in the retentate representing 40% of the mass of the arabinoxylan in the original feed solution. The wt. % of NaOH is reduced from 3.38 wt. % in the feed solution to 2.83 wt. % in the retentate. The permeate contains 63.7 wt. % of the NaOH in the original feed solution. Thus, this Example illustrates that the caustic passes freely through the membrane while the arabinoxylan is concentrated in the retentate thus demonstrating that ultrafiltration is an efficient means of recovering caustic and concentrating the arabinoxylan.

Example 27

The Effect of Velocity Across the Membrane on Concentration of the Arabinoxylan Solution with Recovery of Caustic by Ultrafiltration A solution of arabinoxylan obtained by caustic extraction of destarched and proteolyzed corn fiber was passed through a membrane having a molecular weight cutoff of 100 kD. The membrane unit was a M204-SW Membrane Pilot System with a 10 gal feed tank (LCI Corporation, Charlotte, N.C.). The membrane (CONSEP) was obtained from North Carolina SRT, Inc. and the geometry of the membrane was a flat sheet. The number of test cells (162 cm$^2$ of cell area) was two, each of which was arranged in series which served to increase the velocity. The flow rate was 1.1 grams per minute and the system pressure was 150 psi. The total processing time was 4.7 h. Following completion of the filtration, a 5% caustic solution was circulated across the surface of the membrane for 20 minutes to remove any arabinoxylan deposited on the membrane. The results are summarized in Table 22 in which retentate is the fraction of the feed which did not pass through the membrane and permeate is the fraction of the feed which passed through the membrane.

TABLE 22

CONCENTRATION OF ARABINOXYLAN AND NAOH IN THE RETENTATE AND PERMEATE AFTER ULTRAFILTRATION.

| | Arabinoxylan | | | |
|---|---|---|---|---|
| | Weight (g)[1] | weight % | Total Mass (g) | % of Feed |
| Feed | 2003.5 | 1.3 | 26.0 | — |
| Retentate | 394.2 | 5.1 | 20.1 | 77.3 |
| Caustic Wash | 104.25 | 3.9 | 4.1 | 15.8 |
| Permeate | 1609.3 | <0.1 | <1.6 | <6.2 |

Notes for Table 22: 1. Retentate mass was determined by difference (feed mass less permeate mass).

This Example demonstrates that when a 1.3 wt. % arabinoxylan caustic solution is passed through the membrane, the solution is concentrated to 5.1 wt. % arabinoxylan in the retentate representing 77.3% of the mass of the arabinoxylan in the original feed solution. An additional 15.8% of the arabinoxylan was recovered in the caustic wash. Thus, this Example illustrates that the caustic passes freely through the membrane while the arabinoxylan is concentrated in the retentate. At the higher velocity and concentration, some arabinoxylan is deposited on the membrane but is easily removed by washing the surface of the membrane.

Example 28

Esterification of Arabinoxylan 4 g (dry weight basis) of arabinoxylan obtained by caustic extraction of destarched corn fiber (two conditions, 100° C.; 4 hours or 0.5 hours, 80° C.) was added to a 100 mL three-neck round bottom flask equipped with a reflux condenser and mechanical stirrer. The arabinoxylan was isolated by one of two methods: (1) ethanol precipitation followed by drying (this arabinoxylan was used with no special pretreatment); or (2) by acetic acid precipitation, (this arabinoxylan was added to the reaction vessel wet with acetic acid). The appropriate amounts of acetic anhydride, acetic acid, and catalyst ($H_2SO_4$ or TFAA) were added to the arabinoxylan. The reaction was then stirred at 50° C. for the indicated times. The reaction was filtered to remove any unreacted solids. The unreacted solids were dried to obtain their weights. The filtrate was added to water and any resulting solids were washed with three 25 mL portions of water and dried. The results are summarized in the following Table.

TABLE 23

CHARACTERISTICS OF ESTERIFIED ARABINOXYLAN BASED UPON PRECIPITATION CONDITIONS AND REACTION CONDITIONS

| Sample | Reaction Conditions | Acylated arabinoxylan (g) | Recovered arabinoxylan (g) | DS ($^1$H) | Mn ($10^3$) | Mw ($10^4$) | Mz ($10^5$) | Mw/ Mn | Tg (° C.) | T$_{decomp}$ (° C.) |
|---|---|---|---|---|---|---|---|---|---|---|
| 1 | TFAA/Ac$_2$O/HOAc, 24.0 h (a,c) | 2.66 | 1.03 | 2.73 | 4.84 | 2.41 | 1.56 | 4.99 | 79 | 225 |
| 2 | TFAA/Ac$_2$O/HOAc, 27.7 h (a,d) | 0.88 | 2.37 | 2.86 | 6.56 | 4.29 | 2.81 | 6.55 | 101 | 220 |
| 3 | 5% H$_2$SO$_4$/Ac$_2$O/HOAc, 22.8 h (a,c) | 0 | 3.62 | 0 | 0 | 0 | 0 | 0 | 0 | 0 |
| 4 | 5% H$_2$SO$_4$/Ac$_2$O/HOAc, 1.8 h (b,c) | 0.68 | 0 | 2.07 | 1.9 | 0.38 | 0.12 | 1.97 | 71 | 220 |
| 5 | TFAA/Ac$_2$O/HOAc, 1.0 h (b,c) | 3.97 | 0 | 2.35 | 26.88 | 11.05 | 4.1 | 4.11 | 99 | 225 |

Notes for Table 23:
(a) The arabinoxylan was precipitated using ethanol, dried and used without further treatment. (b) The arabinoxylan was precipitated from HOAc and used directly without drying. (c) 4 h, 100° C. extraction. (d) 0.5 h, 80° C. extraction.

This Example reveals that TFAA can effectively catalyze the esterification of arabinoxylan without significant molecular weight loss compared to a catalyst such as sulfuric acid (compare Sample 4 with Sample 5). Furthermore, this Example reveals that arabinoxylan esters are more easily prepared when the arabinoxylan is used directly after precipitation in acetic acid and not dried. That is, in a preferred practice of this invention, the arabinoxylan will be precipitated in acetic acid to obtain better color without the difficulties of inorganic salt generation. With the methods of this invention, there is a surprising additional advantage that the arabinoxylan is obtained in a more reactive form.

Example 29

Figure 8:
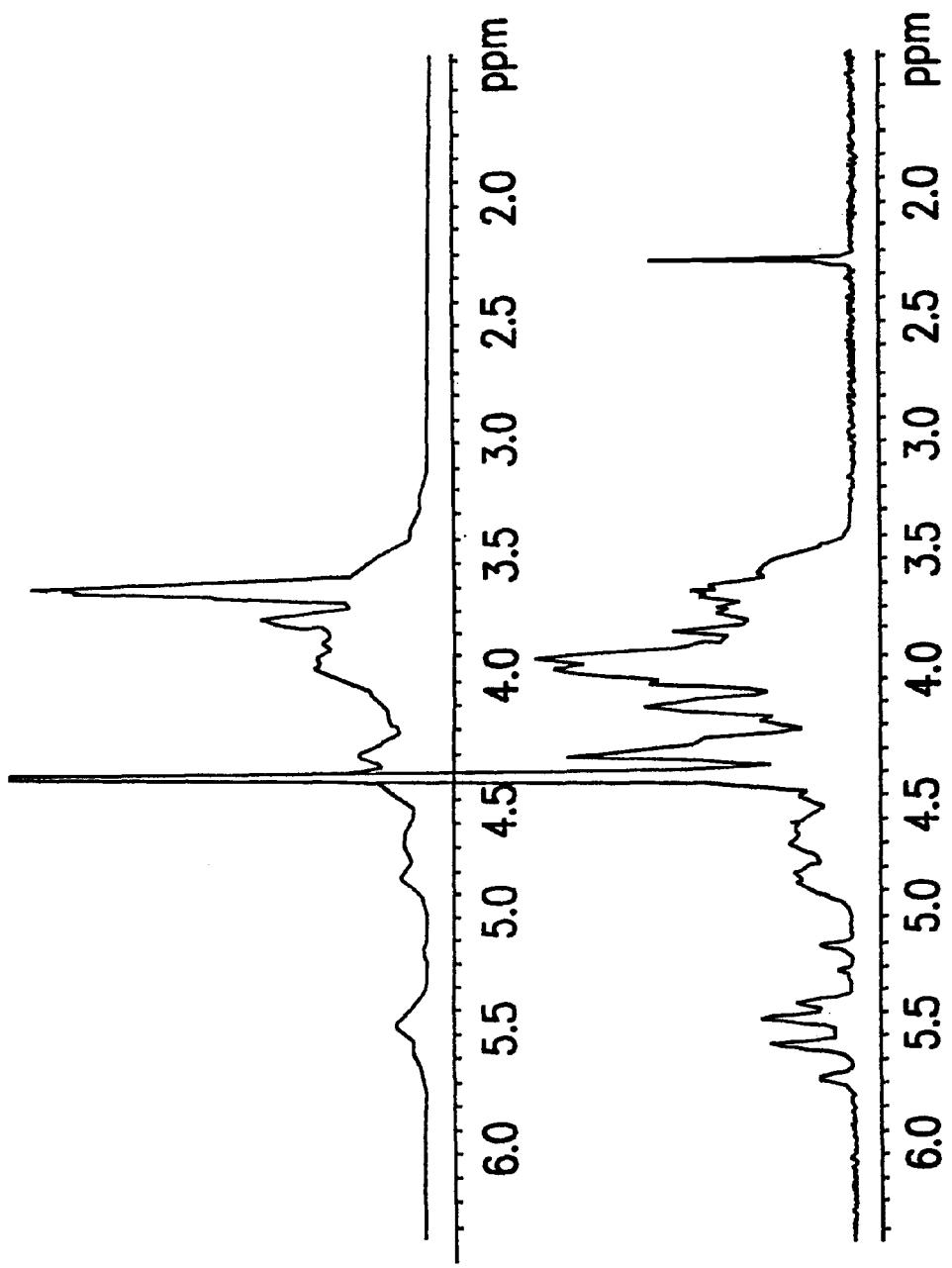
FIG. 8 shows a proton NMR spectrum of arabinoxylan and arabinoxylan methyl ether prepared from arabinoxylan.

Etherification of Arabinoxylan $H_2O$ (15 mL) was added to an arabinoxylan (2 g) obtained by caustic extraction (1.5 M, 80° C., 2 h) of destarched corn fiber. After stirring for 15 minutes, KOH (1.6 g) was added, and the solution stirred an additional 15 minutes. Methyl iodide (9 mL) was added and the reaction was stirred 43 hours at room temperature. The reaction pH was adjusted to 6 with HCl before diluting the solution with $H_2O$ (10 mL). The solution was warmed to about 50° C. before adding ethanol (225 mL) slowly. Upon addition of the ethanol, all of the salts dissolved. Completion of the ethanol addition allowed precipitation of the arabinoxylan methyl ether. The solid was filtered, shaken with warm ethanol (220 mL, about 50° C.) filtered and washed with EtOH (150 mL). The product was dried at 55° C. at reduced pressure providing 1.95 g of arabinoxylan methyl ether. Carbon 13 NMR and $^1$H NMR (FIG. 8) were consistent with formation of the expected arabinoxylan methyl ether. Thermal analysis revealed that the ether was amorphous, having a Tg of 161° C. and that the ether was thermally stable to 275° C.

Example 30

Effect of Arabinoxylan Precipitation Parameters on Derivatization

Dried crude arabinoxylan obtained from the caustic extraction of corn fiber was activated with $H_2O$ (27 mL $H_2O$ per 1 g of arabinoxylan). The aqueous solution was then exposed to AcOH (37 mL per 1 g of arabinoxylan) in order to precipitate arabinoxylan. After filtering the arabinoxylan, it was washed with AcOH (3×10 mL per 1 g of arabinoxylan) (Samples 1 to 6) or an equivalent amount of propionic acid (Sample 7). The wet arabinoxylan was then exposed to an appropriate amount of $Ac_2O$ and TFAA (Samples 1 to 6 and 8) or propionic anhydride and TFAA (Sample 7). Alternatively, the wet arabinoxylan was exposed to an appropriate amount of $Ac_2O$ and 0.7% $H_2SO_4$ (Sample 9). The reaction was stirred for 1 hour (after addition of the reagents) and the product was isolated by precipitation from water unless otherwise stated. The white solids were washed with $H_2O$ until the filtrate was neutral pH and the product was dried in vacuo. The results are summarized in Table 24.

TABLE 24

EFFECT OF ARABINOXYLAN SALT CONTENT ON DERIVATIZATION

| Sample | Substrate | Recovered Substrate | Esterified Product | Reaction Temp (° C.) | DS ($^1$H) | Mn ($10^3$) | Mw ($10^4$) | Mz ($10^5$) | Mw/Mn | Tg (° C.) | $T_{decomp}$ (° C.) | $T_{90\%decomp}$ (° C.) |
|---|---|---|---|---|---|---|---|---|---|---|---|---|
| 1 | A, 4.0 g | 3.3 g | 0.3 g | 50 | — | — | — | — | — | — | — | — |
| 2 | B, 9.1 g, 56.6% salt | 0 | 4.8 g, 0.3% salt | 49 | 2.36 | 18.5 | 28.1 | 10 | 15.2 | 130 | 250 | 319 |
| 3 | A + B, 4.0 g, 57.8% salt | 0 | 2.2 g, 11.7% salt | 54 | 2.46 | 31.2 | 17.3 | 5.48 | 5.54 | 124 | 220 | 284 |
| 4 | A + B, 4.0 g, 57.8% salt | 0 | 2.2 g, 15.8% salt | 64 | 2.5 | 15.2 | 6.76 | 2.56 | 4.46 | 129 | 200 | 279 |
| 5 | A + B, 4.0 g, 38.8% salt | 0 | 3.5 g, 14.0% salt | 55 | 2.4 | 23.2 | 21.0 | 6.68 | 9.04 | 120 | 200 | 285 |
| 6 | A + B, 60.0 g, 38.8% salt | 0 | 52.6 g, 14.8% salt | 50 | 2.5 | 32.6 | 17.8 | 5.85 | 5.48 | 125 | 200 | 283 |
| 7 | A + B, 4.0 g, 38.8% salt | 0 | 3.7 g, 12.4% salt | 55 | 2.36 | 22.4 | 16.7 | 6.19 | 7.45 | 94 | 200 | 298 |
| 8 | B, 4.0 g, 0.1% salt | 0 | 5.7 g, 0.1% salt | 50 | 2.36 | 27.4 | 48.6 | 21.3 | 17.7 | 125 | 240 | 308 |
| 9 | B, 4.0 g, 0.1% salt | 0 | 3.3 g | 50 | 2.51 | 10 | 6.09 | 2.69 | 6.09 | | | |

Notes for Table 24:
A = arabinoxylan A; B = arabinoxylan B; A + B = both arabinoxylan (hemicellulose) A and B in their naturally occurring proportions; entry 2 was precipitated from 10:90 AcOH/$H_2O$; entry 7 was reprecipitated from an acetone solution into 20/80 methanol/$H_2O$; % salt indicates the weight % of the sample which was not readily combustible.

This Example reveals a number of important aspects concerning arabinoxylan isolation and esterification. As previously described, a preferred method of isolation of arabinoxylan from corn fiber is via AcOH precipitation because this method results in a white product and a more satisfactory carbohydrate balance than does the sample obtained via alcohol precipitation.

AcOH precipitation can be carried out in two ways. In the one method, the aqueous arabinoxylan solution is added to cold AcOH quickly resulting in the rapid precipitation of a polysaccharide ultimately having a high salt content (as high as 60%). This high salt content arabinoxylan was used in Samples 1 to 7. However in a more preferred method of precipitation, room temperature AcOH is added to the aqueous solution of arabinoxylan allowing for a slower precipitation of the polysaccharide resulting in greatly diminished salt contents (0.1 to 2%). Low salt content arabinoxylan was utilized in Samples 8 to 9.

Significantly, when the pH of the solution is lowered slowly during precipitation it is possible to separate two components. The first and minor component (hemicellulose A) precipitates from solution at about pH 4 to 4.5. This material has a normalized glucose content of approximately 38%. More notably, once hemicellulose A is dried it is no longer soluble in water at acidic or neutral pH. The pH must be adjusted to at least 12 to 13 before the polysaccharide will go into solution. The second and major component that precipitates (hemicellulose B) contains almost no glucose (1% or less) and, in contrast to hemicellulose A, is fully water soluble in aqueous solution ranging from mildly acidic to strongly alkaline (even after drying). The nature of the hemicellulose plays a role in its ability to be esterified.

Sample 1 shows that once dried, the hemicellulose A of arabinoxylan is not readily esterified. This may be due in part to insufficient activation. Even though the hemicellulose A fibers swell when they come into contact with water they do not completely dissolve. Sample 2 shows that the hemicellulose B component is readily esterified.

Furthermore, it is not necessary to have purified arabinoxylan prior to esterification to produce "salt free" product. Starting with material that was almost 60% salt by weight, product was isolated having only 0.3% salt content. In the case of the mixed hemicellulose esters (A+B), reprecipitation has little influence on salt content. In general, esterification of mixed hemicelluloses results in products with higher salt content than when the esterifications are carried out on hemicellulose B only. This may be due to insufficient activation of the A component which leads to salts being trapped within the A component. Of additional interest in Sample 2 is the fact that with low salt content, the polymer shows much improved thermal stability with an initial decomposition temperature of 250° C., as compared to the much lower values for the higher salt content polymers. This property has a significant impact on applications such as thermal casting and extrusion. Sample 4 shows that as the temperature of the acylation reaction is increased over 55° C. significant molecular weight breakdown occurs. Sample 7 shows that this acylation methodology can be readily extended to other esters such as arabinoxylan propionates.

The best results, as judged by acetyl weight gain, are apparent when utilizing arabinoxylan of greater purity i.e., low salt content, as shown in Sample 8. Sample 9 shows that lower salt content in the arabinoxylan also allows for the use of the $H_2SO_4$ catalyzed method of esterification. Sample 9 also illustrates the ability to isolate arabinose and xylan via acetolysis of the arabinoxylan. After acetylation under these conditions, the polysaccharide ester was found to contain 72.3% xylose and only 7.5% arabinose with the arabinose, being released as arabinose acetate.

Example 31

Hydrolysis of Arabinoxylan

Figure 9:
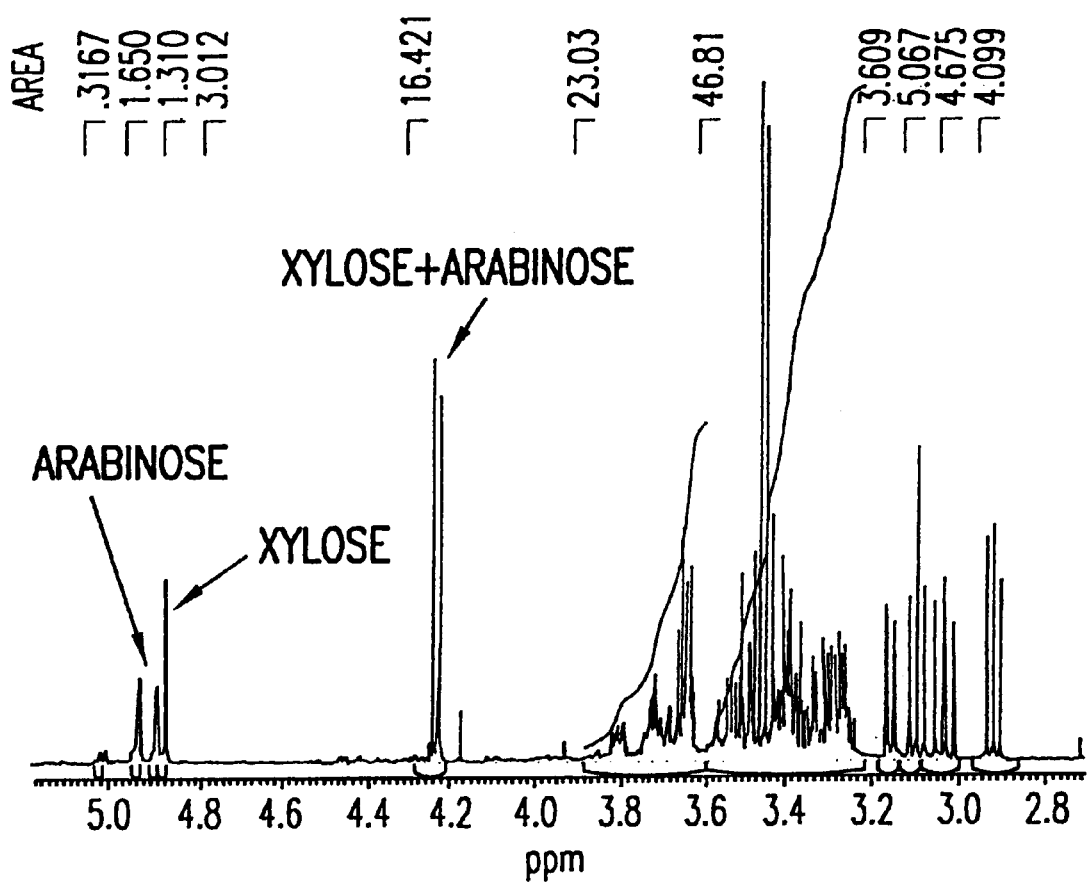
FIG. 9 shows a proton NMR spectrum of the product obtained after 6.25 hours of hydrolysis of arabinoxylan at 100° C.

A solution of 2 g of corn fiber arabinoxylan (obtained by a single caustic extraction with 2 M NaOH at 100° C. and isolated by precipitation in acetic acid) in 10 mL of 80/20 water/acetic acid containing 100 mg of sulfuric acid was heated to 100° C. Initially, the solution was highly viscous but the viscosity dropped very dramatically after about 35 min. Samples were removed at 2 hours 15 min, 3 hours 45 min, and 6 hours 45 min. The pH of each solution was adjusted to 5–6 using 4 M NaOH and the solutions were concentrated to dryness. Carbon 13 NMR spectra of each sample revealed that hydrolysis was essentially complete after 6 hours 45 min. The sample corresponding to hydrolysis for 6 hours 45 min (950 mg) in 2 mL of water was filtered to remove solids and the filtrate was concentrated. Analysis by $^1H$ NMR showed that the removed solid (20 mg) corresponded to oligomeric starting material while the carbohydrates comprising the filtrate (890 mg) consisted essentially only of xylose and arabinose (the 500 MHz $^1H$ spectra is shown in FIG. 9). To remove salts, the filtrate was taken up in 3 mL of water and passed through a mixed ion exchange column (6.5 cm×1.0 cm, Bio-Rad AG501-X8) which was washed with four 3 mL portion of water. After concentration of the combined liquids, 670 mg of arabinose and xylose was obtained.

This Example reveals a number of important features of this invention. First, the corn fiber arabinoxylan isolated by precipitation in acetic acid can be carried directly to the hydrolysis step without having to remove the acetic acid from the arabinoxylan. This is extremely beneficial in an industrial process. Further, because corn fiber arabinoxylan has a higher solubility than arabinoxylan obtained from other sources, such as wood arabinoxylan, higher solids can be obtained in the hydrolysis step, which is also industrially useful. Furthermore, any unreacted solids can be removed by a simple filtration, which greatly aids in the purification process.

Example 32

Selective Hydrolysis of Arabinoxylan

Figure 10:
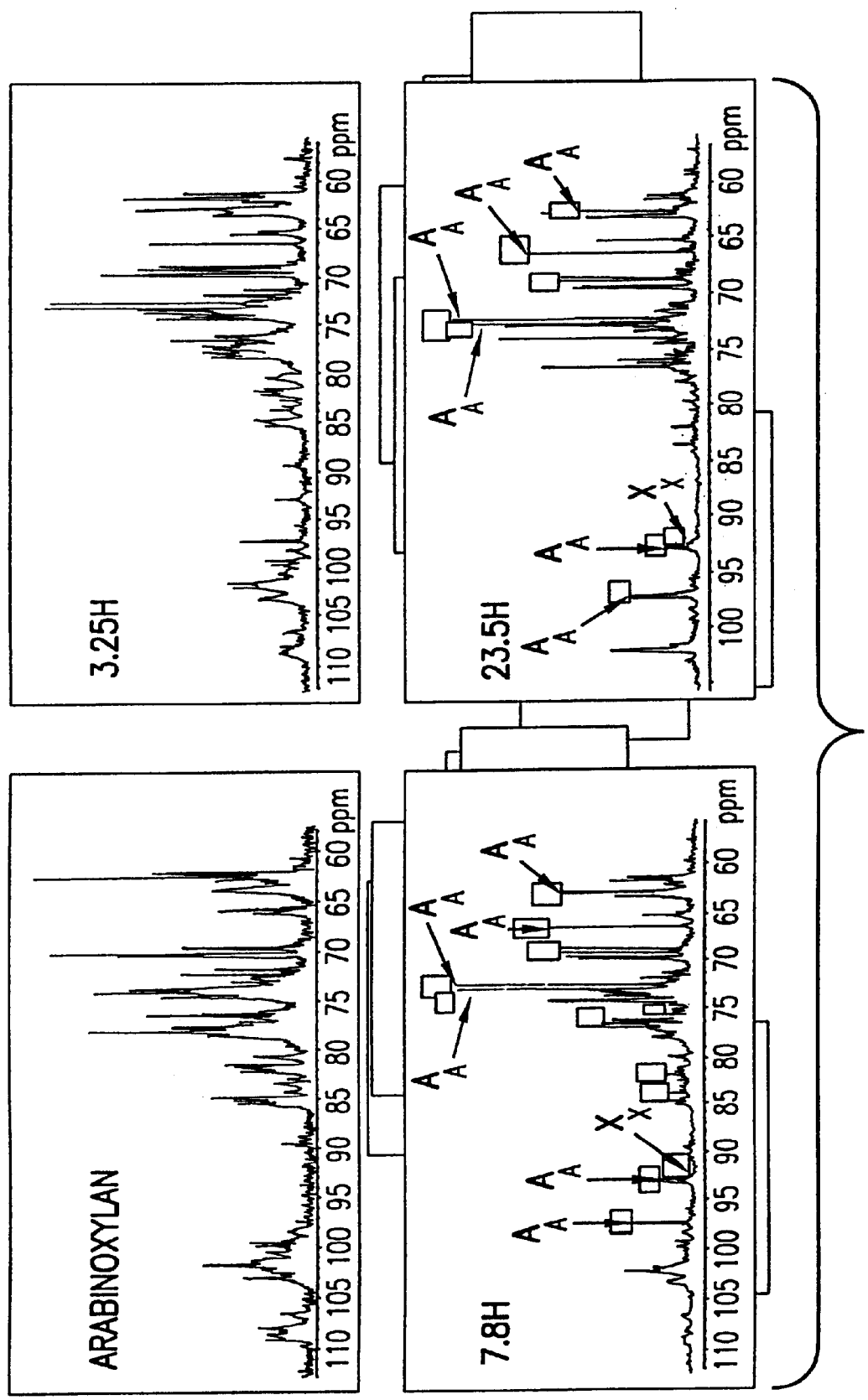
FIG. 10 shows a carbon 13 spectrum of a selective hydrolysis of an arabinoxylan series in which the most important resonances corresponding to either xylose or arabinose have been labelled.

A solution of 5 g of corn fiber arabinoxylan, obtained by a single caustic extraction with 2 M NaOH at 100° C. and isolated by precipitation in acetic acid, in 25 mL of $D_2O$ containing 250 mg of sulfuric acid was heated to 58° C. Initially, the solution was highly viscous but the solution viscosity dropped very quickly. Samples were removed at 1 hour 30 min, 3 hours 15 min, 5 hours 30 min, 7 hours 50 min, and 23 hours 30 min. Each solution was neutralized with 3 M NaOH and carbon 13 NMR spectra of each sample were collected, which are shown in FIG. 10 along with that of the starting material. These spectra demonstrate that arabinose is hydrolyzed much faster than xylose.

Figure 11:
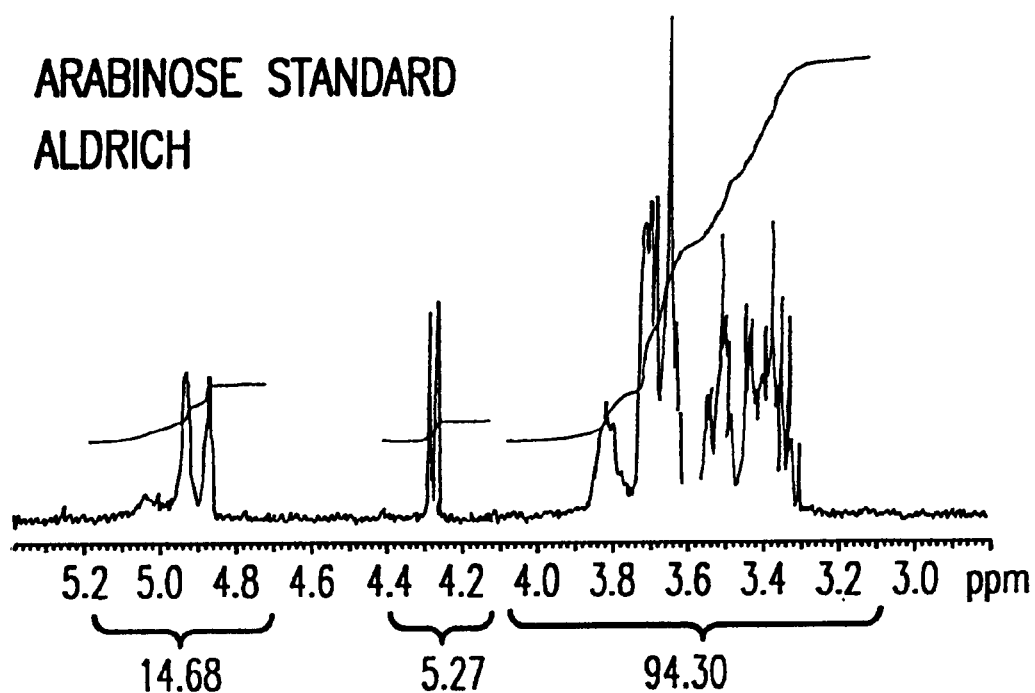
FIG. 11 shows a proton NMR spectra of arabinose obtained by crystallization of an arabinoxylan hydrolysis sample, wherein the sample is compared to that for a known arabinoxylan standard.
Figure 11:
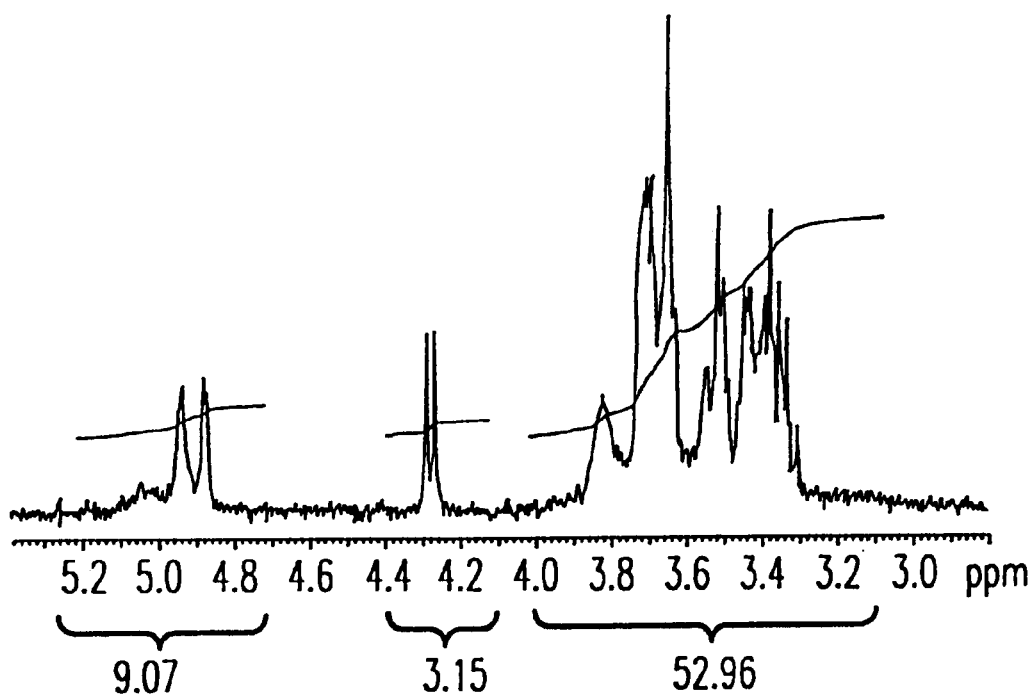

4.0 mL of ethanol was added to about 4.5 mL of the sample removed at 5 hours 30 min, providing a gummy solid. The solid was isolated by filtration, washed with ethanol and dried to give 614 mg of filtrate. The filtrate was concentrated, providing 150 mg of an oil. Proton NMR of the oil revealed that the oil consisted of arabinose contaminated with a small amount of xylose. Pure arabinose was isolated from the oil by crystallization from 90/10 ethanol/water (FIG. 11). Carbon 13 NMR of the solids isolated by ethanol precipitation revealed that they consisted essentially of xylan, with little arabinose present.

This Example reveals that, due to the higher rate of hydrolysis of the arabinose, arabinose can be selectively hydrolyzed from corn fiber arabinoxylan to provide an arabinose enriched stream from which pure arabinose and a lower molecular weight xylan consisting essentially of xylose can be obtained. Thus, by using a two stage hydrolysis, the arabinose and the xylose can be obtained in highly enriched forms without having to use costly separation techniques such as chromatography. Such an unexpected result provides marked economies of scale with the processes of the invention herein and allows the separation of the xylose and arabinose more directly from the extracted arabinoxylan in a continuous process.

Example 33

Separation of Xylose and Ribose from Corn Fiber Arabinoxylan

A mixture of D-xylose (163 mg) and L-arabinose (102 mg) was dissolved in a minimal amount of water (<3 mL). Methanol and silica gel were added to the solution and the mixture was swirled to promote mixing. The solvents were then removed under reduced pressure. To the top of a typically prepared chromatography column of silica gel was added the dry powder containing the mixture of D-xylose, L-arabinose and silica gel described above. The sugars were eluted from the column with an 8:8:1 mixture of ethyl acetate/isopropyl alcohol/water and 1 mL samples were collected. Tubes 19 to 25 were pooled and concentrated.

Thin layer chromatography and $^1$H NMR of the resultant material indicated only D-xylose was present in those fractions. Tubes 27 to 35 were pooled and concentrated. Thin layer chromatography and $^1$H NMR of the resultant material indicated the presence of L-arabinose (~95%) and D-xylose (~5%) in this fraction.

This Example illustrates that a mixture of xylose and arabinose, such as that obtained by the method of Example 31, can be cleanly separated by simple column chromatography over silica gel.

Example 34

Epimerization of Arabinose to Ribose 1.05 g of ammonium dimolybdate was added to a solution of 10 g of L-Arabinose in 45 mL of acetic acid and 10 mL of water at 50° C. The reaction was stirred at 50° C. for 14.8 h before concentrating under vacuum to obtain a green oil. The oil was taken up in water and stirred over Amberlite IRA-400 ion exchange resin (Restek Corp., Bellefonte, Pa.) before filtering through charcoal. The pale yellow solution was concentrated to provide 11.2 g of an oil. The oil was taken up in hot methanol, which resulted in the formation of crystals. The crystals were separated by filtration, washed with cold methanol, and dried which provided 3.68 g of white crystals which were shown to be arabinose by $^1$H NMR. The filtrate was concentrated in vacuo, which gave 6.86 g of an oil. Proton NMR revealed this oil to be a mixture of L-ribose (about 24%) and L-arabinose.

This Example illustrates that arabinose can be converted to ribose with molybdium in a solvent containing acetic acid. Thus, arabinose obtained by hydrolysis of corn fiber arabinoxylan in acetic acid/water can be utilized directly in the epimerization of arabinose to ribose without intermediate isolation of the arabinose from the acetic acid/water mixture which provides for a simple and continuous industrial process.

Example 35

Pulse Tests for Separation of Arabinose and Xylose

Figure 12:
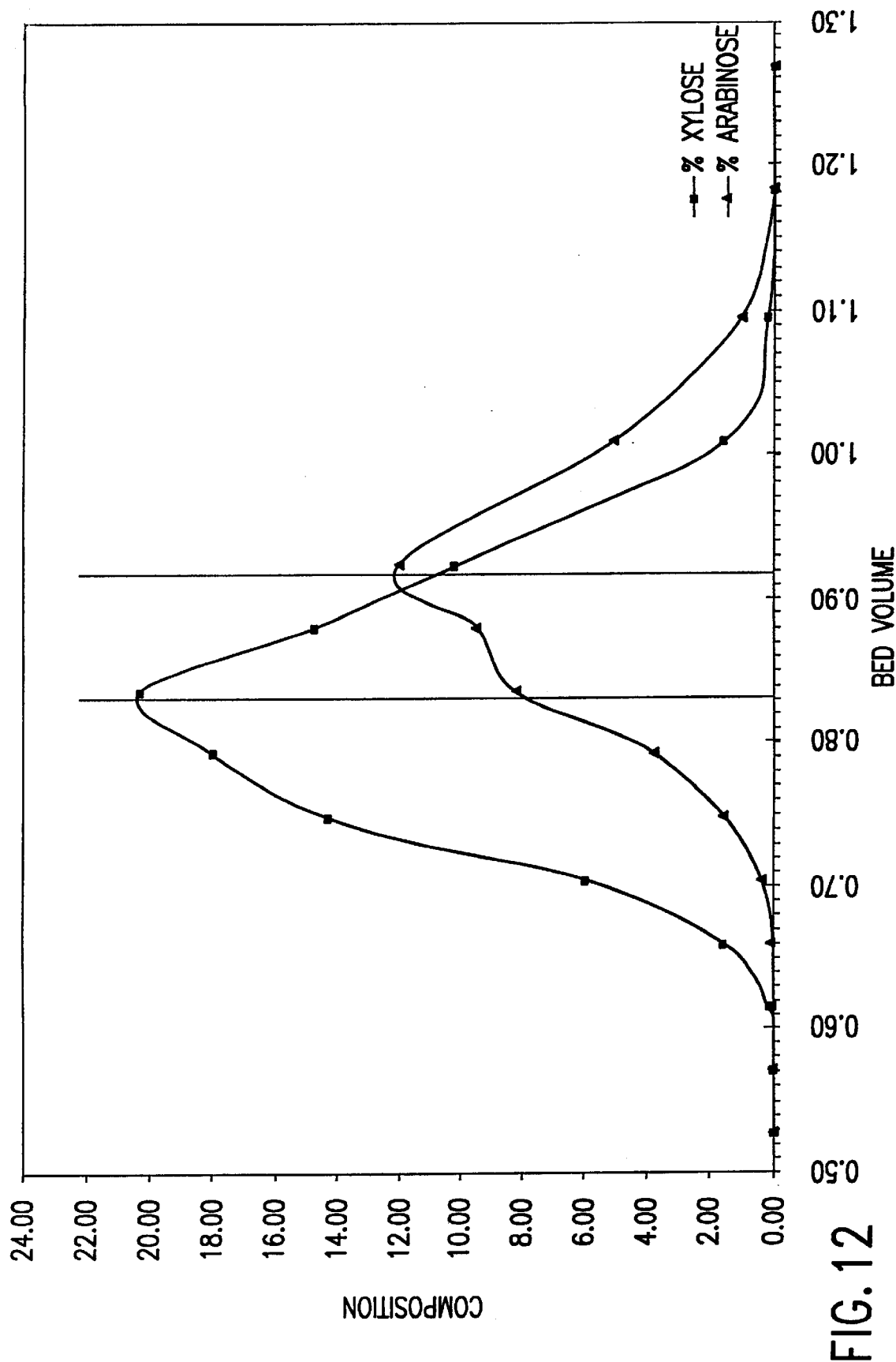
FIG. 12 shows pulse test results for a L-arabinose/xylose separation experiment.

To determine the feasibility of separating arabinose and xylose using SMB chromatography, a synthetic mixture of xylose (35%) and arabinose (20%) in water was pulsed into a 1" ID×100 cm column packed with Dowex Monosphere 99 Ca/320. The column volume was 500 mL, the pulse volume was 50 mL, the flow rate was 9 mL min$^{-1}$ and the temperature was 60° C. The results of the pulse test are presented in FIG. 12. A 0.09 bed volume (BV) peak to peak separations was achieved indicating that arabinose and xylose could be separated in a SMB unit.

Figure 13:
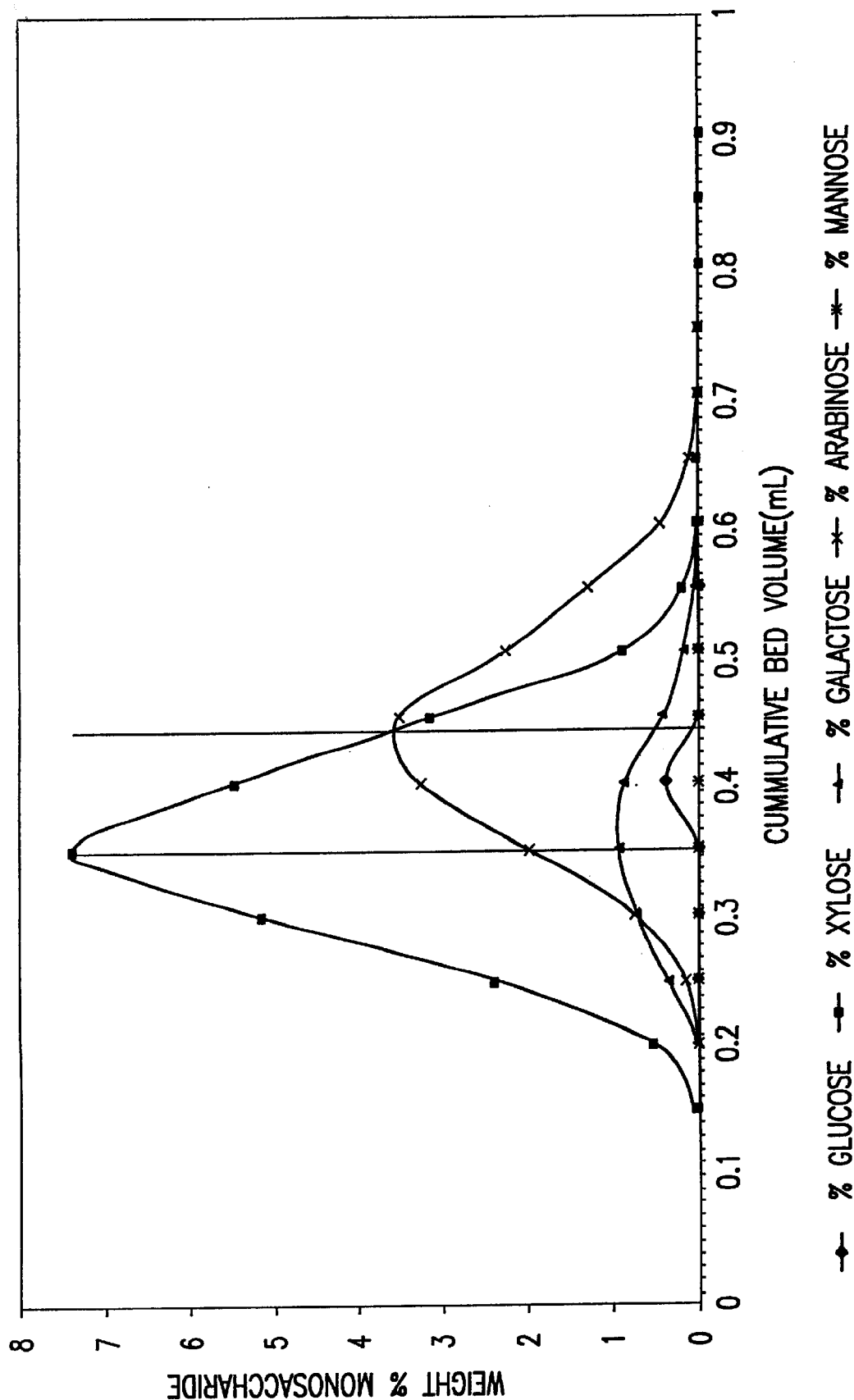
FIG. 13 shows pulse test results for a corn fiber xylose/arabinose separation.

Corn fiber arabinoxylan was hydrolyzed to a mixture of monosaccharides as set out above. This feed was pulsed into a 1" ID×100 cm column packed with Dowex Monosphere 99 Ca/320. The column volume was 500 mL, the pulse volume was 50 mL, the flow rate was 9 mL min$^{-1}$, and the temperature was 60° C. The results of the pulse test are presented in FIG. 13. A 0.1 bed volume (BV) peak to peak separations was achieved indicating that the feed could be separated in a SMB unit. Because galactose and the minor amount of glucose elude between xylose and arabinose, the pulse test indicates that either xylose or arabinose can be highly purified in a binary separation with the bulk of the remaining monosaccharides going to the other component.

Example 36

Pulse Tests for Separation of Arabinose and Ribose

Figure 14:
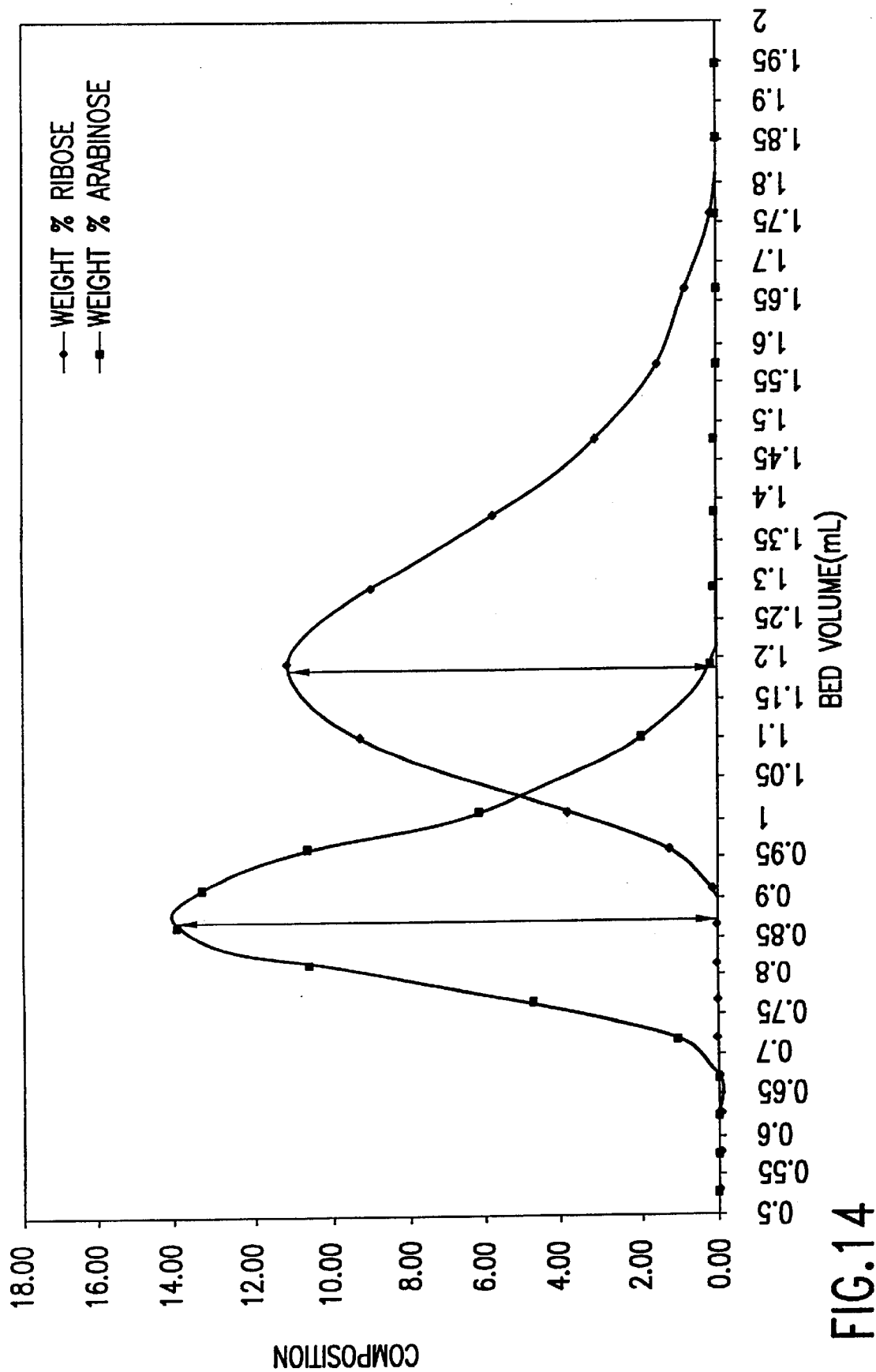
FIG. 14 shows pulse test results from an arabinose/ribose separation experiment.

To determine the feasibility of separating arabinose and ribose using SMB chromatography, a synthetic mixture of arabinose (35%) and ribose (20%) in water was pulsed into a 1" ID×100 cm column packed with Dowex Monosphere 99 Ca/320. The column volume was 500 mL, the pulse volume was 50 mL, the flow rate was 8.3 mL min$^{-1}$ and the temperature was 60° C. The results of the pulse test are presented in FIG. 14. A 0.3 bed volume (BV) peak to peak separations was achieved indicating that arabinose and ribose could be easily separated in a SMB unit.

Example 37

Pulse Tests for Separation of Arabinose and Xylose Using Strongly Basic Resin in the Phosphate Form Strongly basic resin in the phosphate form was prepared first soaking Dowex-1 strong basic resin in the chloride form in water. The resin was transferred to a 1 inch×1 meter column. The column was rinsed with 2 bed volumes of deionized water at 8 ml min–1 before passing 5 bed volumes of a 5% NaOH solution through the column. The column was washed with 4 bed volumes of deionized water before passing 5 bed volumes of a 5% $H_2KPO_4$ solution through the column. The column was then washed with 4 bed volumes of deionized water.

Figure 15:
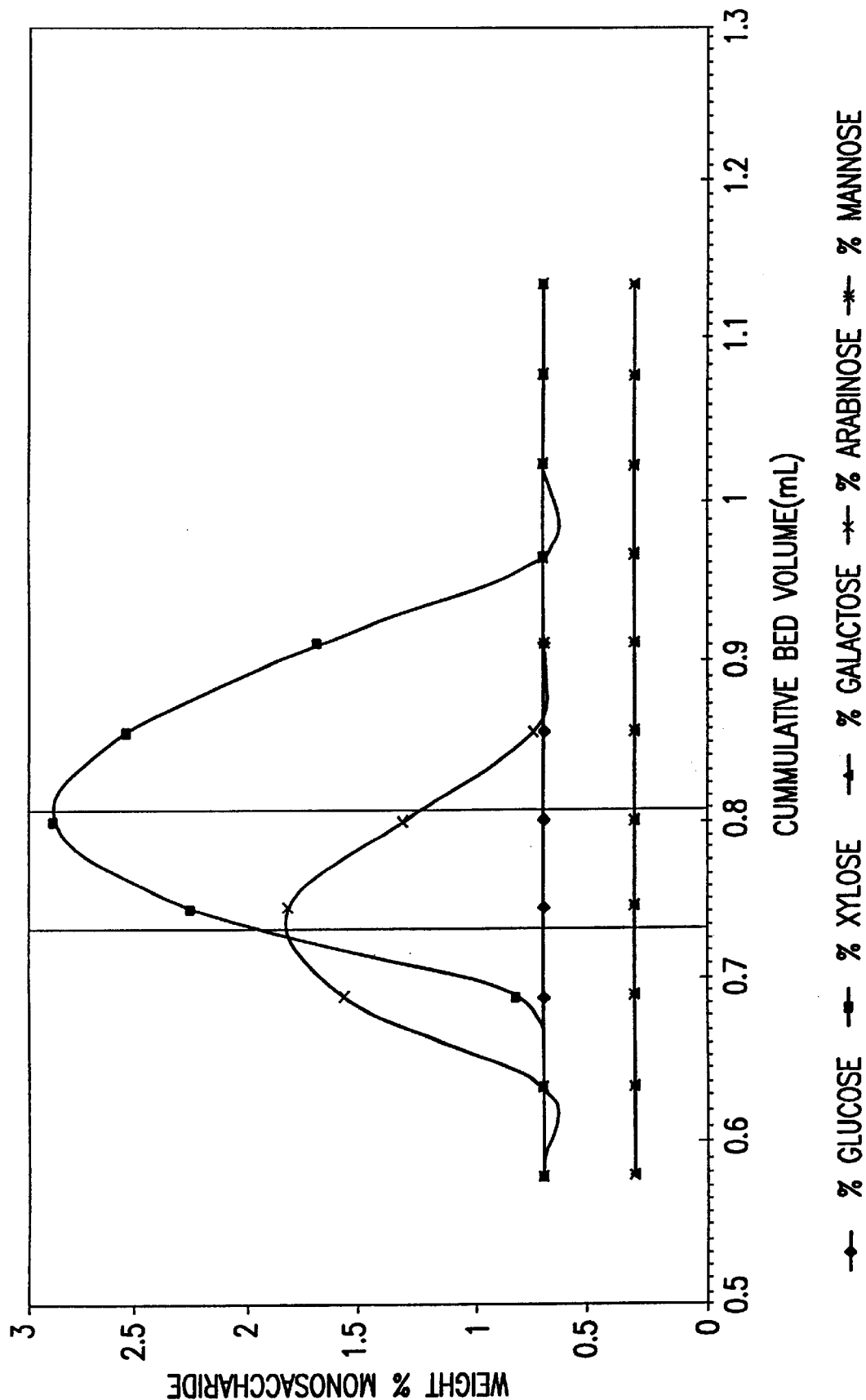
FIG. 15 shows pulse test results for xylose/arabinose separation using a strongly anion exchange resin in the phosphate form.

A synthetic mixture of xylose (8.7%) and arabinose (5.15%) in water was pulsed into a 1" ID×100 cm column packed with the strongly basic resin in the phosphate form described above. The column volume was 500 mL, the pulse volume was 50 mL, the flow rate was 9 mL min$^{-1}$, and the temperature was 60° C. The results of the pulse test are presented in FIG. 15. A 0.1 bed volume (BV) peak to peak separations was achieved indicating that arabinose and xylose could be separated in a SMB unit. A surprising feature of this invention is that the arabinose elutes before xylose which is opposite to that observed with the cation resin in the calcium form described above.

Corn fiber arabinoxylan was hydrolyzed to a mixture of monosaccharides as set out above. This feed was pulsed into a 1" ID×100 cm column packed with the strongly basic resin in the phosphate form described above. The column volume was 500 mL, the pulse volume was 50 mL, the flow rate was 9 mL min$^{-1}$, and the temperature was 60° C. A 0.08 bed volume (BV) peak to peak separations was achieved indicating that the feed could be separated in a SMB unit.

Example 38

Arabinofuranosidase Catalyzed Selective Hydrolysis Arabinoxylan

A 25-mL round-bottomed flask was charged with 0.5 g of arabinoxylan and 10 mL of 0.1 M NaOAc buffer (pH 4). The mixture was thoroughly mixed on a vortex mixer before placing the flask into a 50° C. oil bath where the mixture was stirred for approximately 5 minutes. The flask was capped with a rubber septum and vented with a 20 gauge needle before adding 200 µL (30 units) of A. niger arabinofuranosidase. The reaction mixture was stirred at 50° C. for approximately 64 hours before the sample was added in small portions to 35 mL of EtOH in a centrifuge tube with thorough mixing. The mixture was allowed to stand at room temperature for 15 minutes before centrifuging (5 min., 4050×g, 4000 rpm, 10° C.). The supernatant was decanted from the pellet which formed. The pellet was resuspended in 25 mL of EtOH and centrifuged (5 min., 4050×g, 4000 rpm, 10° C.). The wash was decanted from the pellet. The pellet was dried at 50° C. in vacuo. The pellet (polysaccharide precipitate) and the supernatant (monosaccharides) were submitted for carbohydrate analysis. The normalized carbohydrate composition is provided in Table 25.

TABLE 25

NORMALIZED CARBOHYDRATE COMPOSITION OF PELLET
AND SUPERNATANT AFTER TREATMENT OF ARABINOXYLAN
WITH *A. NIGER* ARABINOFURANOSIDASE.

| Sample | % Glu | % Xyl | % Gal | % Ara |
|---|---|---|---|---|
| Pellet | 6.1 | 61.7 | 9.0 | 23.3 |
| Supernatant | 0 | 0 | 5.5 | 94.5 |

This Example demonstrates that an arabinofuranosidase can be used to selectively hydrolyze the arabinoxylan from corn fiber to produce a solution highly enriched in arabinose.

Example 39

Epimerization of L-arabinose to L-ribose with Ammonium Dimolybdate

To a 25 mL single neck round bottom flask equipped with a magnetic stirrer and condensation column was added 5 g of L-Arabinose and 12.5 mL of distilled $H_2O$ at a pH of 2. The reaction was heated to the desired temperature in an oil bath. Once the reaction was clear, 1 wt. % (based on L-arabinose) of catalyst was added and the reaction mixture was adjusted to desired pH by addition of the appropriate amount of acid or base in distilled $H_2O$. The reaction was stirred for five hours at the desired temperature. After five hours, the reaction was cooled to room temperature and 1 g of AG-501-X8 mixed ion exchange resin was added. This mixture was stirred for 20 minutes. The solution was filtered through a pad of charcoal and concentrated in vacuo. The crude mixture was analyzed on Gemini 300 NMR spectrometer (Varian, Palo Alto, Va.) and by HPLC. The relevant reaction parameters and results are summarized in Table 26.

This Example reveals a number of interesting features of this reaction. Of the three Mo VI catalysts examined, ammonium dimolybdate gave the highest conversion to L-ribose under equivalent reaction conditions (compare Samples 6, 11, 12). Increasing the temperature at a fixed pH provides for higher conversion of L-arabinose to L-ribose (cf. Samples 2 and 3, Samples 1 and 8). From Samples 4 through 10, it can be seen that as the pH is decreased, the conversion to L-ribose increases with the optimum pH being in the range of 2–2.5. However, it is worth noting that in the pH range of 2–2.5, analysis by HPLC showed that only ca. 87% of the mixture was L-ribose and L-arabinose indicating other side reactions (Samples 5 and 6). At pH 3.5 (Sample 8) the side reactions are greatly minimized but the conversion is less.

Example 40

Epimerization of L-arabinose to L-ribose with a Preformed Polymolybdate Catalyst To a 15 mL single neck round bottom flask equipped with a magnetic stirrer and condensation column was added 6 mL of water at a pH of 2.5 and 1 g of ammonium dimolybdate. To the flask was added either 1 weight equivalent of boric acid or 0.5 weight equivalent of boric acid. The flask containing the homogeneous solution was then placed in an oil bath preheated to 100° C. After stirring for approximately 2 h, a white solid began to form. Three hours after placing the flask in the oil bath, the reaction was allowed to cool and the solids were removed by filtration. The solids were washed with water and excess water was removed by filtration but the solids were not allowed to dry. The filtrate was concentrated in vacuo to a powder.

To a 25 mL single neck round bottom flask equipped with a magnetic stirrer and condensation column was added 5 g of L-Arabinose and 12.5 mL of distilled $H_2O$ with a pH of

TABLE 26

EPIMERIZATION OF L-ARABINOSE TO L-RIBOSE WITH AMMONIUM DIMOLYBDATE.

| Sample | % Ribose ($^1$H) | % Ribose (HPLC) | Total Rib + Arb (HPLC) | % Ribose Normalized (HPLC) | Equiv. of Catalyst | Catalyst | pH | Temp (° C.) |
|---|---|---|---|---|---|---|---|---|
| 1 | 7.5 | 8.7 | 89.4 | 9.7 | 0.0076 | Ammonium Dimolybdate | 3.5 | 80 |
| 2 | 7.6 | 8.4 | 86.6 | 9.7 | 0.0076 | Ammonium Dimolybdate | 4 | 80 |
| 3 | 12.4 | 21.0 | 93.6 | 22.4 | 0.0076 | Ammonium Dimolybdate | 4 | 90 |
| 4 | 17.1 | 16.2 | 89.2 | 18.2 | 0.0076 | Ammonium Dimolybdate | 1 | 100 |
| 5 | 23.7 | 24.3$^1$ | 87.0$^1$ | 27.9$^1$ | 0.0076 | Ammonium Dimolybdate | 2 | 100 |
| 6 | 21.1 | 22.8 | 87.8 | 26.0 | 0.0076 | Ammonium Dimolybdate | 2.5 | 100 |
| 7 | 20.3 | 22.8 | 92.4 | 24.7 | 0.0076 | Ammonium Dimolybdate | 3 | 100 |
| 8 | 19 | 22.4 | 98.3 | 22.8 | 0.0076 | Ammonium Dimolybdate | 3.5 | 100 |
| 9 | 16.6 | 18.3 | 91.1 | 20.2 | 0.0076 | Ammonium Dimolybdate | 4.5 | 100 |
| 10 | 6.3 | 7.3 | 88.3 | 8.3 | 0.0076 | Ammonium Dimolybdate | 6 | 100 |
| 11 | 15.9 | 15.1 | 83.5 | 18.1 | 0.0062 | Sodium Molybdate | 2.5 | 100 |
| 12 | 17.4 | 18.4 | 87.7 | 21.0 | 0.0104 | $MoO_3$ | 2.5 | 100 |

Notes for Table 26:
$^1$. Average value for two experiments.

2. The reaction was heated to 100° C. in an oil bath. Once the reaction was clear, 1 wt. % (based on L-arabinose) of catalyst was added and the reaction mixture was stirred until a clear solution was obtained. It is important to note that the solid catalyst will not dissolve in the absence of L-arabinose. The pH of the reaction mixture was adjusted to desired pH by addition of the appropriate amount of acid or base in distilled $H_2O$. The reaction was stirred for five hours at the desired temperature. After five hours, the reaction was cooled to room temperature and 1 g of AG-501-X8 mixed ion exchange resin was added. This mixture was stirred 20 minutes. The solution was filtered through a pad of charcoal and concentrated in vacuo. The crude mixture was analyzed on Gemini 300 NMR spectrometer and by HPLC. The relevant reaction parameters and results are summarized in Table 27.

powder. These Samples show that the active catalyst is the solid catalyst. This is particularly evident from Sample 5. In this example, the catalyst was prepared at a pH of 5 rather than the standard pH of 2.5 which does not lead to the formation of a solid catalyst. In this case, the active catalyst is found in the filtrate and it is not nearly as active as the equivalent solid catalyst (cf Samples 4 and 5).

Samples 8 and 9 show that the solid catalyst should not be dried. That is, they should remain in the hydrated form. The catalyst of Sample 8 results from taking a small fraction of the catalyst of Sample 4 and drying it to remove all of the water. Similarly, the catalyst of Sample 9 results from taking a small fraction of the catalyst of Sample 6 and drying it to remove all of the water. Although the normalized L-ribose values from HPLC are equivalent, the sum of the L-ribose and L-arabinose values indicates that many more side reactions are occurring with extensively dried catalysts.

TABLE 27

EPIMERIZATION OF L-ARABINOSE TO L-RIBOSE WITH PREFORMED POLYMOLYBDATE.

| Sample | % Ribose ($^1$H) | % Ribose (HPLC) | Total Rib + Arb (HPLC) | % Ribose Normalized (HPLC) | Wt % Catalyst | Catalyst | pH |
|---|---|---|---|---|---|---|---|
| 1[1] | 0 | | | | | $NH_4Mo_2O_5$ + 2.5 eqs boric acid | 3 |
| 2[2] | 21.1 | 22.8 | 87.8 | 26.0 | 1 | $NH_4Mo_2O_5$ | 2.5 |
| 3 | 8.6 | nd | nd | nd | 1 | 2/1 $NH_4Mo_2O_5$/Boric Acid (filtrate) | 3 |
| 4 | 27.6 | 23.3[3] | 89.5[3] | 26.0[3] | 1 | 2/1 $NH_4Mo_2O_5$/Boric Acid (solid) | 2.5 |
| 5[4] | 19.0 | 19.4 | 84.3 | 23.0 | 1 | 2/1 $NH_4Mo_2O_5$/Boric Acid (filtrate) | 3 |
| 6 | 21.8 | 22.5 | 88.2 | 25.5 | 1 | 1/1 $NH_4Mo_2O_5$/Boric Acid (solid) | 2.5 |
| 7 | 1.5 | 3.9 | 100 | 3.9 | 1 | 1/1 $NH_4Mo_2O_5$/Boric Acid (filtrate) | 2.5 |
| 8[5] | 22.1 | 21.8 | 81.9 | 26.6 | 1 | 2/1 $NH_4Mo_2O_5$/Boric Acid (solid) | 2.5 |
| 9[5] | 23.0 | 19.6 | 75.7 | 25.9 | 1 | 1/1 $NH_4Mo_2O_5$/Boric Acid (solid) | 2.5 |
| 10[6] | 22.7 | 21.2 | 78.3 | 27.1 | 1 | $NH_4Mo_2O_5$ | 2.0 |

Notes for Table 27:
[1]. The reaction temperature was 95° C., the pH of the reaction was 3.0, and the reaction time was 0.5 h;
[2]. This Sample corresponds to Example 39 that does not provide for formation of polymolybdate;
[3]. Average value for two experiments;
[4]. The catalyst was prepared at a pH of 5 rather than the standard pH of 2.5 which does not lead to the formation of a solid catalyst;
[5]. The catalyst was dried in vacuo to remove water prior to the epimerization reaction;
[6]. The $NH_4Mo_2O_5$ was treated as described above with $NH_4Mo_2O_5$ + boric acid.

Sample 1 is a comparative example (see U.S. Pat. No. 4,602,086, Example 1). In this example, the Mo VI catalyst, large excess of boric acid, and L-arabinose were combined and no attempt was made to isolate a solid polymolybdate catalyst like the present invention. Moreover, practice of the invention of Sample 1 does not provide for formation of L-ribose. Only L-arabinose and the methyl glycoside are obtained.

Sample 2 corresponds to the method disclosed in Example 39 which does not require formation of a solid catalyst. Although the normalized L-ribose values from HPLC are similar to those obtained using the solid catalyst described in this example (Samples 4 and 6), the sum of the L-ribose and L-arabinose values indicates that more side reactions occur with the catalyst of Sample 2 (12.2%) versus those of Sample 4 (10.5%) or Sample 6 (11.8%).

Samples 6 and 7 provide comparisons of the activity of solid catalyst obtained in this invention and the activity of the catalyst obtained after concentration of the filtrate to a Lastly, the catalyst of Sample 10 was formed as described above except that there was no boric acid added. Although the normalized L-ribose values are equivalent to those obtained from the $NH_4Mo_2O_5$/boric acid polymolybdate (compare Sample 10 to Samples 4 and 6), the sum of the L-ribose and L-arabinose values indicates that many more side reactions are occurring with the catalyst of Sample 10 relative to Samples 4 and 6. That is, the catalysts of Samples 4 and 6 provide for the best combination of conversion of L-arabinose to L-ribose with minimal side reactions.

The invention has been described in detail with particular reference to preferred embodiments thereof, but it will be understood that variations and modifications can be effected without departing from the scope and spirit of the invention.

What is claimed is:

1. A method of separating a corn fiber lipid fraction having phytosterol esters and phytosterols wherein the method comprises the steps of:

a. providing a mixture of corn fiber and water;

b. contacting the mixture with an amylase enzyme and a protease enzyme to provide a destarched and proteolyzed corn fiber and a liquid;

c. separating the liquid from the destarched and proteolyzed corn fiber; and d. extracting the destarched and proteolyzed corn fiber with at least one organic solvent, thereby providing a corn fiber lipid fraction/organic solvent solution having phytosterol esters and phytosterols, wherein the concentration of phytosterols in the lipid fraction is at least about 1.4 times greater than the concentration of phytosterols in the lipid fraction extracted from a nondestarched and nonproteolyzed corn fiber.

2. The method of claim 1, wherein the corn fiber is unground.

3. The method of claim 1, further comprising conducting a corn fiber grinding step prior to step (a).

4. The method of claim 1, wherein the corn fiber is destarched with an amylase enzyme prior to or concurrently with the protease enzyme contacting step.

5. The method of claim 4, wherein the amylase enzyme contacting step is conducted at a temperature of from about 25° C. to about 120° C. for about 0.1 h to about 24 h at a pH of from about 4 to about 9.

6. The method of claim 4, wherein the amylase enzyme contacting step is conducted at a temperature of from about 60° C. to about 90° C. for about 1 h to about 12 h at a pH of from about 7 to about 9.

7. The method of claim 1, wherein the protease enzyme contacting step is conducted at a temperature of from about 25° C. to about 120° C. for from about 0.1 h to about 24 h at a pH of from about 4 to about 9.

8. The method of claim 1, wherein the protease enzyme contacting step is conducted at a temperature of from about 60° C. to about 90° C. for from about 1 h to about 12 h at a pH of from about 7 to about 9.

9. The method of claim 1, wherein the corn fiber contacted with protease enzyme is not dried prior to the solvent extraction step.

10. The method of claim 1, wherein the corn fiber contacted with protease enzyme is dried prior to the solvent extraction step.

11. The method of claim 1, wherein the solvent is a polar organic solvent.

12. The method of claim 11, wherein the organic solvent comprises methanol, ethanol, isopropyl alcohol, n-butyl alcohol, acetone, ethyl acetate, methyl isobutyl ketone, methyl ethyl ketone, or a mixture thereof.

13. The method of claim 1, wherein the organic solvent comprises hexane, heptane, diethyl ether, or a mixture thereof.

14. The method of claim 1, wherein the solvent extraction step is conducted at a temperature of from about 0° C. to about 115° C. for from about 1 min to about 600 min.

15. The method of claim 1, wherein the solvent extraction step is conducted at a temperature of from about 20° C. to about 80° C. for from about 10 to about 60 min.

16. The method of claim 1, further comprising separating the corn fiber lipid fraction from the organic solvent solution via a distillation step wherein the phytosterols and phytosterol esters are separated with the corn fiber lipid fraction.

17. The method of claim 16, wherein prior to conducting the distillation step a water layer is separated from the corn fiber lipid fraction/organic solvent solution.

18. The method of claim 16, wherein after conducting the distillation step a water layer is separated from the corn fiber lipid fraction/organic solvent solution.

19. The method of claim 16, wherein the organic solvent solution is separated from the corn fiber lipid fraction via vacuum distillation.

20. The method of claim 19, wherein the corn fiber lipid fraction is enriched in phytosterols and phytosterol esters.

21. The method of claim 16, further comprising separating the phytosterol esters and phytosterols from the corn fiber lipid fraction and, optionally, separating the phytosterols and phytosterol esters from each other.

22. The method of claim 21, further comprising separating the phytosterol esters and phytosterols from the corn fiber lipid fraction and, optionally, from each other, wherein the separation is conducted via crystallization.

23. The method of claim 16, wherein unwanted components are present in the corn fiber lipid fraction with the phytosterols and phytosterol esters and wherein the method further comprises the steps of: separating the unwanted components from the corn fiber lipid fraction via extraction to provide a corn fiber lipid fraction enriched in phytosterol esters and phytosterols; and separating the phytosterol esters and phytosterols from the lipid fraction and, optionally, separating the phytosterols and phytosterol esters from each other, wherein the separation is conducted via crystallization.

24. The method of claim 16, wherein glyceride esters are present in the corn fiber lipid fraction with the phytosterols and phytosterol esters and wherein the method further comprises the steps of: hydrolyzing the glyceride esters; removing the hydrolyzed glyceride esters to provide a corn fiber lipid fraction enriched in phytosterol esters and phytosterols; and separating the phytosterol esters and phytosterols from the lipid fraction and, optionally, separating the phytosterols and phytosterol esters from each other, wherein the separation is conducted via crystallization.

* * * * *